US009953374B2

(12) United States Patent
Sugiyama et al.

(10) Patent No.: US 9,953,374 B2
(45) Date of Patent: Apr. 24, 2018

(54) WORK MANAGEMENT SYSTEM AND WORK MANAGEMENT METHOD

(71) Applicant: OMRON Corporation, Kyoto-shi, Kyoto (JP)

(72) Inventors: Sadao Sugiyama, Kyoto (JP); Hiroyuki Ishibashi, Kyoto (JP); Hideo Tsuchiya, Kyoto (JP); Shiro Sugihara, Kyoto (JP); Kiyoshi Yoshikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 387 days.

(21) Appl. No.: 14/861,464

(22) Filed: Sep. 22, 2015

(65) Prior Publication Data

US 2016/0012361 A1   Jan. 14, 2016

Related U.S. Application Data

(63) Continuation of application No. PCT/JP2014/052694, filed on Feb. 5, 2014.

(30) Foreign Application Priority Data

Apr. 18, 2013 (JP) ................................ 2013-087776

(51) Int. Cl.
*G06Q 10/00* (2012.01)
*G06Q 40/00* (2012.01)
(Continued)

(52) U.S. Cl.
CPC ......... *G06Q 40/125* (2013.12); *G02B 27/017* (2013.01); *G05B 19/41865* (2013.01);
(Continued)

(58) Field of Classification Search
CPC .................................................... G06Q 10/103
(Continued)

(56) References Cited

U.S. PATENT DOCUMENTS 6,325,287 B1    12/2001  Nakajima et al.
2002/0044104 A1  4/2002  Friedrich et al.
(Continued)

FOREIGN PATENT DOCUMENTS

EP       1271293 A2    1/2003
JP    2000-148904 A    5/2000
(Continued)

OTHER PUBLICATIONS

Notification of Reasons for Refusal issued in corresponding Japanese Application No. 2013-087776, dated Oct. 4, 2016 (5 pages).
(Continued)

*Primary Examiner* — A Hunter Wilder
(74) *Attorney, Agent, or Firm* — Osha Liang LLP

(57) ABSTRACT

A work management system (1) includes: an image capturing device (20) worn by a worker; and a server device (60). The image capturing device (20) includes: an image capturing section (21) for capturing an image of a work range of the worker; and a communication section (30) for transmitting, to the server device (60), at least one of (i) the image captured by the image capturing section (21) and (ii) generated information generated in accordance with the image. The server device (60) includes a control section (70) for managing the at least one of the image and the generated information which one is received from the communication section.

5 Claims, 37 Drawing Sheets

(51) Int. Cl.

| | |
|---|---|
| *G06Q 50/04* | (2012.01) |
| *G06Q 10/06* | (2012.01) |
| *G06K 7/10* | (2006.01) |
| *G06K 19/06* | (2006.01) |
| *G02B 27/01* | (2006.01) |
| *G06F 3/0485* | (2013.01) |
| *G09G 5/12* | (2006.01) |
| *G05B 19/418* | (2006.01) |
| *H04N 5/225* | (2006.01) |
| *H04N 5/77* | (2006.01) |
| *H04N 7/18* | (2006.01) |
| *H04N 21/4147* | (2011.01) |
| *H04N 21/4223* | (2011.01) |
| *H04N 21/4363* | (2011.01) |
| *G06Q 10/10* | (2012.01) |

(52) U.S. Cl.
CPC ....... *G06F 3/0485* (2013.01); *G06K 7/10722* (2013.01); *G06K 19/06037* (2013.01); *G06Q 10/0639* (2013.01); *G06Q 10/063114* (2013.01); *G06Q 50/04* (2013.01); *G09G 5/12* (2013.01); *H04N 5/2252* (2013.01); *H04N 5/77* (2013.01); *H04N 7/183* (2013.01); *H04N 21/4147* (2013.01); *H04N 21/4223* (2013.01); *H04N 21/43637* (2013.01); *G02B 2027/014* (2013.01); *G02B 2027/0123* (2013.01); *G02B 2027/0138* (2013.01); *G02B 2027/0178* (2013.01); *G05B 2219/31447* (2013.01); *G05B 2219/37572* (2013.01); *G05B 2219/45175* (2013.01); *G06Q 10/103* (2013.01); *G09G 2370/16* (2013.01); *Y02P 90/04* (2015.11); *Y02P 90/18* (2015.11); *Y02P 90/20* (2015.11); *Y02P 90/30* (2015.11)

(58) Field of Classification Search
USPC ...................................... 705/7.26, 7.27, 301
See application file for complete search history.

(56) References Cited

U.S. PATENT DOCUMENTS

| | | |
|---|---|---|
| 2004/0194273 A1 | 10/2004 | Yamakado et al. |
| 2005/0033670 A1 | 2/2005 | Cheng et al. |
| 2006/0137163 A1 | 6/2006 | Yamakado et al. |
| 2007/0129914 A1 | 6/2007 | Yana et al. |
| 2008/0223917 A1 | 9/2008 | Miyashita et al. |

FOREIGN PATENT DOCUMENTS

| | | |
|---|---|---|
| JP | 2004-252847 A | 9/2004 |
| JP | 2005-056098 A | 3/2005 |
| JP | 2005-216137 A | 8/2005 |
| JP | 2005-242418 A | 9/2005 |
| JP | 2005-259078 A | 9/2005 |
| JP | 2006-085573 A | 3/2006 |
| JP | 2006-301937 A | 11/2006 |
| JP | 2007-193661 A | 8/2007 |
| JP | 2008-108008 A | 5/2008 |
| JP | 2012-198644 A | 10/2012 |
| WO | 2007-066166 A1 | 6/2007 |

OTHER PUBLICATIONS

Decision of Refusal issued in corresponding Japanese Application No. 2015-099055, dated Nov. 1, 2016 (6 pages).
International Search Report issued in PCT/JP2014/052694 dated May 20, 2014 (2 pages).
Written Opinion of the International Searching Authority issued in PCT/JP2014/052694 dated May 20, 2014 (5 pages).
Extended European Search Report issued in corresponding EP Application No. 14785080.4, dated Jun. 10, 2016 (9 pages).
Extended European Search Report issued in corresponding EP Application No. 15185206.8, dated Jun. 2, 2016 (10 pages).
Extended European Search Report issued in corresponding EP Application No. 15185246.4, dated Jun. 10, 2016 (10 pages).
Extended European Search Report issued in corresponding EP Application No. 15185259.7, dated Jun. 2, 2016 (9 pages).
Extended European Search Report issued in corresponding EP Application No. 1518567.0, dated Jun. 2, 2016 (9 pages).
Bannat, Alexander; et al.; "Artificial Cognition in Production Systems"; IEEE Transactions on Automation Science and Engineering, IEEE Service Center; New York, New York; vol. 8, No. 1; Jan. 1, 2011; pp. 148-174 (27 pages).
English Translation of International Search Report issued in PCT/JP2014/052694 dated Oct. 29, 2015 (2 pages).
English Translation of Written Opinion of the International Searching Authority issued in PCT/JP2014/052694 dated May 20, 2014 (7 pages).
Office Action issued in corresponding U.S. Appl. No. 14/778,880, dated Jan. 17, 2018 (23 pages).

FIG. 3

| LOT NUMBER | PRODUCT ID | ORDER ID | LINE NAME | PRODUCTION PERIOD |
|---|---|---|---|---|
| 11111 | aaaa | bbbbb | mmmm | 2013/4/1 10:00~18:00 |
| ⋮ | ⋮ | ⋮ | ⋮ | ⋮ |

FIG. 4

| WORKER ID | MACHINE ID | WORK START TIME | WORK END TIME | TYPE OF WORK | CONTENTS OF ACTION |
|---|---|---|---|---|---|
| eee | m01 | 2013/4/1 11:00 | 2013/4/1 12:00 | FAILURE | ALIGNMENT |
| ⋮ | ⋮ | ⋮ | ⋮ | ⋮ | ⋮ |

FIG. 5

| CHECK ITEM NAME | CHECKER ID | CHECK TIME | CHECK RESULT |
|---|---|---|---|
| DIRT ON METAL OF MACHINE A | eee | 2013/4/1 15:00 | ACCEPTABLE |
| PRESSURE VALUE OF MACHINE B | ggg | 2013/4/1 15:03 | ACCEPTABLE 4.1 |
| ⋮ | ⋮ | ⋮ | ⋮ |

FIG. 6

| LINE NAME | LOCATION NAME | WORKER ID | WORKER NAME | CAMERA ID | MAIN WORKER FLAG |
|---|---|---|---|---|---|
| mmmm | FIRST FACTORY | 001 | ○○○ | xxx | |
| | | 002 | ××× | yyy | ○ |
| | | 003 | △△△ | zzz | |
| ⋮ | ⋮ | ⋮ | ⋮ | ⋮ | ⋮ |

FIG. 7

| LINE NAME | LOCATION NAME | MACHINE ID |
|---|---|---|
| mmmm | FIRST FACTORY | m01 |
| | | m02 |
| | | ⋮ |
| ⋮ | ⋮ | ⋮ |

FIG. 36

| MACHINE ID | UNIT ID | ABNORMALITY OCCURRENCE TIME | HANDLING START TIME | ACTION END TIME | CONTENTS OF ACTION | LOCATION NAME | LINE NAME | MACHINE HANDLING WORKER ID | MACHINE HANDLING MOVING IMAGE | PRODUCT ID | LOT NUMBER | PRODUCT CHECKING WORKER ID | PRODUCT CHECK MOVING IMAGE |
|---|---|---|---|---|---|---|---|---|---|---|---|---|---|
| 1 | m01 | m01ab | 4/1 13:48 | 4/1 14:00 | 4/1 14:38 | ALIGNMENT | TOKYO FACTORY | mmm | 001 | File A | aaaa | 11111 | 002 | File B |
| 2 | ... | ... | ... | ... | ... | ... | ... | ... | ... | ... | ... | ... | ... |
| 3 | ... | ... | ... | ... | ... | ... | ... | ... | ... | ... | ... | ... | ... |
| ... | ... | ... | ... | ... | ... | ... | ... | ... | ... | ... | ... | ... | ... |

- MACHINE ID, UNIT ID, ABNORMALITY OCCURRENCE TIME: COLLECTED FROM PRODUCTION DEVICE
- HANDLING START TIME, ACTION END TIME, CONTENTS OF ACTION, LOCATION NAME, LINE NAME: COLLECTED FROM INPUT-OUTPUT TERMINAL
- MACHINE HANDLING WORKER ID, MACHINE HANDLING MOVING IMAGE: COLLECTED FROM IMAGE CAPTURING DEVICE
- PRODUCT ID, LOT NUMBER: COLLECTED FROM LOT MANAGING DEVICE
- PRODUCT CHECKING WORKER ID, PRODUCT CHECK MOVING IMAGE: COLLECTED FROM IMAGE CAPTURING DEVICE

FIG. 37

- MACHINE ○○
  - UNIT A
    - 12/11/18  REPLACEMENT OF ○○ COMPONENT  TOKYO FACTORY c LINE GOODS K
    - 12/12/03  CLEANING OF □△ GEAR           OSAKA FACTORY a LINE GOODS A
    - 12/12/24  CLEANING OF □△ GEAR           SHIGA FACTORY r LINE GOODS K
    - 13/02/11  TIGHTENING OF △○ SCREW        INDIA FACTORY y LINE GOODS B
    - . . .
  - UNIT B
  - UNIT C
    . . .
- MACHINE ○×
- MACHINE ×○
- MACHINE △△
  . . .

FIG. 38

- MACHINE ○○
    - UNIT A
        - CLEANING OF □△ GEAR
            OSAKA FACTORY     a_LINE、 GOODS A
            SHIGA FACTORY     r_LINE、 GOODS K
            ...

- REPLACEMENT OF HOLDING SECTION
            TOKYO FACTORY     c_LINE、 GOODS K
            ...

- TIGHTENING OF △○ SCREW
            INDIA FACTORY     y_LINE、 GOODS B
            ...

- UNIT B
    - UNIT C
        ...
- MACHINE ○×
- MACHINE ×○
- MACHINE △△
    ...

FIG. 39

```
LOCATION TOKYO FACTORY
 •  a_LINE
     WORKER (A)
      • REPLACEMENT OF ○× SECTION  RECOVERY TIME : 50 MINUTES  STANDARD TIME 15 MINUTES  12/10/11 15:40
      • ×△ WORK    RECOVERY TIME : 120 MINUTES  STANDARD TIME 100 MINUTES  12/09/08 17:50
      • △△ WORK   RECOVERY TIME :  15 MINUTES  STANDARD TIME  20 MINUTES  12/09/07  9:10
              . . .
     WORKER (B)
     WORKER (C)
 •  b_LINE
 •  c_LINE
```

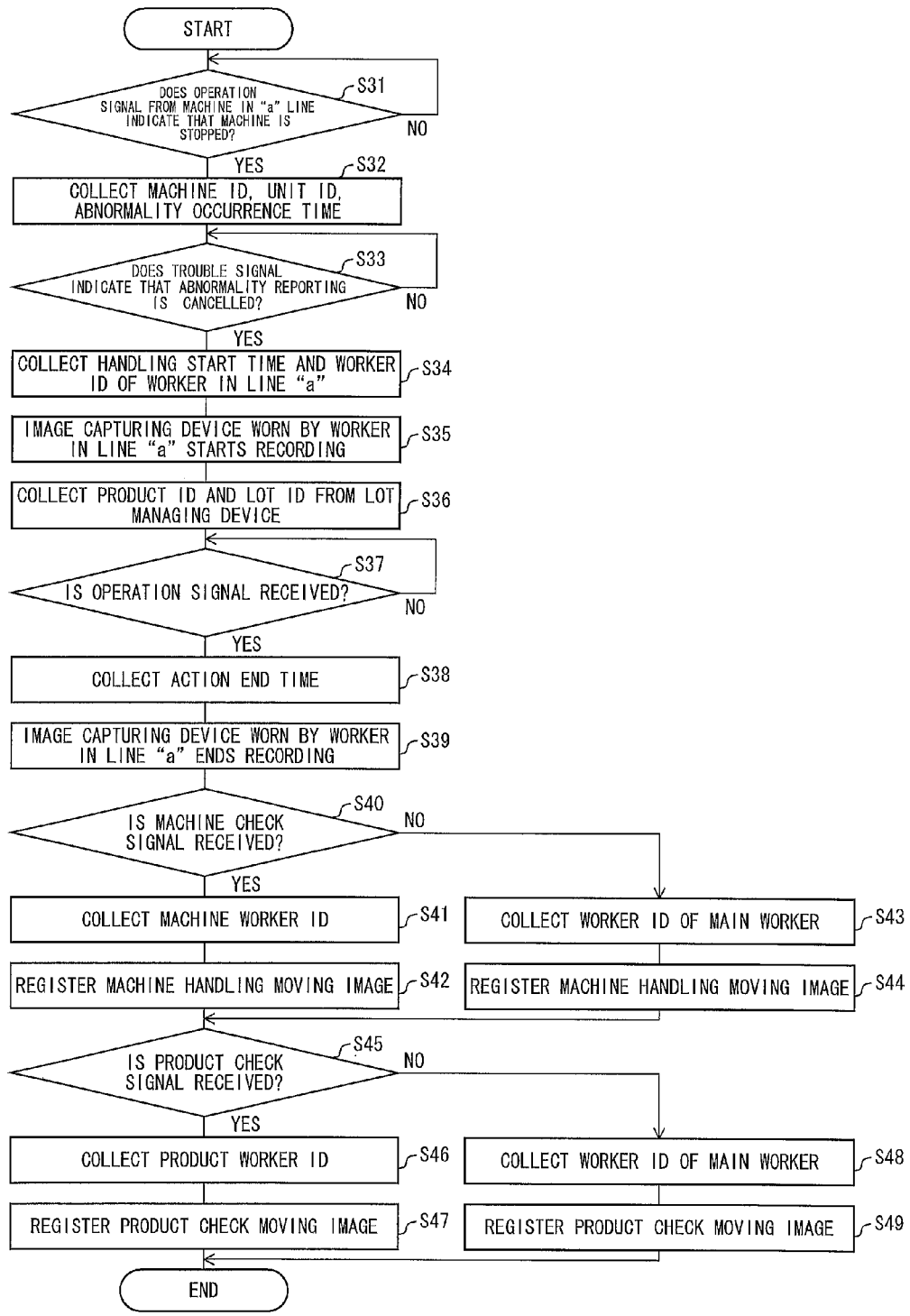

WORK MANAGEMENT SYSTEM AND WORK MANAGEMENT METHOD

TECHNICAL FIELD

The present invention relates to a work management system for managing work.

BACKGROUND ART

Conventionally, an image capturing device is provided on, for example, a production site so as to manage work carried out on the production site (Patent Literatures 1 and 2).

CITATION LIST

Patent Literature

[Patent Literature 1]
Japanese Patent Application Publication Tokukai No. 2005-242418 (Publication date: Sep. 8, 2005)
[Patent Literature 2]
Japanese Patent Application Publication Tokukai No. 2006-301937 (Publication date: Nov. 2, 2006)

SUMMARY OF INVENTION

Technical Problem

However, according to Patent Literatures 1 and 2, the image capturing device is provided at a given position on the production site. In this case, a blind spot is easily formed by a machine and the like on the production site. In particular, a work range of a worker easily gets in a blind spot of the image capturing device, depending on a position where the worker stands. This causes a problem such that it is not possible to accurately capture an image of the work range. Furthermore, in a case where the image capturing device is provided at a fixed location, it is likely that an image of the worker's face is captured. This imposes a great psychological burden on the worker.

The present invention has been made in view of the above problems, and an object of the present invention is to provide a work management system capable of easily capturing an image of a work range of a worker while less imposing a psychological burden on the worker.

Solution to Problem

A work management system in accordance with the present invention is a work management system including: an image capturing device worn by a worker; and a server device, the image capturing device including: an image capturing section for capturing an image of a work range of the worker; and a communication section for transmitting, to the server device, at least one of (i) the image captured by the image capturing section and (ii) generated information generated in accordance with the image, the server device including: a management section for managing the at least one of the image and the generated information which one is received from the communication section.

A work management method in accordance with the present invention is a method of managing a work management system including (i) an image capturing device worn by a worker and (ii) a server device, the image capturing device including an image capturing section for capturing an image of a work range of the worker, the method including the steps of: transmitting, to the server device, at least one of (i) the image captured by the image capturing section and (ii) generated information generated in accordance with the image; and managing the at least one of the image and the generated information which one is received by the server device.

Advantageous Effects of Invention

According to the present invention, it is possible to provide a work management system capable of easily capturing an image of a work range of a worker.

BRIEF DESCRIPTION OF DRAWINGS

FIG. 3 illustrates example lot managing information which is managed by a lot managing device of the work management system illustrated in FIG. 1.

FIG. 4 is a view illustrating an example work record accumulated in a work record accumulating section included in a server device of the work management system illustrated in FIG. 1.

FIG. 5 is a view illustrating example information stored in a check result storing section included in the server device of the work management system illustrated in FIG. 1.

FIG. 6 is a view illustrating example worker information stored in a worker information storing section included in the server device of the work management system illustrated in FIG. 1.

FIG. 7 is a view illustrating example line information stored in a line information storing section included in the server device of the work management system illustrated in FIG. 1.

FIG. 36 is a view illustrating example trouble information generated by the server device of Concrete Example 18.

FIG. 37 is a view illustrating an example search result screen on which a result of searching for trouble information is displayed.

FIG. 38 is a view illustrating another example search result screen on which the result of searching for the trouble information is displayed.

FIG. 39 is a view illustrating further another example search result screen on which the result of searching for the trouble information is displayed.

FIG. 40 is a flowchart illustrating a flow of a process of generating trouble information which process is carried out by the server device of the work management system in accordance with Concrete Example 10.

DESCRIPTION OF EMBODIMENTS

The following description will discuss a work management system in accordance with an embodiment of the present invention with reference to FIGS. 1 through 40. Note that the following description will discuss a work management system in a production line as an example. However, the work management system of the present invention is not limited to use in work within a production line (such as processing, assembling, inspection, packaging and the like). The work management system of the present invention can be applied to various processes such as inspection of components, treatment of wastes (such as factory waste, effluent, waste gas, trash and the like), management and inspection (maintenance) of machines, shipment of goods, and growing of agricultural produces.

(Overall Configuration of Work Management System)

Figure 1:
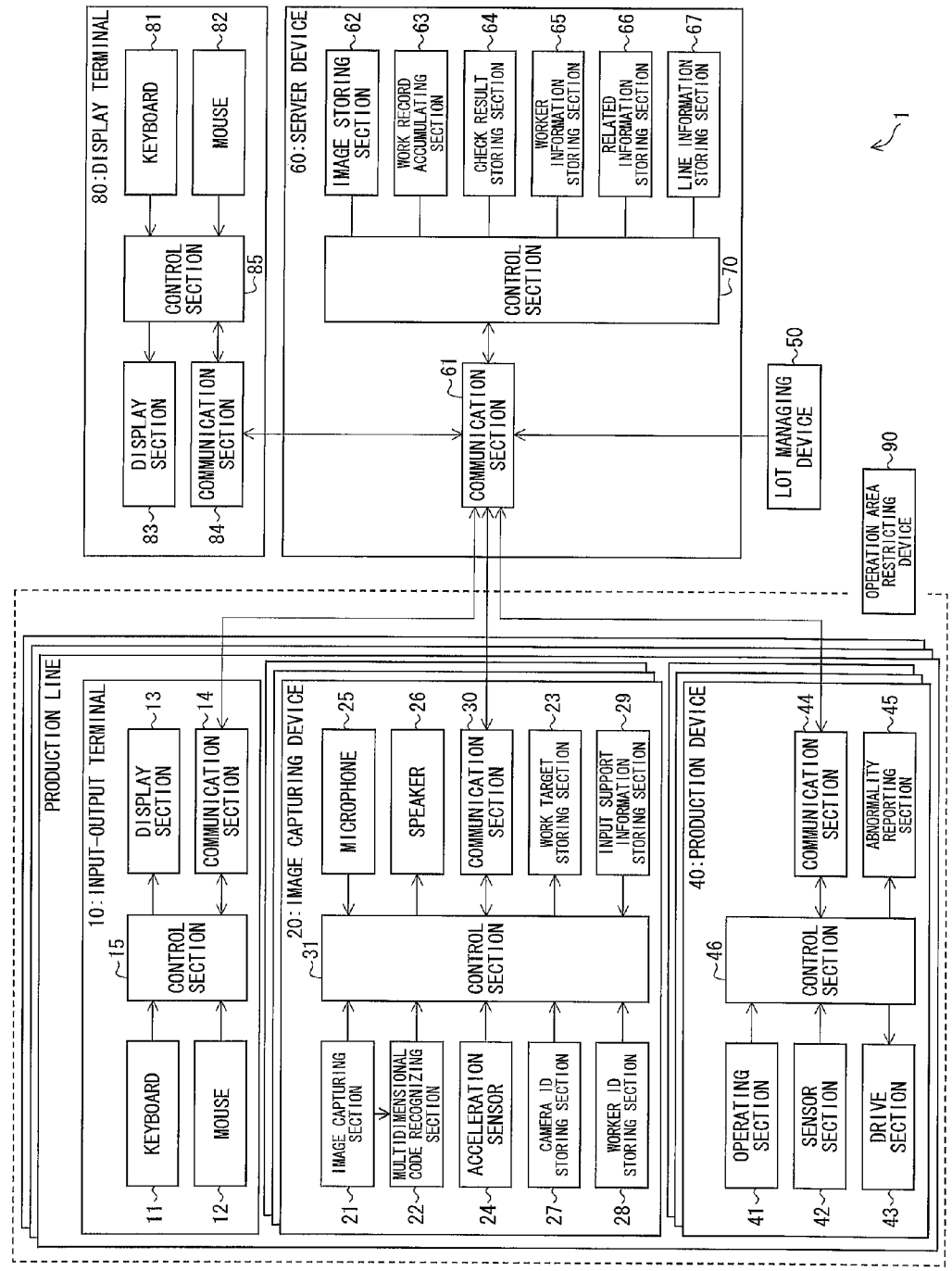
FIG. 1 is a block diagram illustrating an overall configuration of a work management system in accordance with an embodiment of the present embodiment.

FIG. 1 is a block diagram illustrating an overall configuration of the work management system in accordance with the present embodiment. As illustrated in FIG. 1, a work management system 1 includes an input-output terminal 10, an image capturing device 20, a production device 40, a lot managing device 50, a server device 60, a display terminal 80, and an operation area restricting device 90. Note that an input-output terminal 10, an image capturing device 20, and a production device 40 are provided in each of a plurality of production lines. Alternatively, a plurality of input-output terminals 10, a plurality of image capturing devices 20, and a plurality of production devices 40 can be provided in each of the plurality of production lines. FIG. 1 shows an example in which a plurality of image capturing devices 20 and a plurality of production devices 40 are provided in each of the plurality of production lines.

The input-output terminal (display device) 10 is a terminal (i) into which a worker or a manager inputs work-related information and (ii) by which the worker or the manager examines work-related information. Examples of the information to be inputted by the worker or the manager encompass: a type of work to be carried out with respect to the production device 40; and contents of action taken against the production device 40. Examples of information to be examined by the worker or the manager encompass: information concerning the production device 40 (e.g. specifications of the production device 40); product specifications, lot numbers and production amount. The input-output terminal 10 (i) transmits inputted information to the server device 60 as well as (ii) obtains, from the server device 60, desired information desired by the worker or the manager so as to display the desired information.

Figure 2:
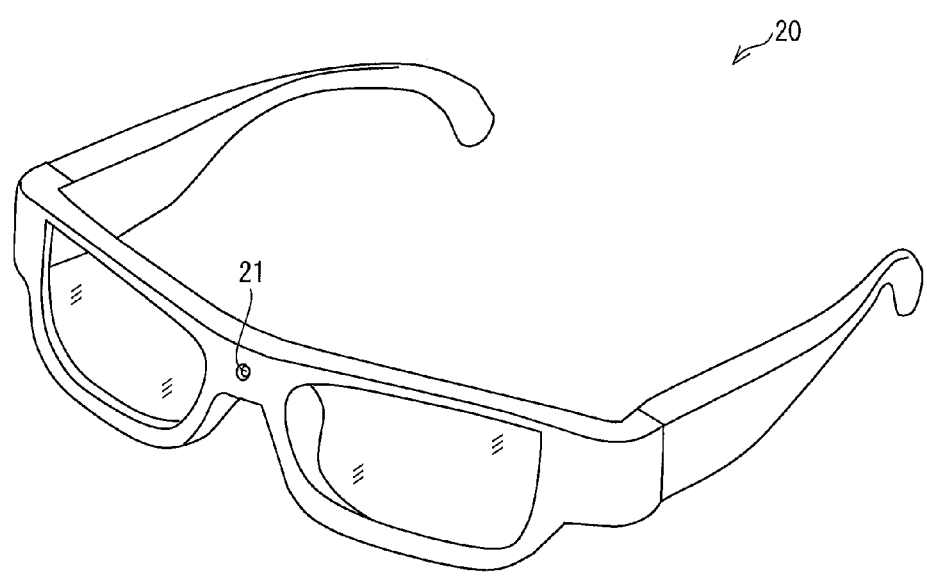
FIG. 2 is a perspective view of an image capturing device included in the work management system illustrated in FIG. 1.

The image capturing device 20 is to be worn by the worker so as to capture an image of a work range of the worker. The work range refers to a range which is located in front of the worker and which is located within the reach of the worker (e.g. around the worker's hands). Although a position at which the image capturing device 20 is to be mounted is not particularly limited, the position is preferably the upper body of the worker, particularly the worker's head. In a case where the image capturing device 20 is worn on the worker's head, the image capturing device 20 is preferably worn so that an image capturing direction is substantially identical to a line of sight of the worker. For example, as illustrated in FIG. 2, the image capturing device 20 is of a glasses-type, and includes an image capturing section 21 at a bridge part thereof. In the following description, the image capturing device 20 will be assumed to be of a glasses-type as illustrated in FIG. 2.

The image capturing device 20 transmits, to the server device 60, (i) a captured image or (ii) information (generated information) generated based on the captured image.

The production device 40 is a machine for producing a product. The production device 40 of the present embodiment can be constituted by a single unit, or can be constituted by a plurality of units. The production device 40 constituted by a plurality of units is a machine in which units are combined together, examples of which units encompass (i) a conveyance unit for conveying a workpiece which is to be an object to be processed, (ii) a heating unit for heating a workpiece, and (iii) a cut unit for cutting a workpiece. The production device 40 transmits, to the server device 60, status information that indicates a status of the production device 40.

The lot managing device 50 is a device for managing information (lot managing information) concerning a lot which is produced in a production line. FIG. 3 illustrates the lot managing information. As illustrated in FIG. 3, the lot managing information is information in which each lot is associated with: a lot number; a product ID that identifies a product; an order ID that identifies a written production instruction for production of the lot; a line name that identifies a production line in which the lot is produced; and a period (production period) in which the lot is produced.

The display terminal (display device) 80, in accordance with an instruction inputted by the worker or the manager, (i) searches for information accumulated in stored in the server device 60 and (ii) displays a search result.

The server device 60 is capable of communicating with the input-output terminal 10, the image capturing device 20, the production device 40, the lot managing device 50, and the display terminal 80. The server device 60 obtains information supplied from each of the devices, and manages the information. The server device 60 also generates information in accordance with an instruction given by each of the devices, and transmits the information to said each of the devices.

The operation area restricting device 90 is a device for restricting an operation of an image capturing function of the image capturing device 20 to the inside of a predetermined area (e.g. factory). The operation area restricting device 90 is provided at each of doorways of the predetermined area so as to carry out short-distance wireless communication with an image capturing device 20 worn by any worker passing through a doorway. The operation area restricting device 90 (i) transmits, to an image capturing device 20 worn by a worker exiting the predetermined area, an instruction to deactivate the image capturing function and (ii) transmits, to an image capturing device 20 worn by a worker entering the predetermined area, an instruction to activate the image capturing function.

A configuration of each of the devices will be schematically described below.

(Input-Output Terminal)

As illustrated in FIG. 1, the input-output terminal 10 includes: a keyboard 11 and a mouse 12 serving as input sections; a display section 13, a communication section 14; and a control section 15.

The display section 13 is a rectangular-shaped display. The communication section 14 communicates with the server device 60 via a wired or wireless connection.

The control section 15 controls the members of the input-output terminal 10 all together. A control function of the control section 15 is realized by a processing device, such as a CPU (Central Processing Unit), executing a control program.

For example, a worker or a manager inputs information such as a type of work and/or contents of work in a case where the worker or the manager carries out particular work. Then, the control section 15 controls the communication section 14 so that the communication section 14 transmits the information to the server device. In addition, upon reception of a scrolling instruction from the server device 60, the control section 15 scrolls a display screen of the display section 13 in accordance with the scrolling instruction.

(Image Capturing Device)

As illustrated in FIG. 1, the image capturing device 20 includes: an image capturing section 21; a multidimensional code recognizing section 22; a work target storing section 23; an acceleration sensor 24; a microphone 25; a speaker 26; a camera ID storing section 27; a worker ID storing section 28; an input support information storing section 29; a communication section 30; and a control section 31.

The image capturing section 21 includes: an optical element such as a lens to capture an image of a work range of a worker; and an imaging element for converting light into an electric signal. The image capturing section 21 captures a moving image. The image capturing section 21 supplies the moving image to the control section 31 and to the multidimensional code recognizing section 22.

The multidimensional code recognizing section 22 recognizes multidimensional codes contained in a frame of which the moving image supplied from the image capturing section 21 is made up. For each frame, in a case where the multidimensional code recognizing section 22 recognizes the multidimensional codes from the each frame, the multidimensional code recognizing section 22 supplies all of the multidimensional codes to the control section 31. Note that to "supply multidimensional codes to the control section 31" means to supply, to the control section 31, codes recognized from an image of the multidimensional codes.

Examples of a multidimensional code encompass two-dimensional codes such as QR Code (Registered Trademark), Data Matrix (Registered Trademark), PDF417, Maxi, Code, and Aztec Code. Although the following description will discuss a two-dimensional code as an example of the multidimensional code, the present invention is not limited to use of a two-dimensional code.

Note that the multidimensional code recognizing section 22 can recognize multidimensional codes from all of frames of which a moving image supplied from the image capturing section 21 is made up. Alternatively, the multidimensional code recognizing section 22 can recognize multidimensional codes from part of the frames (e.g. one frame per predetermined number of frames).

The work target storing section 23 stores information that indicates a work target which is determined in accordance with the multidimensional codes recognized by the multidimensional code recognizing section 22. Examples of the work target encompass: a machine ID (machine identification information) which identifies the production device 40; an order ID (object identification information) which indicates a written production instruction; and a lot number (object identification information).

The acceleration sensor 24 is a movement detecting device for detecting acceleration of the glasses-type image capturing device 20 in a vertical direction and in a horizontal direction. Therefore, in a case where the image capturing device 20 is worn by a worker, it is possible to detect, by examining measured values of acceleration of the acceleration sensor 24, whether or not the worker's head is vertically moved and whether or not the worker's head is horizontally moved. The acceleration sensor 24 supplies, to the control section 31, measured values of the acceleration in the vertical direction and in the horizontal direction.

The microphone 25 is a sound input device for converting a sound into an electric signal and then supplying the electric signal to the control section 31. The speaker 26 converts the electric signal received from the control section 31 into a sound wave, and then outputs the sound wave.

The camera ID storing section 27 stores a camera ID which is identification information uniquely assigned in advance to the image capturing device 20.

The worker ID storing section 28 stores a worker ID that identifies the worker wearing the image capturing device 20. In a case where a single image capturing device 20 is given per worker, (i) a worker ID is supplied in advance to the image capturing device 20 and (ii) the worker ID thus supplied is stored in the worker ID storing section 28. In a case where a single image capturing device 20 is shared by a plurality of workers who work in shifts, (i) a worker ID of a new worker to use the image capturing device 20 is supplied to the image capturing device 20 when workers to wear the image capturing device 20 are switched and (ii) the control section 31 updates, to the worker ID thus supplied, the worker ID stored in the worker ID storing section 28.

The input support information storing section 29 stores input support information in which a combination of multidimensional codes is associated with one of (i) predetermined information which is to be set as input information and (ii) an algorithm in accordance with which the input information is determined.

The communication section 30 carries out wirelessly communication with the server device 60. The communication section carries out short-distance wireless communication with the operation area restricting device 90. The wireless communication between the communication section 30 and the operation area restricting device 90 is carried out within, for example, a range of approximately 1 (one) meter.

The control section 31 controls the members of the image capturing device 20 all together. A control function of the control section 31 is realized by a processing device, such as a CPU (Central Processing Unit), executing a control program.

The control section 31 can, for example, control the communication section 30 so that the communication section 30 transmits an image captured by the image capturing section 21 to the server device 60. The control section 31 can also serve as an information generating section that (i) determines (generates) input information in accordance with (a) a combination of multidimensional codes of a single frame, which multidimensional codes have been recognized by the multidimensional code recognizing section 22 and (b) input support information and (ii) controls the members of the image capturing device 20 in accordance with the input information thus determined. Alternatively, the control section 31 can control the members of the image capturing device 20 in accordance with an instruction received from the server device 60. A concrete example of how the control section 31 controls the members will be described later.

In a case where the control section 31 receives from the operation area restricting device 90 an instruction to deactivate the image capturing function, the control section 31 causes an operation of the image capturing section 21 to be stopped. In a case where the control section 31 receives from the operation area restricting device 90 an instruction to activate the image capturing function, the control section 31 causes the image capturing section 21 to be activated.

(Production Device)

As illustrated in FIG. 1, the production device 40 includes an operating section 41, a sensor section 42, a drive section 43, a communication section 44, an abnormality reporting section 45, and a control section 46.

The operating section 41 receives an operation instruction from a worker, and is constituted by, for example, various types of buttons. The operating section 41 supplies the operation instruction to the control section 46. Examples of an operation instruction to be received by the operating section 41 encompass various well-known instructions such as activation instruction, stop instruction, and instruction to cancel abnormality reporting (trouble cancellation instruction).

The sensor section 42 includes various sensors for detecting the status of the production device 40, and the various sensors can be any well-known sensors. Examples of the wide variety of sensors included in the sensor section 42 encompass (i) a sensor, provided in the conveyance unit, which determines whether a workpiece exists and determines a location of the workpiece, (ii) a temperature sensor provided in the heating unit, (iii) a measuring sensor, provided in an inspection unit, which measures a physical quantity of a workpiece, (iv) a voltage sensor provided in a machine such as the production device 40, and (v) an electric current sensor.

The drive section 43 is intended for driving the production device 40, and is constituted by, for example, a motor. The communication section 44 communicates with the server device 60 via a wireless or wired connection.

The abnormality reporting section 45 is intended for reporting a worker that some type of abnormality has occurred. The abnormality reporting section 45 is constituted by, for example, a lamp and/or a speaker.

The control section 46 controls the members of the production device 40 all together. A control function of the control section 46 is realized by a processing device, such as a CPU (Central Processing Unit), executing a control program.

Specifically, in a case where an activation instruction is given to the operating section 41, the control section 46 causes the drive section 43 to drive. In a case where a stop instruction is given to the operating section 41, the control section 46 causes the drive section 43 to stop. In a case where an output signal transmitted from the sensor section 42 indicates outside a predetermined normal range, the control section 46 recognizes that abnormality has occurred, so that the control section 46 (i) causes the abnormality reporting section 45 to operate to carry out abnormality reporting and (ii) causes the drive section 43 to stop. In this case, the control section 46 stores a current time as an abnormality occurrence time. Examples of abnormality to be recognized by the control section 46 encompass: a failure of the production device 40; various kinds of trouble; and a defect of a product produced by the production device 40.

The control section 46 also determines, in accordance with information that indicates correspondences between the sensors and respective units to be measured by the sensors, a unit ID which identifies a unit in which abnormality occurred. In a case where trouble cancellation instruction is given to the operating section 41, the control section 46 causes the abnormality reporting section 45 to stop abnormality reporting.

The control section 46 generates a status signal in accordance with (i) a driving state of the drive section 43, (ii) an output signal transmitted from the operating section 41, and (iii) an output signal transmitted from the sensor section 42. Then, the control section 46 controls the communication section 44 so that the communication section 44 transmits the status signal to the server device 60. One specific example of the status signal to be generated by the control section 46 is an operation signal that (i) indicates, in a case where the drive section 43 is driving, that the drive section 43 is driving and (ii) indicates, in a case where the drive section 43 is stopped, that the drive section 43 is stopped. Another specific example of the status signal to be generated by the control section 46 is a trouble signal that (i) indicates, in a case where the abnormality reporting section 45 is operating, that there is a trouble and (ii) indicates, in a case where the abnormality reporting section 45 is stopped, that abnormality reporting is cancelled (abnormality reporting cancellation).

The control section 31 also transmits, to the server device 60 in response to a request from the server device 60, (i) a machine ID which identifies the production device 40 in which the control section 46 is included, (ii) a unit ID which identifies a unit in which abnormality occurred, and (iii) a time at which the abnormality occurred (abnormality occurrence time).

(Server Device)

As illustrated in FIG. 1, the server device 60 includes a communication section 61, an image storing section 62, a work record accumulating section 63, a check result storing section 64, a worker information storing section 65, a related information storing section 66, a line information storing section 67, and a control section 70.

The communication section 61 communicates with the input-output terminal 10, the image capturing device 20, the production device 40, the lot managing device 50, and the display terminal 80.

The image storing section 62 stores therein image data of an image which has been captured by the image capturing device 20. The image storing section 62 can store therein the image data such that each piece of image data is associated with (i) a corresponding worker ID which identifies a worker wearing the image capturing device 20 which outputted said each piece of image data and (ii) a corresponding camera ID which identifies the image capturing device 20. The image data stored in the image storing section 62 is updated by the control section 70.

The work record accumulating section (input information storing section) 63 accumulates (stores) a work record. FIG. 4 is a view illustrating an example work record accumulated in the work record accumulating section 63. As illustrated in FIG. 4, the work record accumulating section 63 accumulates a work record in which each work is associated with (i) a worker ID that indicates a worker who carried out the work, (ii) a machine ID that identifies a production device 40 by which the work was carried out, (iii) a work start time at which the work started, (iv) a work end time at which the work was ended, (v) a type of the work, and (iv) contents of action (work contents).

The check result storing section (input information storing section) 64 stores check information that shows information on each of check items. FIG. 5 is a view illustrating example information stored in the check result storing section 64. As illustrated in FIG. 5, the check result storing section 64 stores check information in which each check item is associated with (i) a check item name, (ii) a checker ID that identifies a checking worker, (iii) a check time, and (iv) a check result.

The worker information storing section 65 stores worker information which is information related to a worker. FIG. 6 is a view illustrating example worker information stored in the worker information storing section 65. As illustrated in FIG. 6, the worker information storing section 65 stores worker information in which each production line is associated with (i) a line name that identifies the production line, (ii) a place name (location name) of a location at which the production line is provided, (iii) a worker ID (worker identification information, particular worker identification information) that identifies a worker carrying out work in the production line, (iv) a worker name, (v) a camera ID that identifies an image capturing device 20 worn by the worker, and (vi) an main worker flag (particular worker identification information) assigned only to a main worker in charge (particular worker) in the production line. The worker information storing section 65 stores, for each working period, the worker information as illustrated in FIG. 6. The worker information stored in the worker information storing section 65 is created in advance by a manager that manages attendance.

The related information storing section 66 stores related information related to the production device 40 and to a written production instruction. Specifically, the related information storing section 66 stores, for each production device 40, a machine ID (machine identification information) which identifies the production device 40 and machine-related information related to the production device 40 such that the machine ID and the machine-related information are associated with each other. Examples of the machine-related information encompass specifications of the production device 40, a user manual for the production device 40, a solution to trouble, and a maintenance procedure. The related information storing section 66 also stores, for each written production instruction, an order ID (object identification information) which identifies the written production instruction and product-related information (object-related information) related to a product and a lot indicated by the written production instruction, such that the order ID and the product-related information are associated with each other. Examples of the product-related information encompass product specifications, product performance, and product standards. The information stored in the related information storing section 66 is created in advance by a manager or the like.

The line information storing section 67 stores information (line information) related to a production line. FIG. 7 is a view illustrating example line information stored in the line information storing section 67. As illustrated in FIG. 7, the line information storing section 67 stores line information in which each production line is associated with (i) a line name that identifies the production line, (ii) a place name (location name) of a place at which the production line is provided, and (iii) a machine ID for identifying a production device 40 provided in the production line. The line information stored in the line information storing section 67 is created in advance by a manager.

The control section 70 controls the members of the server device 60 all together. A control function of the control section 70 is realized by a processing device, such as a CPU (Central Processing Unit), executing a control program.

For example, the control section 70 functions as a management section for managing at least one of the following: (i) image data received from an image capturing device 20 and (ii) information (generated information) generated in accordance with an image captured. That is, the control section 70 causes the image data, which has been received from the image capturing device 20, to be stored in the image storing section 62. In addition, the control section 70 can create a work record based on information received from the image capturing device 20 and/or the input-output terminal 10, and then cause the work record to be stored in the work record accumulating section 63. Likewise, the control section 70 can create check information based on information received from the image capturing device 20 and/or the input-output terminal 10, and then cause the check information to be stored in the check result storing section 64. In addition, the control section 70 can control the communication section 61 so that the communication section 61 transmits, in accordance with a status signal received from a production device 40, an instruction to the image capturing device 20. In addition, the control section 70 can (i) search, in accordance with a search instruction transmitted from the display terminal 80, for information stored in the image storing section 62 and then (ii) supply a search result to the display terminal 80. Concrete examples of a process of the control section 70 will be described later.

(Display Terminal)

As illustrated in FIG. 1, the display terminal 80 includes (i) a keyboard 81 and a mouse 82 serving as input sections, (ii) a display section 83, (iii) a communication section 84, and (iv) a control section 85.

The display section 83 is a rectangular-shaped display. The communication section 84 communicates with the server device 60 via a wired or wireless connection.

The control section 85 controls the member s of the display terminal 80 all together. A control function of the control section 85 is realized by a processing device, such as a CPU (Central Processing Unit), executing a control program. For example, a worker or a manager can input a search request that a search for an image stored in the image storing section 62 of the server device 60 be carried out. Then, the control section 85 (i) controls the communication section 84 so that the communication section 84 transmits the search request to the server device 60 and (ii) causes a search result screen, which has been received from the server device 60, to be displayed on the display section 83.

(Concrete Examples of Work Management System)

The following description will discuss concrete examples of a process carried out by the work management system 1 in accordance with the present embodiment. Note that the concrete examples in the following descriptions can be carried out in combination as needed.

Concrete Example 1: Process of Creating Moving-Image Work Standard (Problem to be Solved by Concrete Example 1)

Figure 8:
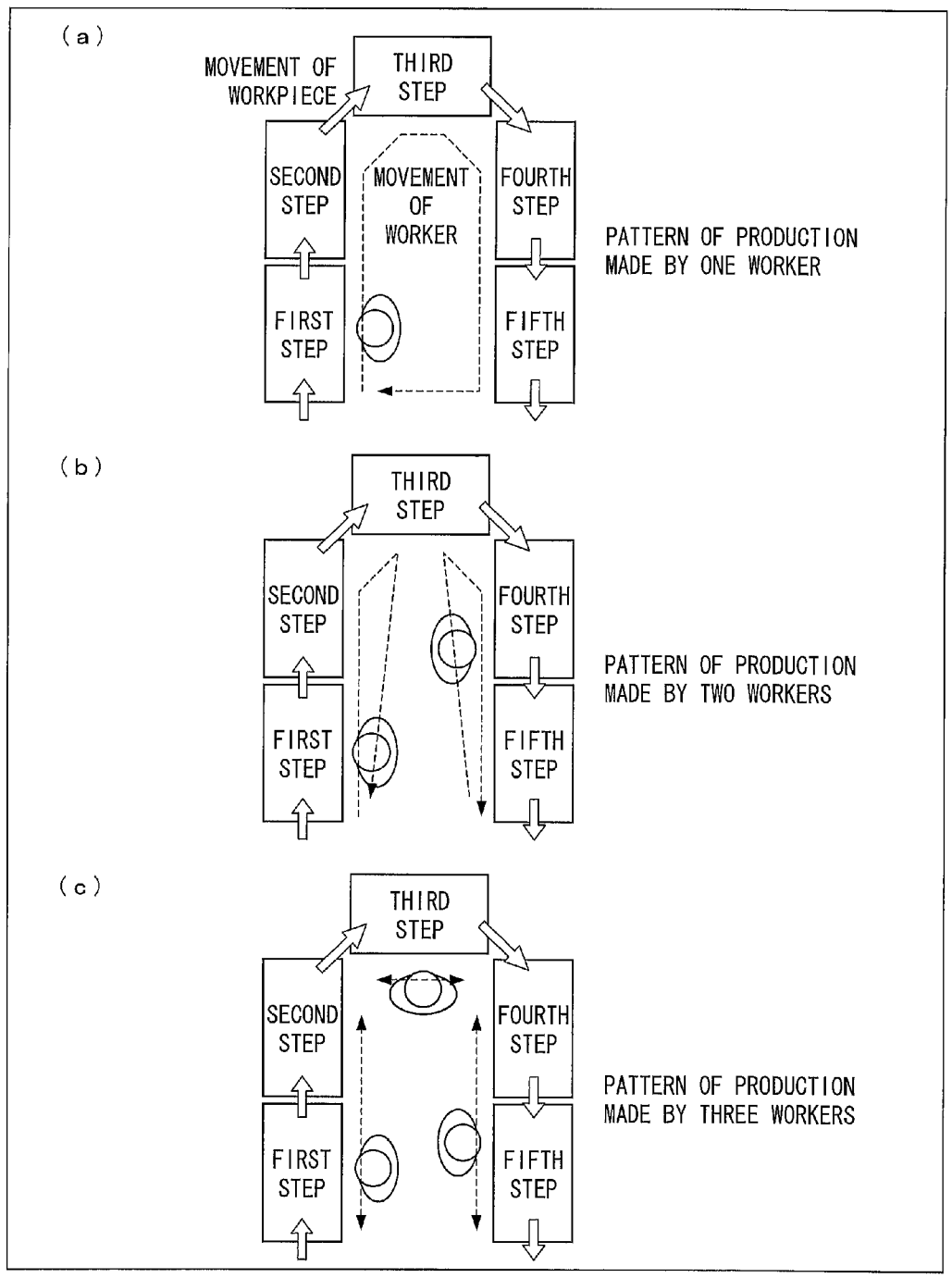
FIG. 8 is a view illustrating movements of workers and workpieces in a conventional cell production system.

Conventionally, written work standard that show work procedures are made for use in a production site. Meanwhile, in recent years, an increasing number of sites in the assembling and manufacturing industry are employing a cell production system in which one or several workers are in charge of an entire process from component mounting to assembling to processing to inspecting. Note that the cell production system is a production system in which work is carried out on a line (called "cell") on which component and tools are arranged in the shape of the letter U or the like. The cell production system is suitable for small-volume production in great varieties. Therefore, if a written work standard is to be created for each product to be produced, then it is necessary to prepare a large number of written work standards in advance. Note that, with the cell production system, it is possible to change, as necessary, the number of workers to be assigned to a cell, depending on a required amount of production. In this case, work to be carried out by each worker varies, depending on the number of workers assigned to the cell. This necessitates preparation of written work standards according to varying numbers of workers assigned to the cell. FIG. 8 is a view illustrating movements of workers and workpieces in cells, in each of which a first step through a fifth step are arranged in the shape of the letter U. (a) of FIG. 8 illustrates a case where a single worker is working. (b) of FIG. 8 illustrates a case where two workers are working. (c) of FIG. 8 illustrates a case where three workers are working. As illustrated in FIG. 8, work to be carried out by each worker varies, depending on the number of workers assigned to the cell. According to the cell production system, a significantly large number of patterns of work are thus carried out by workers. This causes the number of written work standards corresponding to respective patterns to be large as well. Therefore, it is difficult to create a written work standard for each product and each pattern according to the number of workers assigned to a cell.

Under the circumstances, instead of paper-based written work standards, moving-image work standards (video-based work standards) for showing work procedures by moving images are created in recent years. As described earlier, however, an image capturing device fixed to a given location of a production site easily has a blind spot. In order to reduce as many blind spots as possible, it is unfortunately necessary to provide a large number of image capturing devices. In a case of the cell production system, in particular, workers often carry out their work while facing varying directions. This results in a significantly large number of image capturing devices for capturing images of work ranges of the workers.

Figure 9:
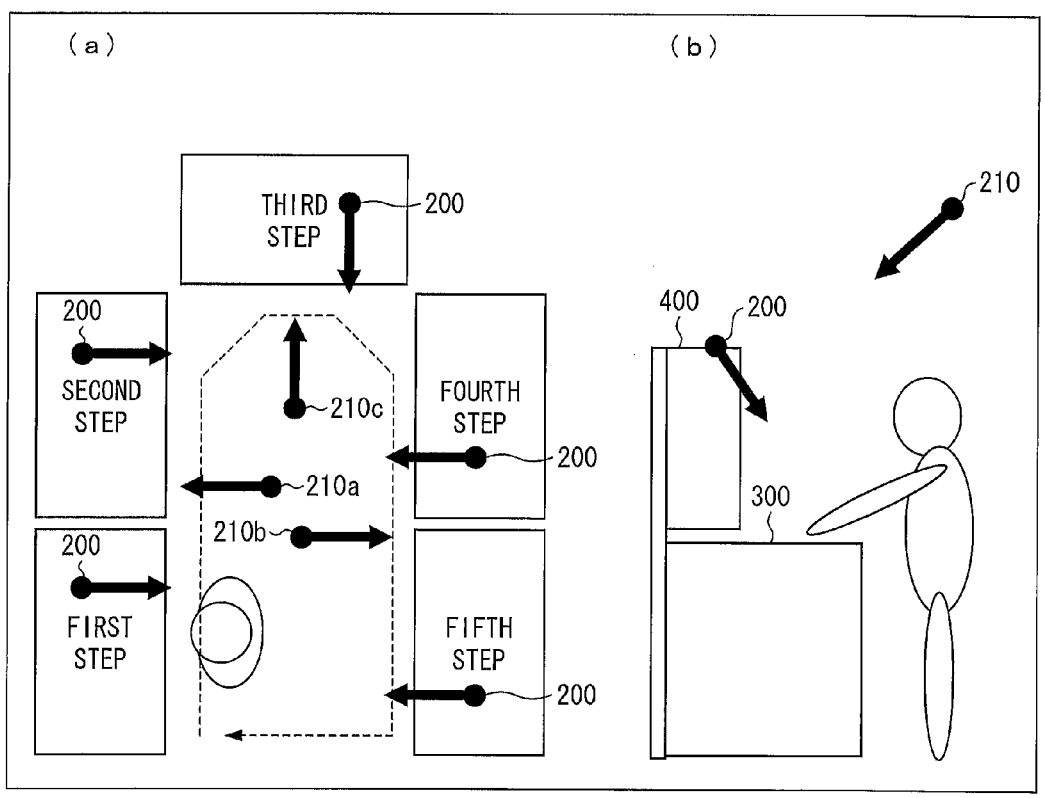
FIG. 9 is a view illustrating an example of how image capturing devices are provided in the conventional cell production system.

FIG. 9 illustrates an example of how image capturing devices are provided in a conventional cell production system. (a) of FIG. 9 shows an entire part of the cell production system. (b) of FIG. 9 illustrates one of the steps involved in the cell production system. According to the example of FIG. 9, (i) a first step through a fifth step are involved and (ii) each of the steps is provided with a workbench 300 and with a component shelf 400 in which components for use in work are stored. According to the cell production system illustrated in FIG. 9, a workbench 300 and a component shelf 400 are included in a work range of each worker. In order to capture images of work on the workbenches 300, a single image capturing device 200 is provided for each workbench 300 so as to be located above the workbench 300. Note, however, that the image capturing device 200 is fixed to such a position as to capture an image of the workbench 300. This makes it impossible to capture an image of the component shelf 400. Therefore, another image capturing device 200 is provided at a position so that the image of the component shelf 400 can also be captured. According to the cell production system illustrated in FIG. 9, the respective component shelves 400 of the first step and of the second step are facing in the same direction. Therefore, a single image capturing device 210a, which can simultaneously capture images of the respective component shelves 400 of the first step and of the second step, is provided. Likewise, the respective component shelves 400 of the fourth step and of the fifth step are facing in the same direction. Therefore, a single image capturing device 210b, which can simultaneously capture images of the component shelves 400 of the fourth step and of the fifth step, is provided. Since the component shelf 400 of the third step is facing in a direction different of the directions of the other component shelves 400, an additional image capturing device 210c is prepared. In the case of the cell production system illustrated in FIG. 9, a total of eight image capturing devices 200 and 210 are thus required for capturing the images of the work ranges of the workers. In addition, if an additional overhead image capturing device(s) for checking the movements of the workers is provided, then the number of image capturing devices increases.

Since the cell production system is suitable for production in great varieties, a layout may be frequently changed according to a type of product to be produced. In such a case, positions at which to provide the image capturing devices 200 and 210 need to be adjusted accordingly.

As illustrated in FIG. 9, an image capturing device 200 to capture an image of a region above a workbench 300 also captures an image of a worker's face together with the region. This causes the worker to have a psychological burden of being image-captured.

Concrete Example 1 is to solve such problems, and is intended to provide a work management system capable of easily creating, without causing an increase in the number of image capturing devices, a plurality of patterns of moving-image work standards while less imposing a psychological burden on a worker(s).

(Configuration of Work Management System of Concrete Example 1)

According to the work management system 1 of Concrete Example 1, a moving-image work standard is created by giving an image capturing device 20 to a worker who is proficient at work.

Figure 10:
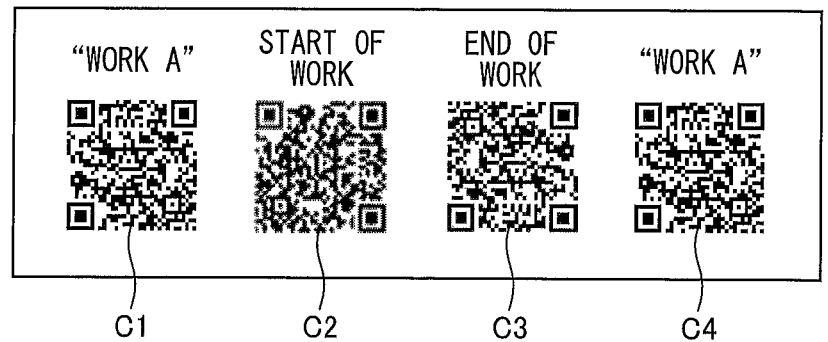
FIG. 10 is a view illustrating an example two-dimensional code table prepared in advance in Concrete Example 1 of the work management system illustrated in FIG. 1.

In addition, a two-dimensional code table as illustrated in FIG. 10 is created in advance for each work of which a moving-image work standard is to be created. FIG. 10 illustrates a two-dimensional code table corresponding to work A. In FIG. 10, two-dimensional codes C1 and C4, which are located at respective both sides, are each a code uniquely assigned to a corresponding work, and are each a work type code that indicates the work. In a case where a plurality of workers work in a cell production system, work type codes are uniquely set for work carried out by each worker. For example, in a case where work A is carried out by three workers, (i) work assigned to a first worker is provided with a work type code that indicates "work A-1," (ii) work assigned to a second worker is provided with a work type code that indicates "work A-2," and (iii) work assigned to a third worker is provided with a work type code that indicates "work A-3."

A second two-dimensional code C2 from the left is an at-start shielded code that is shielded by a hand or the like in a case where work is to be started. In a case where a worker is to start the work, the worker places his/her hand over the two-dimensional code C2 (serving as an at-start shielded code) while looking at the two-dimensional code table (see (a) of FIG. 11).

A third two-dimensional code C3 from the left is an at-end shielded code that is shielded by a hand or the like in a case where work is ended. In a case where the worker ends the work, the worker places his/her hand over the two-dimensional code C3 (serving as an at-end shielded code) while looking at the two-dimensional code table (see (b) of FIG. 11).

Figure 12:
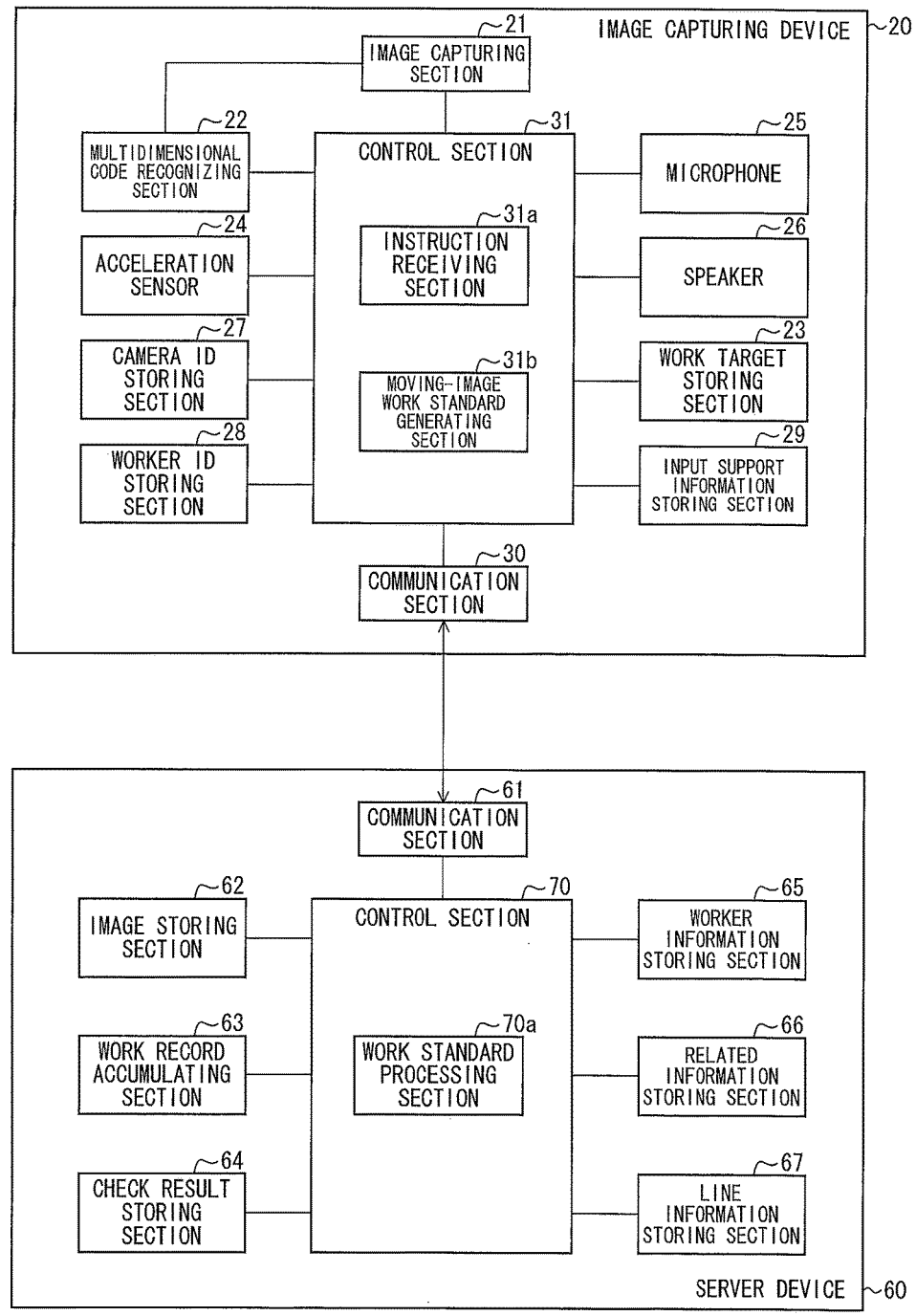
FIG. 12 is a block diagram illustrating internal configurations of a control section of an image capturing device and a control section of a server device which are included in a work management system in accordance with Concrete Example 1.

FIG. 12 is a block diagram illustrating internal configurations of a control section of an image capturing device and a control section of a server device which are included in the work management system in accordance with Concrete Example 1. As illustrated in FIG. 12, a control section 31 of the image capturing device 20 includes an instruction receiving section 31a and a moving-image work standard generating section 31b. A control section 70 of the server device 60 includes a work standard processing section 70a.

According to Concrete Example 1, an input support information storing section 29 of the image capturing device 20 stores therein, for each work, (i) first input support information which supports input of a start instruction to start said each work and (ii) second input support information which supports input of an end instruction to end said each work.

The first input support information is information in which a first combination of (a) two-dimensional codes C1 and C4, located at respective both sides of a two-dimensional code table as illustrated in FIG. 10, and (b) a two-dimensional code C3 serving as an at-end shielded code is associated with a creation start instruction to which a work ID that identifies corresponding work is added.

The second input support information is information in which a second combination of (a) the two-dimensional codes C1 and C4, located at the respective both sides of the two-dimensional code table as illustrated in FIG. 10, and (b) a two-dimensional code C2 serving as an at-start shielded code is associated with a creation end instruction to which the work ID that identifies the corresponding work is added.

The instruction receiving section 31a receives, in accordance with the first input support information and the second input support information, (i) the creation start instruction to start creating a moving-image work standard and (ii) the creation end instruction to end creation of the moving-image work standard. Specifically, the instruction receiving section 31a determines which of combinations of input support information stored in the input support information storing section 29 matches a combination of two-dimensional codes which have been recognized by a multidimensional code recognizing section 22 from a latest frame. Then, in a case where any combination of the input support information matches the combination of the two-dimensional coeds, the instruction receiving section 31a receives an instruction in accordance with the input support information.

Then, the instruction receiving section 31a supplies the instruction to the moving-image work standard generating section 31b. Note, however, that the instruction receiving section 31a determines, in accordance with a work status flag, whether or not to supply the instruction. Specifically, only in a case where a work status flag shows "not working," the instruction receiving section 31a outputs the creation start instruction and changes the work status flag to "working." In addition, only in a case where the work status flag shows "working," the instruction receiving section 31a outputs the creation end instruction and changes the work status flag to "not working."

Figure 11:
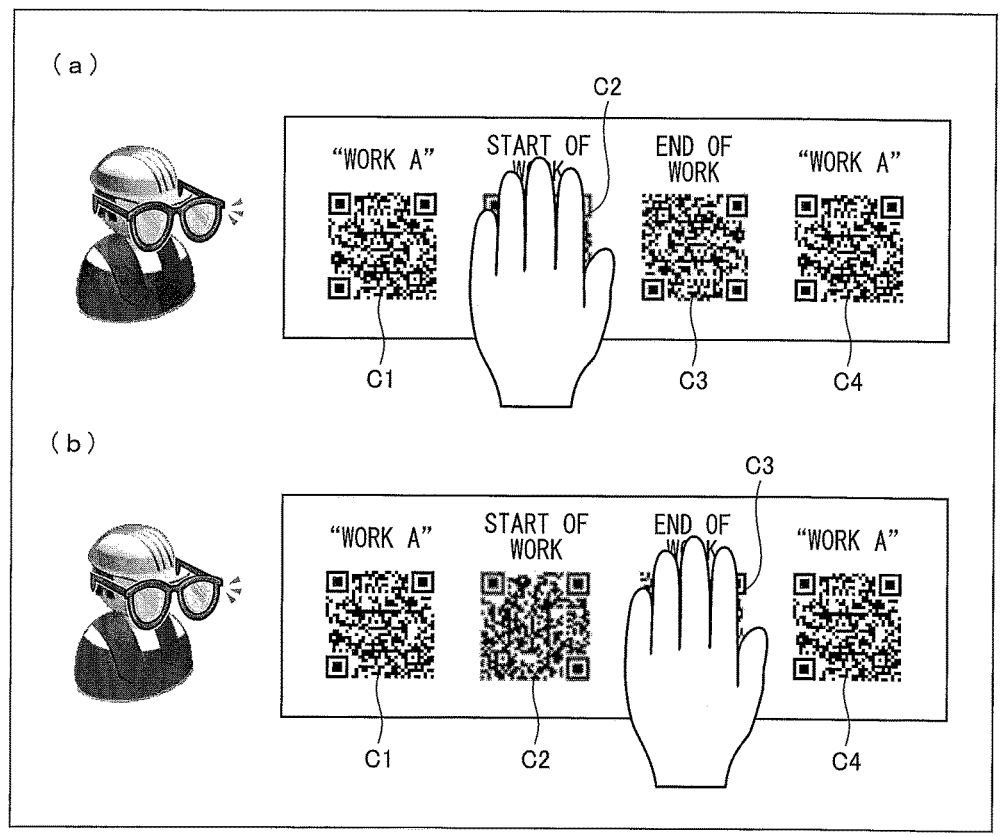
FIG. 11 is a view illustrating a movement of a worker which movement is made with respect to the two-dimensional code table illustrated in FIG. 10. (a) of FIG. 11 illustrates the movement made when work is to be started. (b) of FIG. 11 illustrated the movement made when the work is ended.

As has been described, in a case where the worker is to start the work, the worker places his/her hand over the at-start shielded code as illustrated in (a) of FIG. 11. In this case, the two-dimensional code C2 serving as an at-start shielded code is hidden by the worker's hand. Therefore, the multidimensional code recognizing section 22 of the image capturing device 20, which captures an image of the worker's hands, recognizes, from a captured frame, the combination of (i) the two-dimensional codes C1 and C4 located at the respective both sides of the two-dimensional code table and (ii) the two-dimensional code C3 serving as an at-end shielded code (which combination identical to the first combination). Therefore, the instruction receiving section 31a receives, in accordance with the first input support information, a creation start instruction corresponding to the first combination. Note that, to the creation start instruction, a work ID corresponding to the two-dimensional code table is added.

Likewise, in a case where the worker ends the work, the worker places his/her hand over the at-end shielded code as illustrated in (b) of FIG. 11. In this case, the two-dimensional code C3 serving as an at-end shielded code is hidden by the worker's hand. Therefore, the multidimensional code recognizing section 22 of the image capturing device 20, which captures an image of the worker's hands, recognizes, from a captured frame, the combination of (i) the two-dimensional codes C1 and C4 located at the respective both sides of the two-dimensional code table and (ii) the two-dimensional code C2 serving as an at-start shielded code (which combination identical to the second combination). Therefore, the instruction receiving section 31a receives, in accordance with the second input support information, a creation end instruction corresponding to the second combination. Note that, to the creation end instruction, the work ID corresponding to the two-dimensional code table is added.

Upon reception of the creation start instruction from the instruction receiving section 31a, the moving-image work standard generating section 31b starts recording a moving image captured by the image capturing section 21. In this case, the work ID added to the creation start instruction is added to moving image data thus recorded. Upon reception of the creation end instruction from the instruction receiving section 31a, the moving-image work standard generating section 31b (i) stops the recording of the moving image data to which the work ID is added, which work ID is identical to the work ID added to the creation end instruction and (ii) generates, as a moving-image work standard, the moving image data which has been recorded. Then, the moving-image work standard generating section 31b controls a communication section 30 so that the communication section 30 transmits, to the server device 60, the moving-image work standard to which the work ID is added. In this case, it is possible to add, to the moving-image work standard to be transmitted, at least one of (i) a worker ID stored in a worker ID storing section 28 and (ii) a camera ID stored in a camera ID storing section 27.

The work standard processing section 70a of the server device 60 stores, in an image storing section 62, the moving-image work standard received from the image capturing device 20. In so doing, the work standard processing section 70a associates, with the moving-image work standard to be stored, (i) the work ID added to the moving-image work standard, (ii) a worker ID, and (iii) a camera ID.

The work standard processing section 70a also receives, from an input-output terminal 10 or a display terminal 80, a delivery request which requests, by specifying a work ID, delivery of a moving-image work standard. Then, the work standard processing section 70a (i) reads out, from the image storing section 62, a moving-image work standard corresponding to the work ID specified by the delivery request and then (ii) supplies, to the terminal which transmitted the delivery request, the moving-image work standard thus read out. This allows the worker to check the moving-image work standard.

(Flow of Process in Concrete Example 1)

Figure 13:
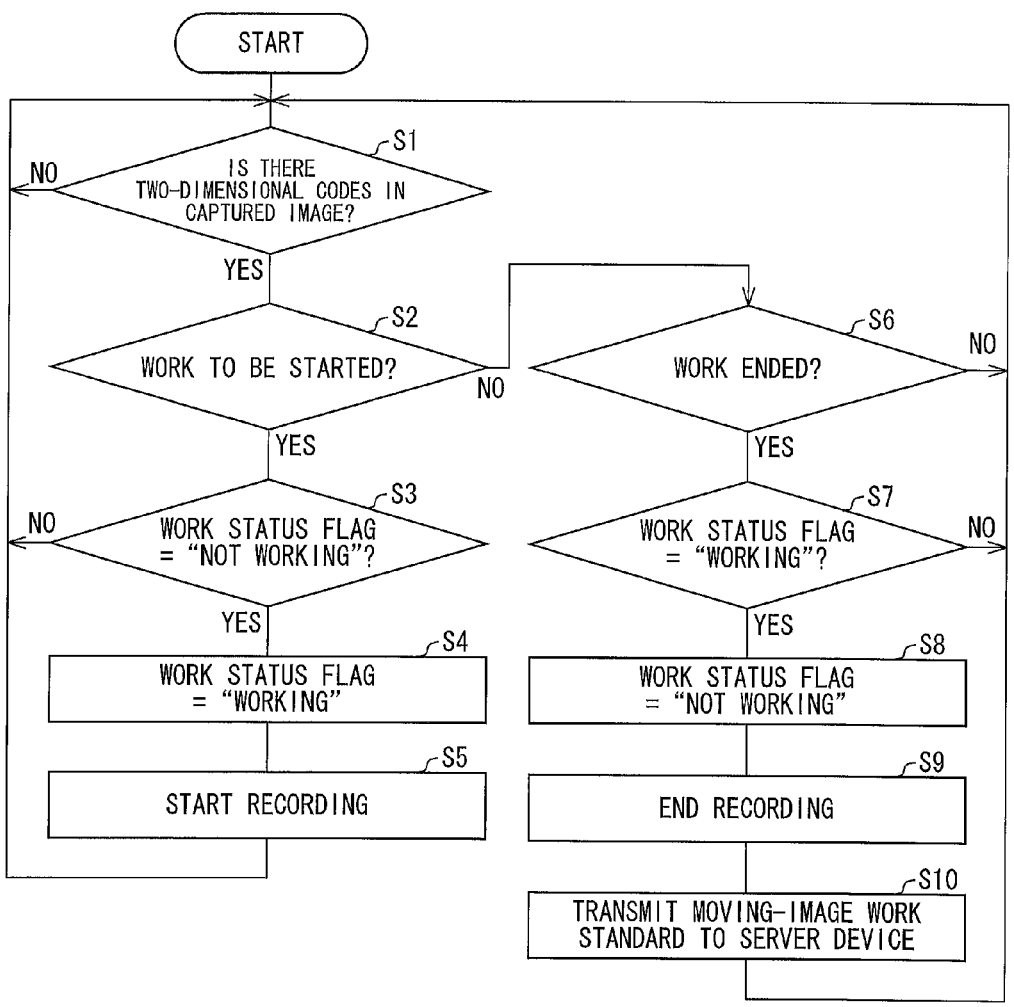
FIG. 13 is a flowchart illustrating a flow of a process carried out by the image capturing device of the work management system in accordance with Concrete Example 1.

A flow of a process carried out by the work management system 1 in accordance with Concrete Example 1 will be described next. FIG. 13 is a flowchart illustrating a flow of a process carried out by the image capturing device 20 in accordance with Concrete Example 1.

First, a worker, who is assigned the image capturing device 20, puts on the image capturing device 20 and then turns on the image capturing device 20. This causes the multidimensional code recognizing section 22 of the image capturing device 20 to start a process of recognizing two-dimensional codes contained in a frame captured by the image capturing section 21. Note that a work status flag of the instruction receiving section 31a is set so that, when the image capturing device 20 is turned on, the work status flag shows "not working."

Then, the instruction receiving section 31a determines whether or not two-dimensional codes are recognized by the multidimensional code recognizing section 22 (step S1). The instruction receiving section 31a can determine, by determining whether or not the two-dimensional codes have been outputted from the multidimensional code recognizing section 22, whether or not the two-dimensional codes have been recognized by the multidimensional code recognizing section 22. In a case of No in the step S1, the step S1 is repeated with respect to a following frame.

In a case where the two-dimensional codes are recognized (Yes, in the step S1), the instruction receiving section 31a determines whether or not a combination of the two-dimensional codes which are recognized from a single frame by the multidimensional code recognizing section 22 matches the first combination (step S2). Since the first combination is associated with the creation start instruction, what is determined in the step S2 means whether or not creation of a moving-image work standard is to be started.

Note that, as has been described, in a case where the worker places his/her hand over the at-start shielded code of the two-dimensional code table, the combination of the two-dimensional codes C1 and C4 (located at the respective both sides of the two-dimensional code table) and the two-dimensional code C3 serving as an at-end shielded code (i.e. combination identical to the first combination) is recognized. Only this case results in Yes in the step S2. For example, Yes is not determined in the step S2 in a case where (i) the two-dimensional codes C3 and C4, which are the two codes on the right side of the two-dimensional code table, are captured in an end part of an area captured by the image capturing section 21 or (ii) all of the four two-dimensional codes C1 to C4 of the two-dimensional code table are captured. In other words, Yes is determined in the step S2 only in a case where the two-dimensional code table is captured while only the at-start shielded code is hidden by the hand or the like. Such a state rarely occurs unless the worker intends it. Therefore, it is possible to prevent the image capturing device 20 from malfunctioning.

In a case of Yes in the step S2, the instruction receiving section 31a determines whether or not the work status flag shows "not working" (step S3). In a case of No in the step S3, the step S1 is repeated with respect to a following frame. In a case of Yes in the step S3, on the other hand, the instruction receiving section 31a (i) changes the work status flag to "working" (step S4), (ii) reads out, from the input support information storing section 29, the creation start instruction corresponding to the first combination which the combination of the two-dimensional codes recognized by the multidimensional code recognizing section 22 are determined as matching in the step S3, and then (iii) supplies, to the moving-image work standard generating section 31b, the creation start instruction thus read out. Then, the moving-image work standard generating section 31b starts recording a moving image captured by the image capturing section 21 (step S5).

In a case of No in the step S2, on the other hand, the instruction receiving section 31a determines whether or not the combination of the two-dimensional codes recognized by the multidimensional code recognizing section 22 matches the second combination (step S6). Since the second combination is associated with the creation end instruction, what is determined in the step S6 means whether or not the creation of the moving-image work standard is to be ended. In a case of No in the step S6, the step S1 is repeated with respect to a following frame.

After the process in the step S5, the worker starts carrying out work. During the work, the image capturing section 21 continues to record a work range of the worker (e.g. an image of an area above a workbench 300, an image of a component shelf 40, and the like). Then, when the work is ended, the worker places his/her hand over the at-end shielded code of the two-dimensional code table. In so doing, a combination of the two-dimensional codes C1 and C4 (located at the respective both sides of the two-dimensional code table) and the two-dimensional code C2 serving as an at-start shielded code (combination identical to the second combination) is recognized. Only this case results in Yes in the step S6.

In a case of Yes in the step S6, the instruction receiving section 31a determines whether or not the work status flag shows "working" (step S7). In a case of No in the step S7, the step S1 is repeated with respect to a following frame. In a case of Yes in the step S7, the instruction receiving section 31a (i) changes the work status flag to "not working" (step S8), (ii) reads out, from the input support information storing section 29, the creation end instruction corresponding to the second combination which the combination of the two-dimensional codes recognized by the multidimensional code recognizing section 22 are determined as matching in the step S6, and then (iii) supplies, to the moving-image work standard generating section 31b, the creation end instruction thus read out. Then, the moving-image work standard generating section 31b ends the recording which is being carried out by the image capturing section 21 (step S9). Then, the moving-image work standard generating section 31b creates, as a moving-image work standard, moving image data obtained by the recording. Then, the moving-image work standard generating section 31b transmits, via the communication section 30, the moving-image work standard to the server device 60 (step S10). In so doing, the moving-image work standard generating section 31b adds, to the moving-image work standard to be supplied, respective work IDs added to the creation start instruction and to the creation end instruction.

Figure 14:
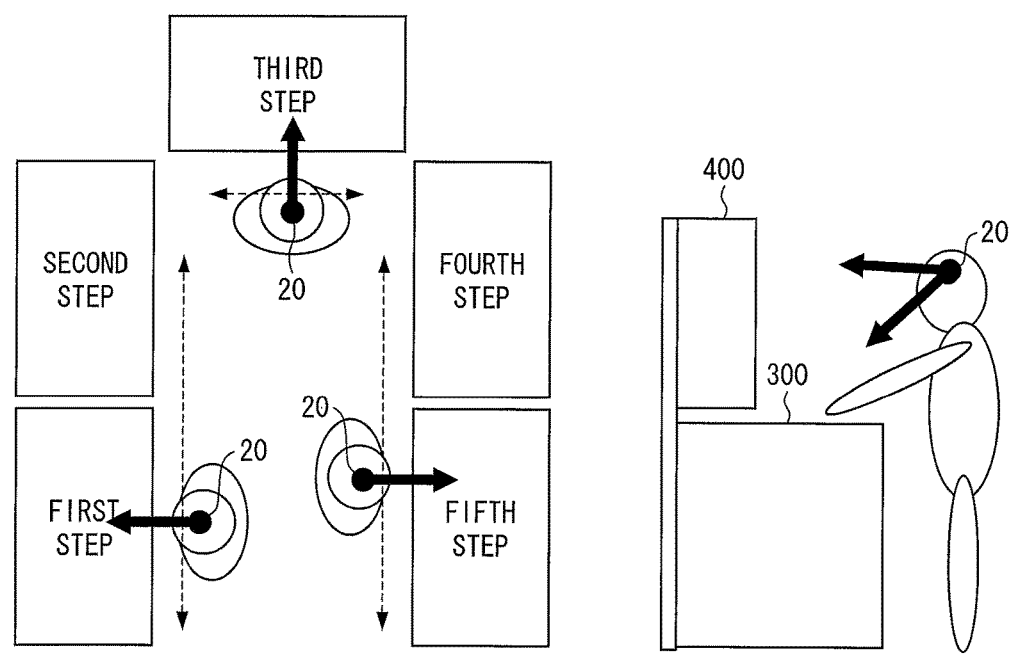
FIG. 14 is a view illustrating positions of image capturing devices in a cell production system in accordance with Concrete Example 1.

According to Concrete Example 1, since the worker wears an image capturing device 20 which captures a work range of the worker, it is possible to capture the work range with the use of a small number of image capturing devices 20. FIG. 14 illustrates how image capturing devices 20 are provided in a case where three workers carry out work in a cell production system. As illustrated in FIG. 14, since each worker wears a single image capturing device 20, all of a work range can be captured. This allows a moving-image work standard to be easily created without causing an increase in the number of image capturing devices 20. In addition, the image capturing devices 20 are provided so as to capture work ranges of the respective workers without capturing (particularly faces of) the workers themselves. This prevents the workers from having a psychological burden of being image-captured.

In a case where moving-image work standards are created in a plurality of patterns in which the number of workers in the cell production system varies, a moving-image work standard for work assigned to each worker can be easily created by providing each worker in the cell production system with a single image capturing device 20.

In addition, even in a case where the layout of the cell production system is changed, it is unnecessary, unlike the conventional fixed-type image capturing devices, to be concerned about positions at which to provide the image capturing devices 20. This is because the image capturing devices 20 are to be worn by the workers.

Therefore, it is possible to provide a work management system 1 capable of easily creating, without causing an increase in the number of image capturing devices, a plurality of patterns of moving-image work standards while less imposing a psychological burden on a worker(s).

Concrete Example 2: Variation of Concrete Example 1

Concrete Example 2 is a variation of Concrete Example 1. Therefore, only differences between Concrete Example 1 and Concrete Example 2 will be described below. In Concrete Example 1, the instruction receiving section 31a receives, in accordance with two-dimensional codes supplied from the multidimensional code recognizing section 22, a creation start instruction and a creation end instruction. According to Concrete Example 2, however, an instruction receiving section 31a receives a creation start instruction and a creation end instruction with the use of a sound.

The instruction receiving section 31a stores, in advance, sound patterns respectively corresponding to the creation start instruction and to the creation end instruction. Then, the instruction receiving section 31a receives the creation start instruction or the creation end instruction by checking, against the sound patterns, a sound inputted into a microphone 25. In this case, a worker can easily create a moving-image work standard by merely uttering a preset sound (e.g. "Start work A," "End work A," "Start the first step of work A," and "End the second step of work A," and the like).

Concrete Example 3: Variation of Concrete Example 1

Figure 15:
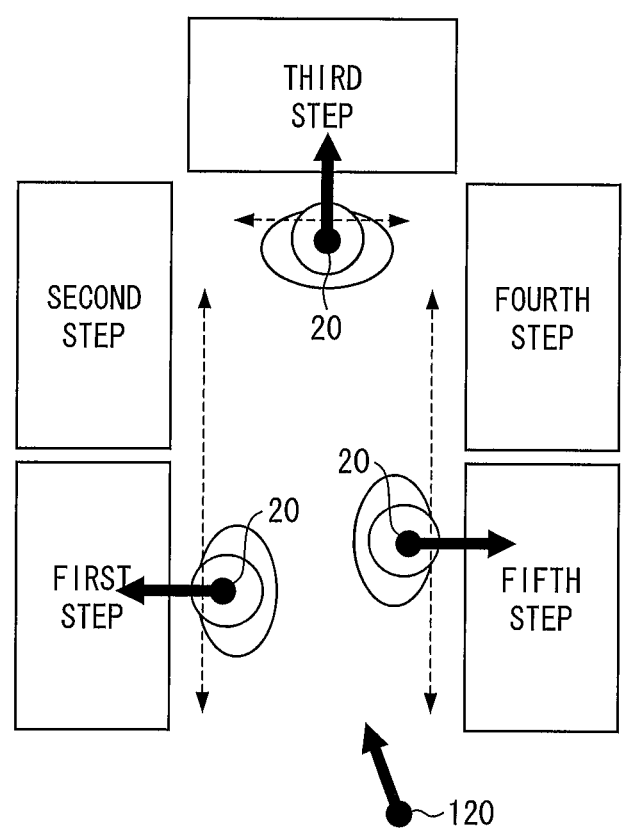
FIG. 15 is a view illustrating positions of image capturing devices in a cell production system in accordance with Concrete Example 3.

Concrete Example 3 is a variation of Concrete Example 1. Therefore, only differences between Concrete Example 1 and Concrete Example 3 will be described below. As illustrated in FIG. 15, a work management system 1 of Concrete Example 3 includes, in order to check a movement of a worker, an overhead camera 120 of a fixed type apart from image capturing devices 20 worn by respective workers.

In a case where an instruction receiving section 31a receives a creation start instruction, the instruction receiving section 31a controls a communication section 30 so that the communication section 30 transmits the creation start instruction not only to a moving-image work standard generating section 31b but also to a server device 60. In a case where the instruction receiving section 31a receives a creation end instruction, the instruction receiving section 31a controls the communication section 30 so that the communication section 30 transmits the creation end instruction not only to the moving-image work standard generating section 31*b* but also to the server device 60.

Then, a work standard processing section 70*a* of the server device 60 (i) obtains, from the overhead camera, a moving image (downward-perspective moving image) recorded from (a) a time point at which the creation start instruction was received from the image capturing device 20 to (b) a time point at which the creation end instruction was received and (ii) stores, in an image storing section 62, the downward-perspective moving image thus obtained in association with a moving-image work standard.

In this way, it is possible to check a work range of a worker as well as check a movement of the worker.

Concrete Example 4: Variation of Concrete Example 1

Concrete Example 4 is a variation of Concrete Example 1. Therefore, only differences between Concrete Example 1 and Concrete Example 4 will be described below. In Concrete Example 4, a moving-image work standard generating section 31*b* carries out, in addition to carrying out the process described in Concrete Example 1, process as follows: (i) in a case where the moving-image work standard generating section 31*b* receives a creation start instruction, the moving-image work standard generating section 31*b* starts recording a sound inputted into a microphone 25 and (ii) in a case where the moving-image work standard generating section 31*b* receives a creation end instruction, the moving-image work standard generating section 31*b* stops recording the sound. Then, the moving-image work standard generating section 31*b* adds, to a moving-image work standard, the sound data thus recorded. Then, the moving-image work standard generating section 31*b* transmits the sound data to the server device 60. In this way, a worker, who creates a moving-image work standard, can create, by carrying out work while uttering a note of caution, a moving-image work standard to which a sound with a note of caution is added.

A work standard processing section 70*a* of the server device 60 stores, in the image storing section 62, the moving-image work standard and the sound data, which have been received from the image capturing device 20, in association with each other. In addition, in a case where the work standard processing section 70*a* receives a delivery request, the work standard processing section 70*a* delivers the moving-image work standard and the sound data in such a format that the moving-image work standard and the sound data can be synchronized.

Concrete Example 5: Variation of Concrete Example 1

Concrete Example 5 is a variation of Concrete Example 1. Therefore, only differences between Concrete Example 1 and Concrete Example 5 will be described below. In Concrete Example 5, a work standard processing section 70*a* of a server device 60 obtains, in advance for each work of which a work standard is to be created, work standard information that is associated with a work ID and with a worker ID. For example, the server device 60 only needs to obtain work standard information which has been supplied by a manager via an external device such as an input-output terminal 10.

In addition, in Concrete Example 5, in a case where a moving-image work standard generating section 31*b* of an image capturing device 20 transmits a moving-image work standard to the server device 60, the moving-image work standard generating section 31*b* adds, to the moving-image work standard, (i) a work ID and (ii) a worker ID stored in a worker ID storing section 28.

When the work standard processing section 70*a* of the server device 60 receives the moving-image work standard from the image capturing device 20, the work standard processing section 70*a* determines whether or not the work ID and the worker ID added to the moving-image work standard match the work standard information obtained in advance. Then, only in a case where the work ID and the worker ID match the work standard information, the work standard processing section 70*a* stores the moving-image work standard in an image storing section 62.

In this way, the following is true: In a case where an image capturing device 20 is given to a worker who is not to create a moving-image work standard, the work standard processing section 70*a* does not store moving-image work standard in the image storing section 62 even if the moving-image work standard is accidentally transmitted from the image capturing device 20 to the server device 60 due to a malfunction. This prevents any moving-image work standard from being unintentionally accumulated in the server device 60.

Concrete Example 6: Process of Setting Standard Time (Problem to be Solved by Concrete Example 6)

Conventionally, in a production site, a standard time of each work is set in order to make out a production schedule. In general, a manager measures a work time while examining a worker's work near the worker. A standard time of the work is set based on the work time thus measured.

However, a work time varies depending on a level of a worker's skill. Accordingly, in order to set a standard time at a production site where a plurality of workers having different levels of skills work, it is necessary to measure a work time with respect to each of the plurality of workers, and consequently it takes a lot of trouble to set a standard time. Furthermore, a work time varies also depending on daily improvement in the work, and it takes a lot of trouble to measure a work time frequently.

A possible solution to this problem is, as in Patent Literatures 1 and 2, to provide a production site with an image capturing device, checking a moving image captured by the image capturing device to calculate a work time of each worker, thereby setting a standard time. However, in this solution, there is a case where a fixed-type image capturing device has many blind spots and consequently cannot accurately capture an image of a work range of a worker. In such a case, it is difficult to determine when a work starts and when the work ends.

Concrete Example 6 is to solve this problem and is intended to provide a work management system capable of easily setting a standard time by accurately capturing an image of a work range of a worker.

(Configuration of Work Management System of Concrete Example 6)

Also in a work management system 1 in accordance with Concrete Example 6, a two-dimensional code table as described in Concrete Example 1 with reference to FIG. 10 is created in advance. In a case where a worker is to start work, the worker places his/her hand over a two-dimensional code C2 which is an at-start shielded code, while looking at the two-dimensional code table (see (a) of FIG.

11). Similarly, in a case where the worker ends the work, the worker places his/her hand over a two-dimensional code C3 which is an at-end shielded code, while looking at the two-dimensional code table (see (b) of FIG. 11). In Concrete Example 6, the image capturing device 20 is assigned to each worker.

Figure 16:
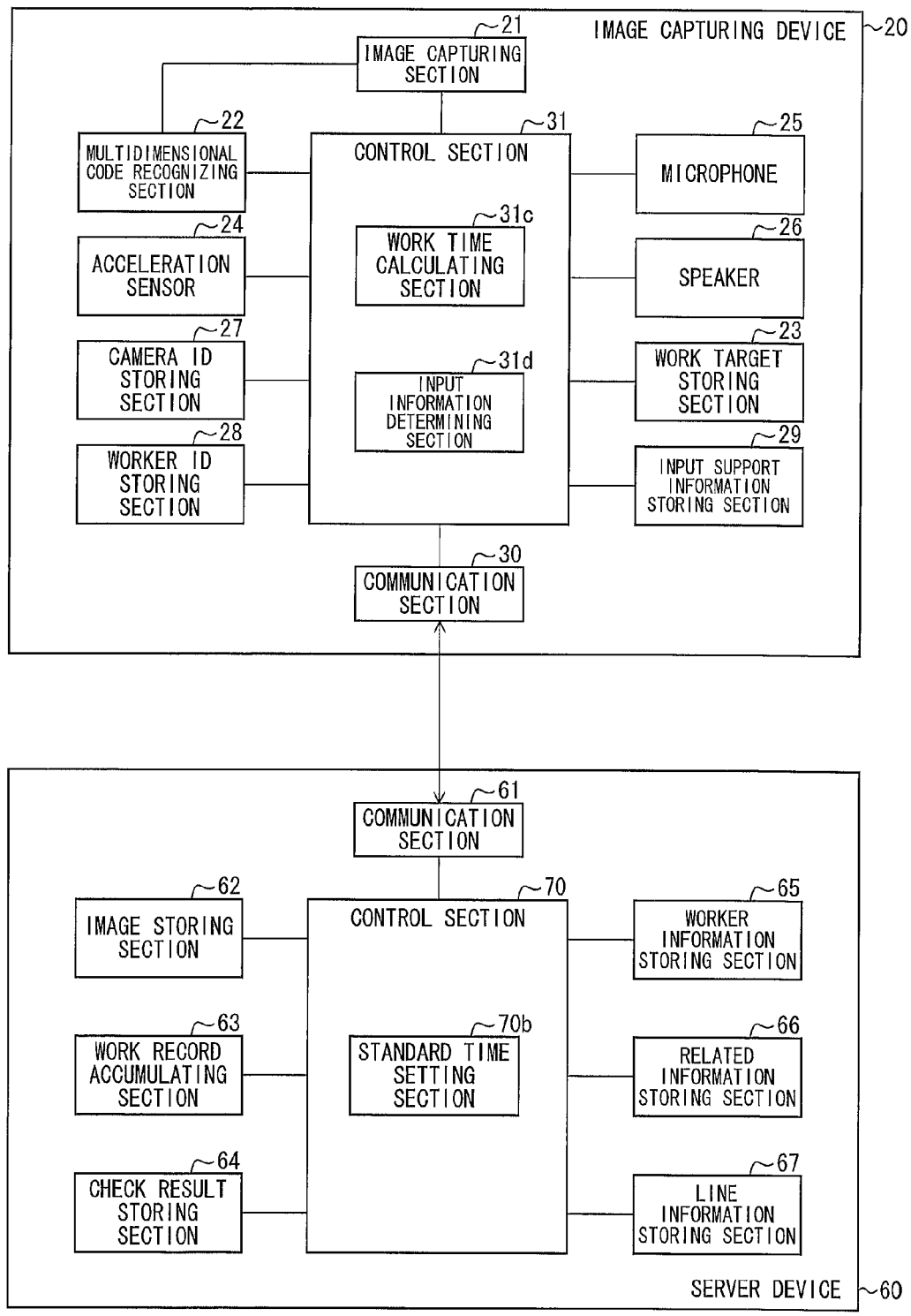
FIG. 16 is a block diagram illustrating internal configurations of a control section of an image capturing device and a control section of a server device which are included in a work management system in accordance with Concrete Example 6.

FIG. 16 is a block diagram illustrating internal configurations of a control section of an image capturing device and a control section of a server device which are included in the work management system in accordance with Concrete Example 6. As illustrated in FIG. 16, a control section 31 of an image capturing device 20 includes an input information determining section 31d and a work time calculating section 31c. A control section 70 of a server device 60 includes a standard time setting section 70b.

An input support information storing section 29 of Concrete Example 6 stores therein, for each work, third input support information which supports input of a work start time and fourth input support information which supports input of a work end time.

The third input support information is information in which a third combination of (i) two-dimensional codes C1 and C4 located at respective both sides of a two-dimensional code table as illustrated in FIG. 10 and (ii) a two-dimensional code C3 serving as an at-end shielded code is associated with a third algorithm. The third algorithm is an algorithm in accordance with which (i) a current time is set as a work start time and (ii) a work time calculating instruction, including the work start time and a work ID that identifies a corresponding work, is set as input information.

The fourth input support information is information in which a fourth combination of (i) the two-dimensional codes C1 and C4 located at the respective both sides of the two-dimensional code table as illustrated in FIG. 10 and (ii) a two-dimensional code C2 serving as an at-start shielded code is associated with a fourth algorithm. The fourth algorithm is an algorithm in accordance with which (i) a current time is set as a work end time and (ii) a work time calculating instruction, including the work end time and the work ID that identifies the corresponding work, is set as the input information.

The input information determining section 31d determines input information on a basis of (i) a combination of two-dimensional codes which are outputted for each frame from the multidimensional code recognizing section 22 and (ii) input support information, and outputs the input information thus determined. In Concrete Example 6, the input information determining section 31d supplies such determined input information to another component (work time calculating section 31c in Concrete Example 6) in the control section 31.

In Concrete Example 6, in a case where a hand is placed over the at-start shielded code (see in (a) of FIG. 11) and the combination of the two-dimensional codes C1 and C4 and the two-dimensional code C3 which is the at-end shielded code (combination identical to the third combination) is recognized, the input information determining section 31d sets a current time as the work start time in accordance with the third algorithm corresponding to the third combination. Then, the input information determining section 31d specifies, as the input information, a work time calculating instruction including the work ID and the work start time which are designated in accordance with the third algorithm, and supplies the work time calculating instruction to the work time calculating section 31c.

In a case where a hand is placed over the at-end shielded code (see (b) of FIG. 11) and the combination of the two-dimensional codes C1 and C4 and the two-dimensional code C2 which is the at-start shielded code (combination identical to the fourth combination) is recognized, the input information determining section 31d sets the current time as the work end time in accordance with the fourth algorithm corresponding to the fourth combination. Then, the input information determining section 31d specifies, as the input information, a work time calculating instruction including the work ID and the work end time which are designated in accordance with the fourth algorithm, and supplies the work time calculating instruction to the work time calculating section 31c.

The work time calculating section 31c calculates, for each work ID, a work time which is a difference between the work start time and the work end time which are included in the respective work time calculating instructions supplied from the input information determining section 31d, and controls the communication section 30 to transmit, to the server device 60, the work time thus calculated and the work ID in association with each other.

The standard time setting section 70b of the server device 60 obtains, for each work ID, distribution of work times transmitted from the image capturing device 20 in association with the work ID. In this process, the standard time setting section 70b obtains distribution of work times which have been transmitted from the image capturing device 20 during a period between the present time and a time in a predetermined time (e.g. 1 week) before the present time. Then, the standard time setting section 70b sets, for each work ID, a standard time based on the distribution of the work times. That is, the standard time setting section 70b sets a standard time by accumulating performance data of the work times received from the image capturing device 20 and carrying out a statistical work on the performance data. For example, the standard time setting section 70b may set, as a standard time, a representing value of the distribution of work times, such as a mode value, a mean value, and a medium value. The standard time setting section 70b outputs the standard time thus set in response to a request from the input-output terminal 10 or the display terminal 80. Thus, at an appropriate timing, a manager can easily check a standard time based on recent work times.

In Concrete Example 6, by a worker wearing the image capturing device 20, it is possible to automatically and easily set a standard time of each work.

Concrete Example 7: Variation of Concrete Example 6

Concrete Example 7 is a variation of Concrete Example 6. In Concrete Example 6, the image capturing device 20 includes the work time calculating section 31c, whereas in Concrete Example 7, a server device 60 calculates a work time.

Figure 17:
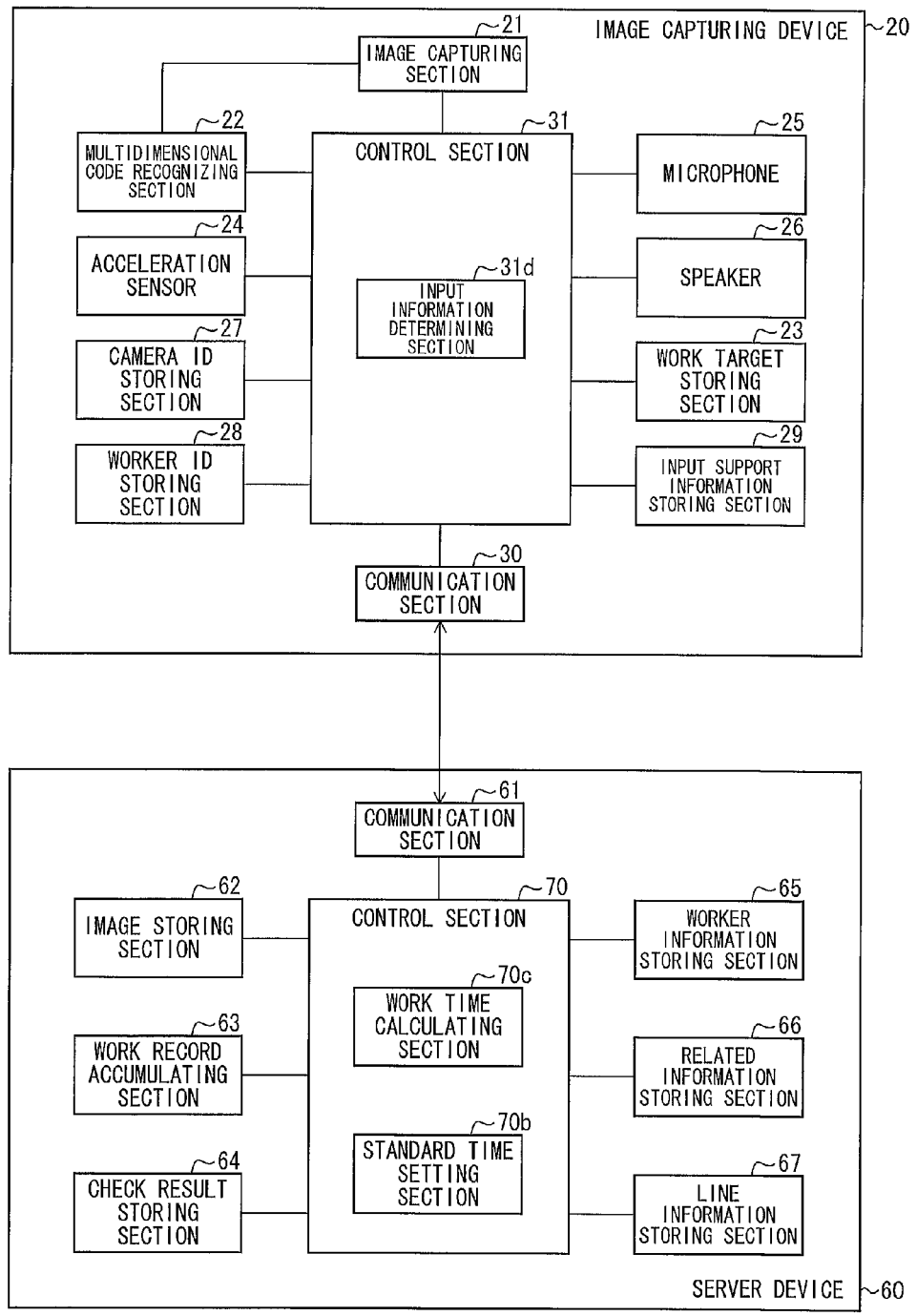
FIG. 17 is a block diagram illustrating internal configurations of a control section of an image capturing device and a control section of a server device which are included in a work management system in accordance with Concrete Example 7.

FIG. 17 is a block diagram illustrating internal configurations of a control section of an image capturing device and a control section of a server device which are included in the work management system in accordance with Concrete Example 7. As illustrated in FIG. 17, a control section 31 of an image capturing device 20 includes an input information determining section 31d. A control section 70 of the server device 60 includes a work time calculating section 70c and a standard time setting section 70b.

As with the case of Concrete Example 6, the input information determining section 31d determines input information, and outputs the input information thus determined. However, in Concrete Example 7, the input information determining section 31d controls a communication section 30 to transmit the input information to the server device 60. That is, the input information determining section 31d in Concrete Example 7 is different from that in Concrete Example 6 only in that the input information determining section 31d in Concrete Example 7 supplies the input information to the server device 60.

In Concrete Example 7 as well as in Concrete Example 6, an input support information storing section 29 stores therein third input support information and fourth input support information. Accordingly, in a case where a multi-dimensional code recognizing section 22 recognizes a combination identical to a third combination, the input information determining section 31d outputs, as the input information, a work time calculating instruction, including a work ID and a work start time (current time), which corresponds to the third combination. In a case where the multidimensional code recognizing section 22 recognizes a combination identical to a fourth combination, the input information determining section 31d outputs, as the input information, a work time calculating instruction, including the work ID and a work end time (current time), which corresponds to the fourth combination.

The work time calculating section 70c calculates, for each work ID, a work time which is a difference between the work start time and the work end time which are received from the image capturing device 20, and supplies, to the standard time setting section 70b, the work time thus calculated in association with the work ID.

The standard time setting section 70b in Concrete Example 7 carries out the same process as that in Concrete Example 6 and therefore a detailed description thereof will be omitted.

Also in Concrete Example 7, by a worker wearing the image capturing device 20, a standard time of each work is automatically set.

Concrete Example 8: Process of Inputting Work Record Creating Instruction and Work Record Updating Instruction without Use of Hand (Problem to be Solved by Concrete Example 8)

Conventionally, there has been a case where, in a production site, in order to check specifications of a production device, a worker operates a terminal to display the specifications. Furthermore, for each production device, a worker inputs a working record such as a work start time and a work end time via the terminal, and thus a work time is managed. However, when a worker operates the terminal, the worker is required to make an input with use of a keyboard and/or a mouse. In general, in a production site, a worker operates a terminal while standing. Making an input while standing requires keeping not only a posture "from an elbow to fingers" but also a posture "from a shoulder to fingers". This imposes a greater burden on the worker's arm than an operation while the worker is sitting. Furthermore, since it is difficult to minutely adjust a finger's position, it takes time for the worker to input accurately.

In order to deal with this problem, Japanese Patent Application Publication No. 2008-108008 discloses a technique of detecting, as an input pattern, a movement of a specific portion of a worker.

However, in the technique disclosed in Japanese Patent Application Publication No. 2008-108008, a camera is fixed. This raises the aforementioned problem that the camera may have blind spots depending on a state of a worker, and consequently the camera cannot accurately capture an image of a work range.

Concrete Example 8 is to solve this problem and is intended to provide a work management system capable of reducing a burden on a worker's input operation on a terminal by accurately capturing an image of a work range.

(Configuration of Work Management System of Concrete Example 8)

Figure 18:
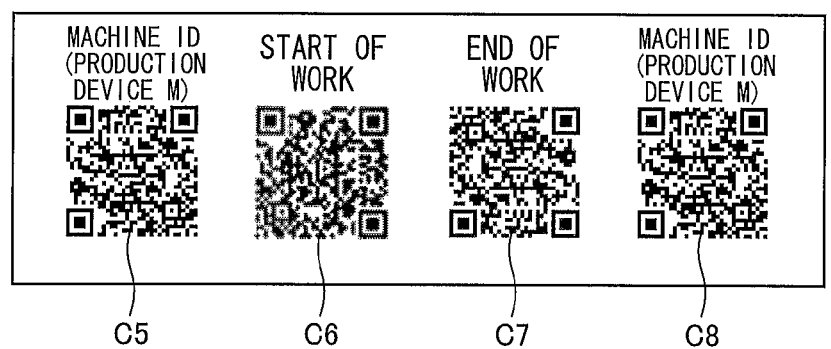
FIG. 18 is a view illustrating an example two-dimensional code table prepared in advance in Concrete Example 8.

In a work management system 1 in accordance with Concrete Example 8, a two-dimensional code table illustrated in FIG. 18 is attached to each production device 40 in advance. FIG. 18 illustrates a two-dimensional code table corresponding to a production device M. In FIG. 18, two-dimensional codes C5 and C8 located at respective both sides of FIG. 18 are each a code uniquely assigned to a corresponding production device 40, and are each a machine code indicative of the production device 40. A second two-dimensional code C6 from the left is an at-start shielded code which is shielded by a hand or the like in a case where work is to be started. In a case where a worker is to start work, the worker places his/her hand over the two-dimensional code C6 serving as the at-start shielded code while looking at the two-dimensional code table, as with Concrete Example 1 (see (a) of FIG. 11). A third two-dimensional code C7 from the left is an at-end shielded code which is shielded by a hand or the like in a case where the work is ended. In a case where the worker ends the work, the worker places his/her hand over the two-dimensional code C7 serving as the at-end shielded code, as with the Concrete Example 1 (see (b) of FIG. 11).

Figure 19:
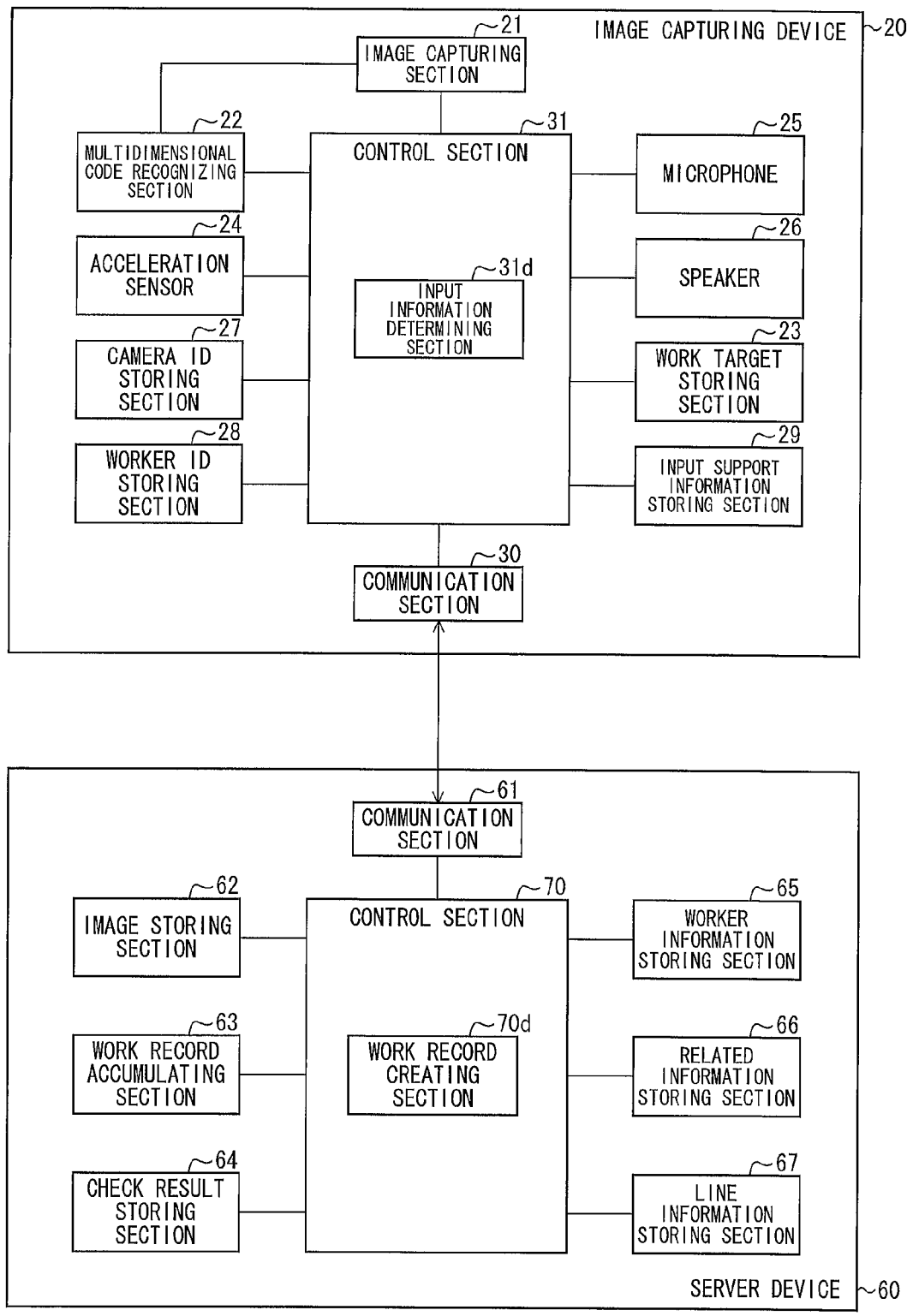
FIG. 19 is a block diagram illustrating internal configurations of a control section of an image capturing device and a control section of a server device which are included in a work management system in accordance with Concrete Example 8.

FIG. 19 is a block diagram illustrating internal configurations of a control section of an image capturing device and a control section of a server device which are included in the work management system in accordance with Concrete Example 8. As illustrated in FIG. 19, a control section 31 of an image capturing device 20 includes an input information determining section 31d. A control section 70 of a server device 60 includes a work record creating section 70d.

The input information determining section 31d has function described in Concrete Example 7. Note that an input support information storing section 29 in Concrete Example 8 stores therein, for each production device 40 for which a work record is accumulated, fifth input support information (input support information A) which supports input of a work start time and sixth input support information (input support information B) which supports input of a work end time.

The fifth input support information is information in which a fifth combination of (i) two-dimensional codes C5 and C8 located at respective both sides of a two-dimensional code table as illustrated in FIG. 18 and (ii) a two-dimensional code C7 serving as an at-end shielded code is associated with a fifth algorithm. The fifth algorithm is an algorithm in accordance with which (i) a current time is set as a work start time and (ii) a work record creating instruction, including the work start time, a machine ID that identifies a corresponding production device 40, and a worker ID stored in a worker ID storing section 28, is set as input information.

The sixth input support information is information in which a sixth combination of (i) the two-dimensional codes C5 and C8 at the respective sides of the two-dimensional code table as illustrated in FIG. 18 and (ii) a two-dimensional code C6 serving as an at-start shielded code is associated with a sixth algorithm. The sixth algorithm is an algorithm in accordance with which (i) a current time is set as a work end time and (ii) a work record updating instruction, including the work end time, the machine ID that identifies the corresponding production device 40, and the worker ID stored in the worker ID storing section 28, is set as the input information.

In a case where a hand is placed over the at-start shielded code and the combination of the two-dimensional codes C5 and C8 and the two-dimensional code C7 serving as the at-end shielded code (combination identical to the fifth combination) is recognized by a multidimensional code recognizing section 22, the input information determining section 31d sets a current time as the work start time and reads out a worker ID from the worker ID storing section 28, in accordance with the fifth algorithm corresponding to the fifth combination. Then, the input information determining section 31d determines, as the input information, a work record updating instruction including an machine ID, the work start time, and the worker ID which correspond to the fifth combination, and transmits the input information to the server device 60.

In a case where a hand is placed over the at-end shielded code and the combination of the two-dimensional codes C5 and C8 and the two-dimensional code C6 which is the at-start shielded code (combination identical to the sixth combination) is recognized, the input information determining section 31d sets a current time as the work end time and reads out the worker ID from the worker ID storing section 28, in accordance with the sixth algorithm corresponding to the sixth combination. Then, the input information determining section 31d determines, as the input information, a work record updating instruction including the machine ID, the work end time, and the worker ID which correspond to the sixth combination, and transmits the input information to the server device 60.

Note that the input information determining section 31d determines whether or not to output determined input information depending on a work status flag. Specifically, only in a case where the work status flag shows "not working", the input information determining section 31d outputs the input information including the work start time and changes the work status flag to "working". Only in a case where the work status flag shows "working", the input information determining section 31d outputs the input information including the work end time and changes the work status flag to "not working".

The work record creating section 70d of the server device 60 updates information (see FIG. 4) stored in a work record accumulating section 63, in accordance with the input information received from the image capturing device 20. Specifically, when receiving the work record creating instruction from the image capturing device 20, the work record creating section 70d creates a new work record including the worker ID, the machine ID, and the work start time which are included in the work record creating instruction, and causes the new work record to be stored in the work record accumulating section 63. When receiving the work record updating instruction from the image capturing device 20, the work record creating section 70d specifies, from the work record accumulating section 63, a work record corresponding to the worker ID and the machine ID which are included in the work record updating instruction, as an update target record. In a case where there are a plurality of work records which correspond to the worker ID and the machine ID, the work record creating section 70d may specify, as the update target record, a work record including the latest work start record. The work record creating section 70d adds, to the update target record thus specified, the work end time included in the work record updating instruction.

It is thus possible to automatically create a work record in which a machine ID, a worker ID, a work start time, and a work end time are associated with each other, without causing a worker to conduct a manual input operation.

Figure 20:
FIG. 20 is a view illustrating an example screen which encourages input of work type information and action contents information.

As illustrated in FIG. 4, the work record accumulating section 63 also stores therein work type information and action contents information. The work record creating section 70d may obtain the work type information and the action content information from the input-output terminal 10. For example, the work record creating section 70d transmits, to the input-output terminal 10, a screen which encourages input of the work type information and the action contents information with respect to a work record including a machine ID, a worker ID, a work start time, and a work end time. FIG. 20 is a view illustrating an example screen. The worker may cheek the screen and input the work type information and the action contents information. In FIG. 20, entry fields titled "portion", "phenomenon", and "procedure" show the action contents information. The work record creating section 70d updates the work record by adding, to the work record, the work type information and the action contents information which have been inputted to the input-output terminal 10.

(Flow of Process Carried Out in Concrete Example 8)

Figure 21:
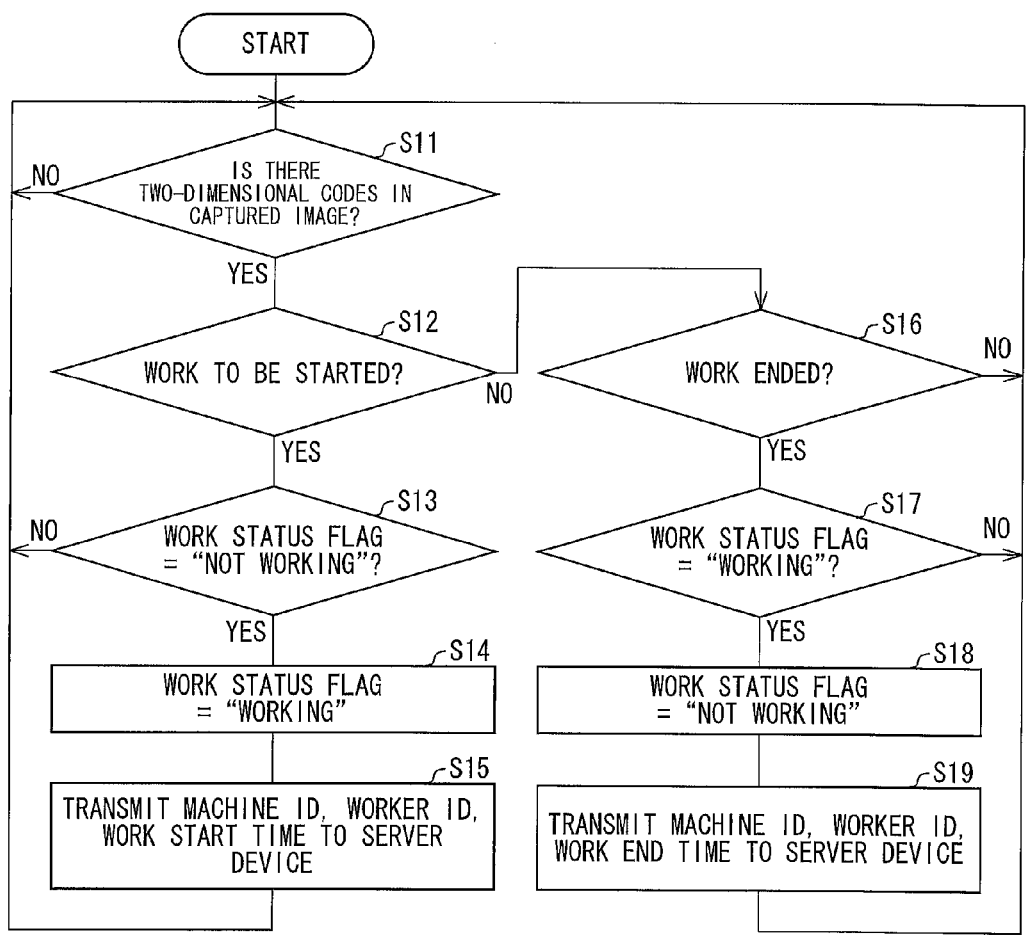
FIG. 21 is a flowchart illustrating a flow of a process carried out by the image capturing device of the work management system in accordance with Concrete Example 8.

The following description will discuss a flow of a process carried out by the image capturing device 20 in accordance with Concrete Example 8. FIG. 21 is a flowchart illustrating a flow of a process carried out in Concrete Example 8.

First, the input information determining section 31d determines whether or not two-dimensional codes are recognized by the multidimensional code recognizing section 22 (step S11). In a case of No in the step S11, the step S11 is repeated with respect to a following frame.

In a case, where the two-dimensional codes are recognized (Yes, in the step S11), the input information determining section 31d determines whether a combination of the two-dimensional codes which are recognized from a single frame by the multidimensional code recognizing section 22 matches the fifth combination (step S12). Since the fifth combination is associated with the fifth algorithm in accordance with which a work record creating instruction including a work start time is set as input information, the determination in the step S12 indicates determining whether or not work is to be started.

Here, as described above, in a case where the worker places his/her hand over the at-start shielded code of the two-dimensional code table (see FIG. 18), the combination of the two-dimensional codes C5 and C8 (located at the respective both sides of the two-dimensional code table) and the two-dimensional code C7 serving as an at-end shielded code (combination identical to the fifth combination) is recognized. Only this case results in Yes in the step S12.

In the case of Yes in the step S12, the input information determining section 31d determines whether the work status flag shows "not working" (step S13). In a case of No in the step S13, the step S11 is repeated with respect to a following frame. On the other hand, in a case of Yes in the step S3, the input information determining section 31d changes the work status flag to "working" (step S14). Then, the input information determining section 31d sets a current time as a work start time and reads out a worker ID from the worker ID storing section 28, in accordance with the fifth algorithm corresponding to the fifth combination. Then, the input information determining section 31d determines, as input information, a work record creating instruction including a machine ID, the work start time, and the worker ID which correspond to the fifth combination, and transmits the input information to the server device 60 (step S15).

On the other hand, in a case of No in the step S12, the input information determining section 31d determines whether the combination of two-dimensional codes recognized by the multidimensional code recognizing section 22 matches the sixth combination (step S16). Since the sixth combination is associated with the sixth algorithm in accordance with which a work record creating instruction including a work start time is set as the input information, the determination in S16 indicates determining whether or not to end the work. In the case of No in the step S16, the step S11 is repeated with respect to a following frame.

When the worker has finished the work, the worker places his/her hand over the at-end shielded code of the two-dimensional code table (see FIG. 18). At that time, the combination of the two-dimensional codes C5 and C8 located at the respective both sides of the two-dimensional code table and the two-dimensional code C6 serving as the at-start shielded code (combination equal to the sixth combination) is recognized. Only this case results in Yes in the step S16.

In a case of Yes in the step S16, the input information determining section 31d determines whether the work status flag shows "working" (step S17). In a case of No in the step S17, the step S11 is repeated with respect to a following frame. On the other hand, in a case of Yes in the step S17, the input information determining section 31d changes the work status flag to "not working" (step S18). Then, the input information determining section 31d sets a current time as a work end time and reads out the worker ID from the worker ID storing section 28, in accordance with the sixth algorithm corresponding to the sixth combination which the combination of two-dimensional codes recognized by the multidimensional code recognizing section 22 are determined as matching in the step S16. Then, the input information determining section 31d determines, as the input information, a work record updating instruction including the machine ID, the work end time, and the worker ID which correspond to the sixth combination, and transmits the input information to the server device 60 (step S19).

It is thus possible to automatically transmits, to the server device 60, a work record creating instruction or a work record updating instruction merely by a worker wearing the image capturing device 20 and shielding, with his/her hand, the two-dimensional code C6 serving as the at-start shielded code or the two-dimensional code C7 serving as the at-end shielded code in the two-dimensional code table (see FIG. 18) in a near work range. Accordingly, it is possible to reduce the worker's manual input operation with use of a keyboard or a mouse.

Concrete Example 9: Variation of Concrete Example 8

Figure 22:
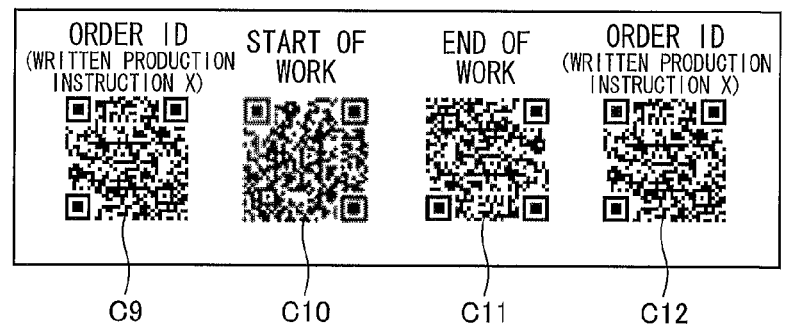
FIG. 22 is a view illustrating an example two-dimensional code table prepared in advance in Concrete Example 9.

Concrete Example 9 is a variation of Concrete Example 8. Therefore, only differences between Concrete Example 9 and Concrete Example 8 will be described. In Concrete Example 9, used is a two-dimensional code table created for each written production instruction, not for each production device 40. FIG. 22 illustrates an example two-dimensional code table used in Concrete Example 9. The written production instruction is a document in which a production instruction for a worker is described. In the written production instruction, a product type, a lot number, a machine to be used, and the like are described. The written production instruction is for identifying an object to be a work target (such as a product and a lot).

In FIG. 22, two-dimensional codes C9 and C12 located at respective both sides of the FIG. 22 are each a code uniquely assigned to a corresponding written production instruction, and are each an order code indicative of the written production instruction. A second two-dimensional code C10 from the left is an at-start shielded code which is shielded a hand or the like in a case where work is to be started. In a case where a worker is to start work, the worker places his/her hand over the two-dimensional code C10. A third two-dimensional code C11 from the left is an at-end shielded code which is shielded a hand or the like in a case where the work is ended. In a case where the worker ends the work, the worker places his/her hand over the two-dimensional code C11.

An input support information storing section 29 in accordance with Concrete Example 9 stores therein, for each written production instruction for which a work record is accumulated, seventh input support information (input support information C) which supports input of a work start time and eighth input support information (input support information D) which supports input of a work end time.

The seventh input support information is information in which a seventh combination of (i) two-dimensional codes C9 and C12 located at respective both sides of a two-dimensional code table as illustrated in FIG. 22 and (ii) a two-dimensional code C11 serving as an at-end shielded code is associated with a seventh algorithm. The seventh algorithm is an algorithm in accordance with which (i) a current time is set as a work start time and (ii) a work record creating instruction, including the work start time, an order ID that identifies a corresponding written production instruction, and a worker ID stored in a worker ID storing section 28, is set as input information.

The eighth input support information is information in which an eighth combination of (i) the two-dimensional codes C9 and C12 located at the respective both sides of the two-dimensional code table as illustrated in FIG. 22 and (ii) a two-dimensional code C10 serving as an at-start shielded code is associated with an eighth algorithm. The eighth algorithm is an algorithm in accordance with which (i) a current time is set as a work end time and (ii) a work record updating instruction, including the work end time, the order ID that identifies the corresponding written production instruction, and the worker ID stored in the worker ID storing section 28, is set as the input information.

An input information determining section 31d in Concrete Example 9 is different from that in Concrete Example 8 only in that the input information determining section 31d in Concrete Example 9 determines, in accordance with the seventh or eighth input support information, a work record creating instruction or a work record updating instruction which includes an order ID instead of a machine ID, as the input information.

The process carried out by an image capturing device 20 in Concrete Example 9 is substantially the same as the flowchart illustrated in FIG. 21 except that an instruction including an order ID, not a machine ID, is transmitted in step S15 and step S19.

A work record creating section 70d of a server device 60 in Concrete Example 9 is different from that in Concrete Example 8 only in that the work record creating section 70d in Concrete Example 9 causes a work record including an order ID, not a machine ID, to be stored in a work record accumulating section 63 in accordance with an instruction from the image capturing device 20.

Also in Concrete Example 9, it is possible to automatically transmit, to the server device 60, a work record creating instruction or a work record updating instruction merely by a worker wearing the image capturing device 20 and shielding, with his/her hand, the two-dimensional code C10 serving as the at-start shielded code or the two-dimensional code C11 serving as the at-end shielded code in the two-dimensional code table (see FIG. 22) in a near work range. Accordingly, it is possible to reduce the worker's manual input operation with use of a keyboard or a mouse.

Note that a production ID which identifies a product or a lot ID which identifies a product and a lot may be alternatively used, instead of an order ID. Each of the order ID, the production ID, and the lot ID is object identification information which identifies an object to be a work target.

Concrete Example 10: Process of Inputting Display Instruction without Use of Hand (Problem to be Solved by Concrete Example 10)

Conventionally, detailed information on a machine and detailed information on a product, a lot etc. to be produced are accumulated in a server device and a worker operates a terminal according to necessity so as to examine information. However, as described in Concrete Example 8, a worker operates a terminal while standing, which imposes a greater burden on the worker's arm than an operation while the worker is sitting. Furthermore, since it is difficult to minutely adjust a finger's position, it takes time for the worker to input accurately.

Concrete Example 10 is to solve this problem and is intended to provide a work management system capable of reducing a burden on a worker's input of an instruction for causing a terminal to display information (display instruction).

(Configuration of Work Management System of Concrete Example 10)

The following description will discuss Concrete Example 10 as a variation of Concrete Example 8. Accordingly, only differences between Concrete Example 10 and Concrete Example 8 will be described.

Figure 23:
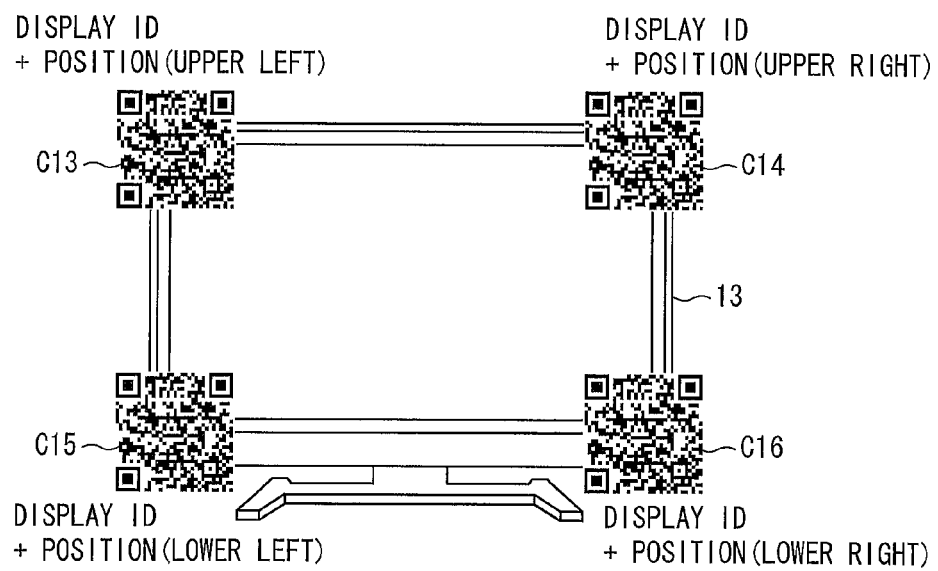
FIG. 23 is a view illustrating an example display section of an input-output terminal to four corners of which two-dimensional codes are attached.

In Concrete Example 10, in addition to a two-dimensional code table illustrated in FIG. 18, two-dimensional codes are attached to respective four corners of a display section 13 of an input-output terminal 10. FIG. 23 illustrates an example display section 13 to four corners of which two-dimensional codes are respectively attached. The two-dimensional codes attached to the respective four corners of the display section 13 include (i) codes each of which is uniquely assigned to the display section 13 and (ii) codes each of which indicates a position. Specifically, a two-dimensional code C13 attached to an upper left corner of the display section 13 (hereinafter referred to as upper left two-dimensional code (upper left multidimensional code)) includes a code uniquely assigned to the display section 13 and a code indicative of an upper left position. Similarly, a two-dimensional code C14 attached to an upper right corner of the display section 13 (hereinafter referred to as upper right two-dimensional code (upper right multidimensional code)) includes a code uniquely assigned to the display section 13 and a code indicative of an upper right position. A two-dimensional code C15 attached to a lower left corner of the display section 13 (hereinafter referred to as lower left two-dimensional code (lower left multidimensional code)) includes a code uniquely assigned to the display section 13 and a code indicative of a lower left position. A two-dimensional code C16 attached to a lower right corner of the display section 13 (hereinafter referred to as lower right two-dimensional code (lower right multidimensional code)) includes a code uniquely assigned to the display section 13 and a code indicative of a lower right position.

Figure 24:
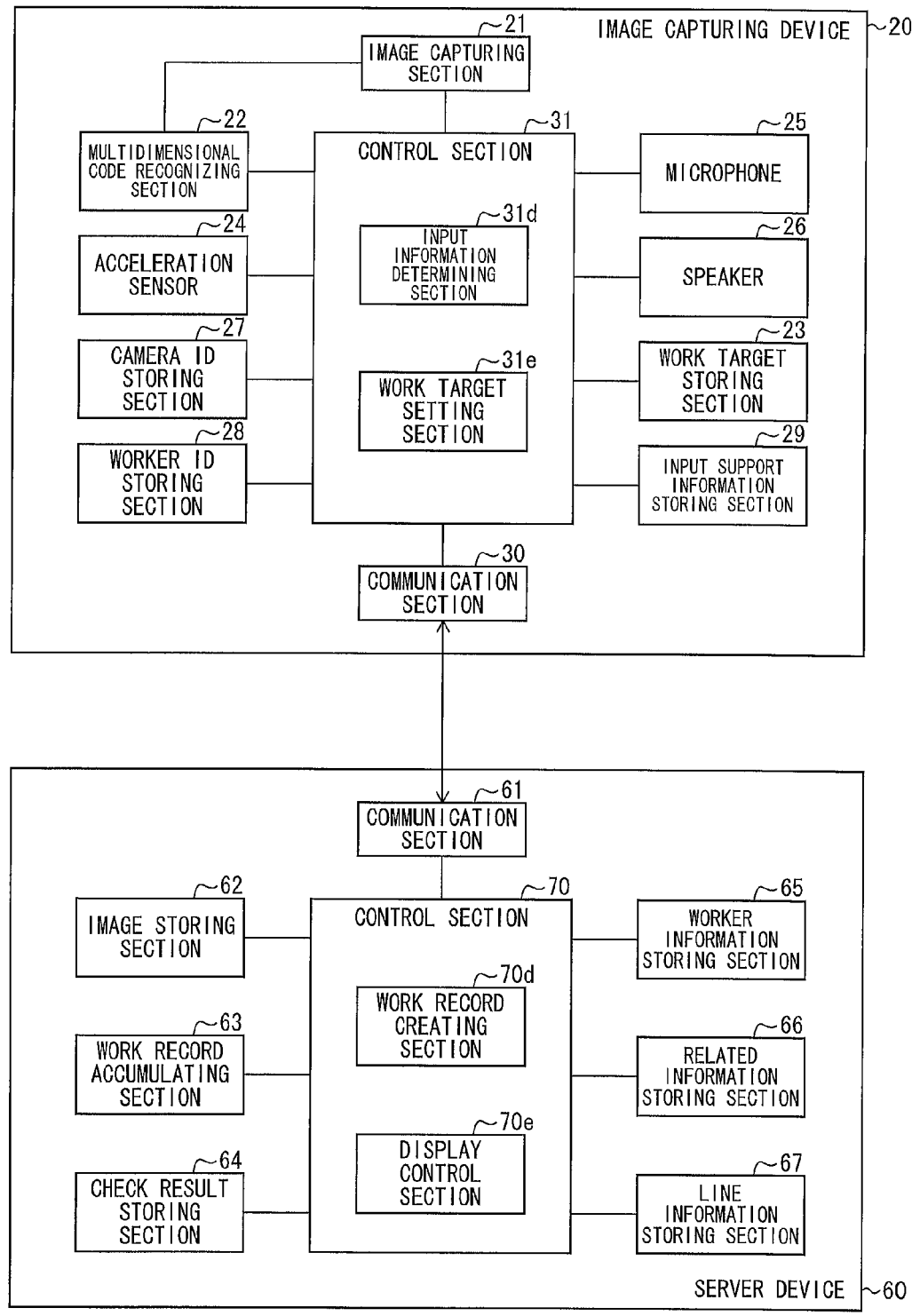
FIG. 24 is a block diagram illustrating internal configurations of a control section of an image capturing device and a control section of a server device which are included in a work management system in accordance with Concrete Example 10.

FIG. 24 is a block diagram illustrating internal configurations of a control section of an image capturing device and a control section of a server device which are included in the work management system in accordance with Concrete Example 10. As illustrated in FIG. 24, a control section 31 of an image capturing device 20 includes an input information determining section 31d and a work target setting section 31e. A control section 70 of a server device 60 includes a work record creating section 70d and a display control section 70e.

Furthermore, an input support information storing section 29 of Concrete Example 10 stores therein ninth through thirteenth input support information, in addition to fifth input support information and sixth input support information described in Concrete Example 8.

The ninth input support information (input support information E) is information in which a combination of four two-dimensional codes attached to four corners of a display section 13 included in a corresponding input-output terminal 10 (ninth combination) is associated with a ninth algorithm. The ninth algorithm is an algorithm in accordance with which a display instruction, including (i) a display ID (display device identification information) that identifies the display section 13 of the corresponding input-output terminal 10 and (ii) a machine ID stored in the work target storing section 23, is set as input information.

The tenth input support information (input support information F) is information in which a combination of an upper left two-dimensional code C13 and an upper right two-dimensional code C14 which are attached to a display section 13 included in a corresponding input-output terminal 10 (tenth combination) is associated with a display instruction including (i) a display ID that identifies the display section 13 included in the corresponding input-output terminal 10 and (ii) a direction information indicative of an upward direction.

The eleventh input support information (input support information G) is information in which a combination of a lower left two-dimensional code C15 and a lower right two-dimensional code C16 which are attached to a display section 13 included in a corresponding input-output terminal 10 (eleventh combination) is associated with a display instruction including (i) a display ID that identifies the display section 13 included in the corresponding input-output terminal 10 and (ii) direction information indicative of a downward direction.

The twelfth input support information (input support information H) is information in which a combination of an upper left two-dimensional code C13 and a lower left two-dimensional code C15 which are attached to a display section 13 included in a corresponding input-output terminal 10 (twelfth combination) is associated with a display instruction including (i) a display ID that identifies the display section 13 included in the corresponding input-output terminal 10 and (ii) direction information indicative of a leftward direction.

The thirteenth input support information (input support information I) is information in which a combination of an upper right two-dimensional code C14 and a lower right two-dimensional code C16 which are attached to a display section 13 included in a corresponding input-output terminal 10 (thirteenth combination) is associated with a display instruction including (i) a display ID that identifies the display section 13 included in the corresponding input-output terminal 10 and (ii) direction information indicative of a rightward direction.

Accordingly, in a case where a display instruction is determined as the input information in accordance with one of the ninth through thirteenth input support information, the display instruction is transmitted to the server device 60 by the input information determining section 31d.

At a timing at which the communication section 30 transmits the work record creating instruction, the work target setting section 31e determines a machine ID included in the work record creating instruction, as a machine ID indicative of a production device 40 which is a work target, and overwrites the work target storing section 23 with the machine 1D thus determined.

The display control section 70e of the server device 60 controls display of the input-output terminal 10 in accordance with the display instruction received from the image capturing device 20.

Specifically, in a case where the display control section 70e receives a display instruction including a machine ID and a display ID from the image capturing device 20, the display control section 70e reads out, from a related-information storing section 66, machine-related information corresponding to the machine ID, and transmits the machine-related information thus read to the input-output terminal 10 including the display section 13 identified by the display ID. Thus, the machine-related information is displayed on the display section 13 viewed by a worker.

In a case where the display control section 70e receives, from the image capturing device 20, a display instruction including a display ID and direction information, the display control section 70e transmits, to the input-output terminal 10 including the display section 13 identified by the display ID, a scrolling instruction for instructing the input-output terminal 10 to scroll its screen in a direction indicated by the direction information. Thus, the screen of the input-output terminal 10 is scrolled automatically in a direction in which the worker sees.

(Flow of Process Carried Out in Concrete Example 10)

Figure 25:
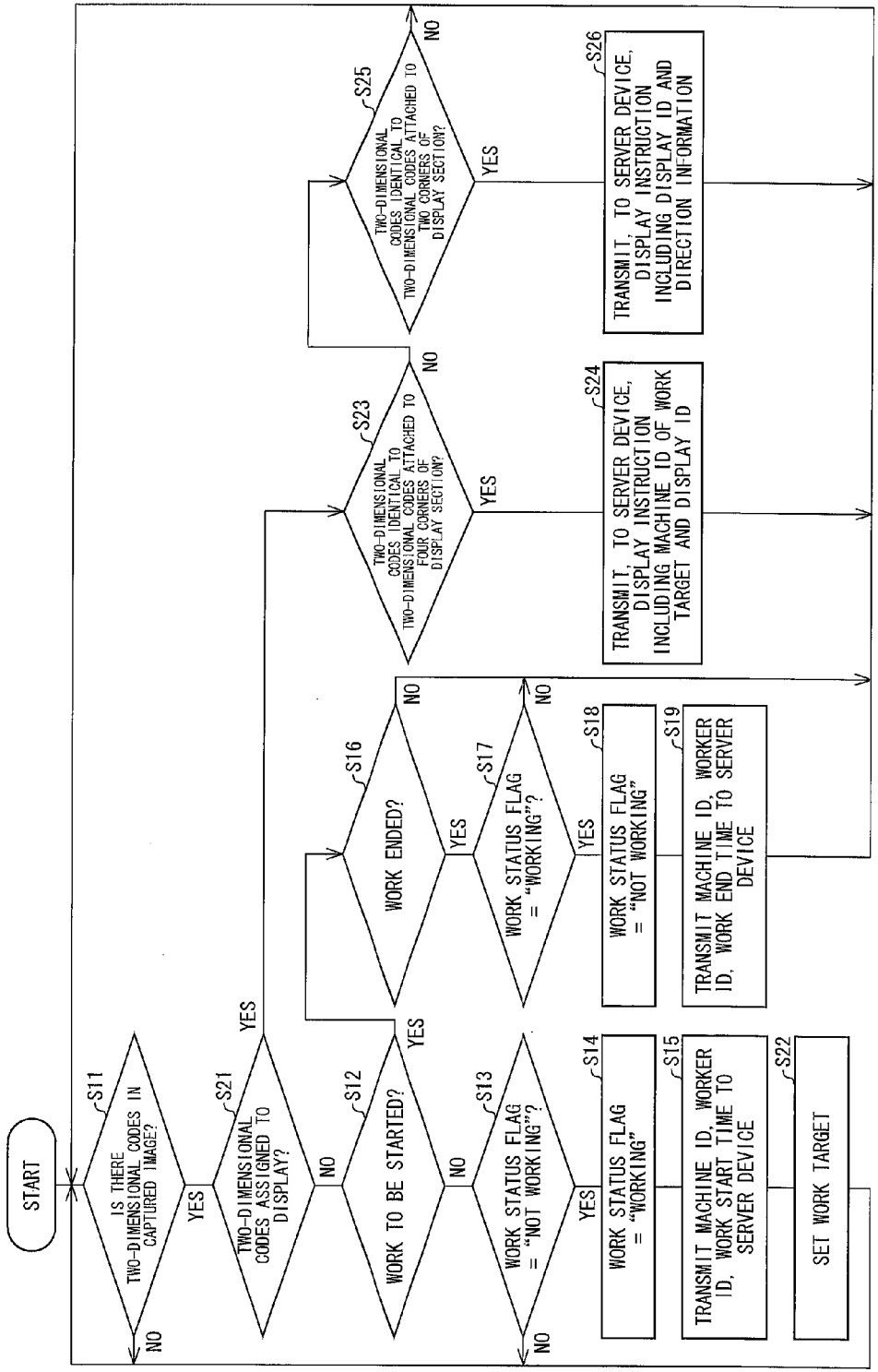
FIG. 25 is a flowchart illustrating a flow of a process carried out by the image capturing device of the work management system in accordance with Concrete Example 10.

The following description will discuss a flow of a process carried out by the work management system 1. FIG. 25 is a flowchart illustrating the flow of the process carried out by the work management system 1. In FIG. 25, the same process as that described in Concrete Example 8 will be given the same step number as in FIG. 21 and an explanation thereof will be omitted.

First, the input information determining section 31d determines whether or not two-dimensional codes are recognized by the multidimensional code recognizing section 22 (step S11). In a case of Yes in the step S11, the input information determining section 31d determines whether the two-dimensional codes thus recognized include a code uniquely assigned to the display section 13 (step S21). The input information determining section 31d can carry out the step S21 by causing codes respectively assigned to the display sections 13 of all the input-output terminals 10 included in the work management system 1 to be stored in advance.

In a case of No in the step S21, the steps S14 and S15 described in Concrete Example 8 are carried out. After the step S15, the work target setting section 31e overwrites the work target storing section 23 with a machine ID included in a work record creating instruction transmitted to the server device 60 in the step S15 as an ID that identifies the production device 40 which is a work target (step S22).

In a case of Yes in the step S21, the input information determining section 31d determines whether a combination of the two-dimensional codes recognized from a single frame by the multifunctional code recognizing section 22 matches the ninth combination (step S23). The ninth combination is a combination of the upper left two-dimensional codes C13, the upper right two-dimensional code C14, the lower left two-dimensional code C15, and the lower right two-dimensional code C16 which are attached to an identical display section 13. Therefore, the step S23 is a step of determining whether the combination of the two-dimensional codes recognized from the single frame matches a combination of such four two-dimensional codes which are attached to respective four corners of the display section 13.

In a case of Yes in the step S23, the input information determining section 31d determines, in accordance with the ninth algorithm corresponding to the ninth combination, a display instruction, including (i) a display ID that identifies the display section 13 of the input-output terminal 10 and (ii) a machine ID stored in the work target storing section 23, which corresponds to the ninth algorithm, as input information. Then, the communication section 30 transmits, to the server device 60, the input information (display instruction) determined by the input information determining section 31d (step S24).

The display control section 70e of the server device 60 which has received the display instruction reads out, from the related-information storing section 66, machine-related information corresponding to the machine ID included in the display instruction. The display control section 70e transmits, to the input-output terminal 10 indicated by the display ID included in the display instruction, the machine-related information thus read out. This allows a worker to check the machine-related information on the display section 13 captured by the image capturing device 20 worn by the worker, i.e. the display section 13 in a work range of the worker, without making an operational input on the input-output terminal 10.

On the other hand, in a case of No in the step S23, the input information determining section 31d determines whether the combination of the two-dimensional codes recognized from the single frame by the multidimensional code recognizing section 22 corresponds to one of the tenth through thirteenth combinations (step S25). The tenth through thirteenth combinations are each a combination of two of the upper left two-dimensional codes C13, the upper right two-dimensional code C14, the lower left two-dimensional code C15, and the lower right two-dimensional code C16 which are attached to an identical display section 13. Therefore, the step S25 is a step of determining whether the combination of the two-dimensional codes recognized by the multidimensional code recognizing section 22 matches two of the four two-dimensional codes attached to the respective four corners of the display section 13. In a case of No in the step S25, the step S11 is repeated with respect to a following frame.

In a case of Yes in the step S25, the input information determining section 31d determines, as the input information, a display instruction including (i) direction information indicative of a direction corresponding to the combination which the combination of the two-dimensional codes recognized by the multidimensional code recognizing section 22 matches and (ii) a display ID corresponding to the combination. The communication section 30 transmits, to the server device 60, the input information (display instruction) determined by the input information determining section 31d (step S26).

The display control section 70e of the server device 60 which has received the display instruction in the step S26 transmits, to the input-output terminal 10 identified by the display ID included in the display instruction, a scrolling instruction to scroll a screen in a direction indicated by the direction information included in the display instruction. The input-output terminal 10 having received the scrolling instruction causes a screen of the display section 13 to scroll in accordance with the instruction.

Figure 26:
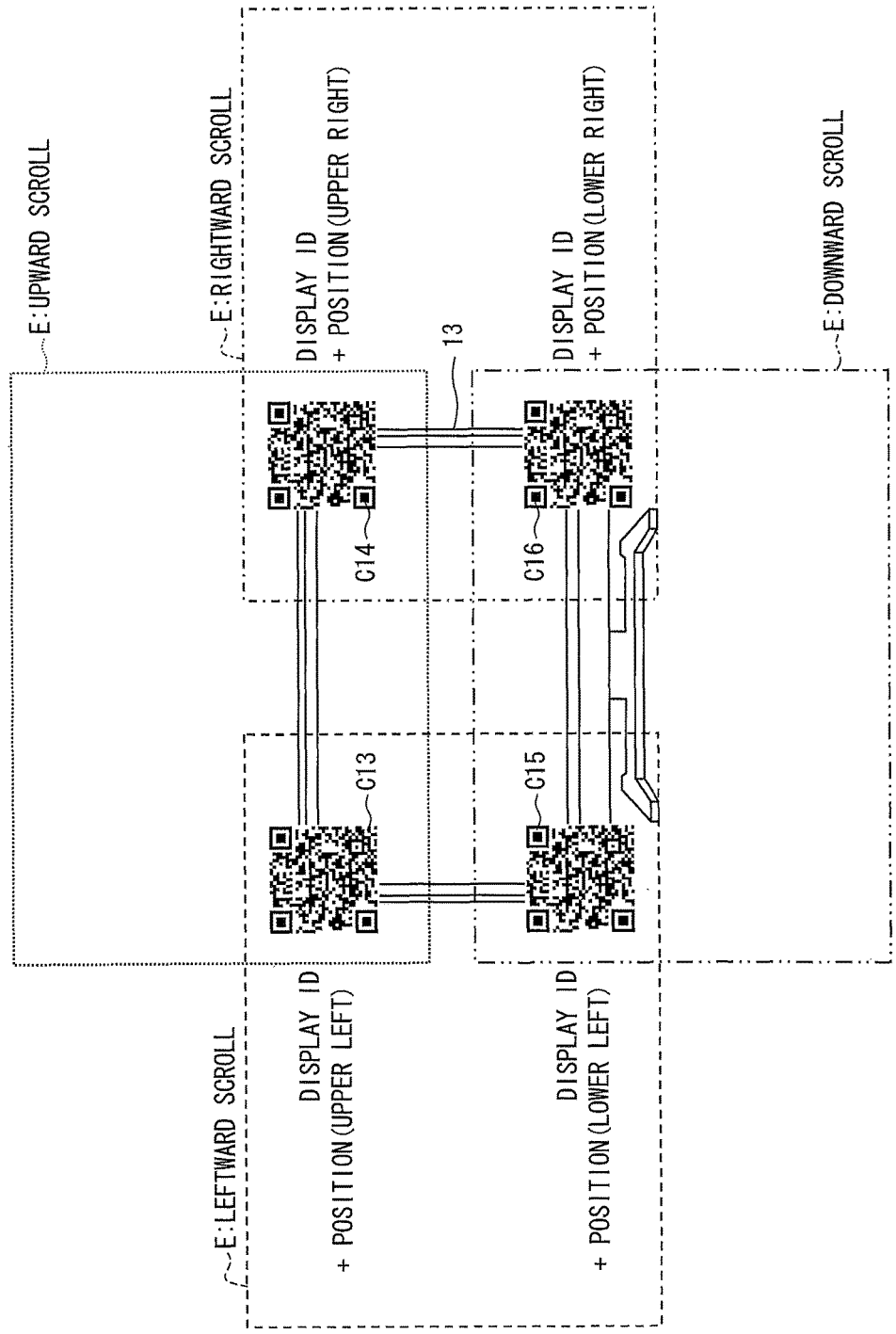
FIG. 26 is a view illustrating a positional relationship between the display section of the input-output terminal and a capturing range of the image capturing device.

FIG. 26 is a view illustrating a positional relationship between the display section 13 of the input-output terminal 10 and a captured range E of the image capturing device 20. As illustrated in FIG. 26, in a case where the captured area E of the image capturing device 20 worn on a worker's head includes only the upper right two-dimensional code C14 and the lower right two-dimensional code C16 out of the two-dimensional codes attached to the respective four corners, it is inferred that the worker wants to check a right side of the screen. In this case, rightward scroll is automatically carried out in the steps S25 and S26. Similarly, in a case where the captured range E includes only the upper left two-dimensional code C13 and the upper right two-dimensional code C14, upward scroll is carried out automatically. In a case where the captured range E includes only the upper left two-dimensional code C13 and the lower left two-dimensional code C15, leftward scroll is carried out automatically. In a case where the captured range E includes only the lower left two-dimensional code C15 and the lower right two-dimensional code C16, downward scroll is carried out automatically. Thus, the screen can be scrolled without the worker making an operational input on the input-output terminal 10.

Concrete Example 11: Variation of Concrete Example 10

Concrete Example 11 is a variation of Concrete Example 10. Accordingly, only differences between Concrete Example 11 and Concrete Example 10 will be described. In Concrete Example 11, used is a two-dimensional code table (see FIG. 22) which is created for each written production instruction, not each production device 40.

An input support information storing section 29 of Concrete Example 11 stores therein, for each written production instruction for which a work record is to be accumulated, seventh input support information and eighth input support information which are similar to those in Concrete Example 9, in addition to ninth through thirteenth input support information described in Concrete Example 10.

A process carried out by an image capturing device 20 of Concrete Example 11 is substantially the same as that illustrated in the flowchart of FIG. 25 except that an instruction including an order ID, not a machine ID, is transmitted in step S15 and S19.

A display control section 70e of a server device 60 reads out, from a related-information storing section 66, product-related information corresponding to the order ID included in the display instruction. Then, the display control section 70e transmits the product-related information thus read out to an input-output terminal 10 identified by a display ID included in the display instruction. This allows a worker to check product-related information without making an operational input on the input-output terminal 10.

Also in Concrete Example 11, it is possible to automatically transmit, to the server device 60, a work record creating instruction or a work record updating instruction merely by a worker wearing the image capturing device 20 and shielding, with his/her hand, the two-dimensional code C10 serving as the at-start shielded code or the two-dimensional code C11 serving as the at-end shielded code in the two-dimensional code table (see FIG. 22) in a near work range. Accordingly, it is possible to reduce the worker's manual input operation with use of a keyboard or a mouse.

Note that a production ID which identifies a product or a lot ID which identifies a product and a lot may be alternatively used, instead of an order ID. Each of the order ID, the production ID, and the lot ID is object identification information which identifies a work target.

Concrete Example 12: Process of Inputting Check Result without Use of Hand (Problem to be Solved by Concrete Example 12)

Conventionally, on a production site, a worker has carried out checks with respect to various check items in order to keep quality of a product. Results of the checks are recorded on a predetermined check result recording sheet so that the results are later reviewed.

Such recording of the results in the check result recording sheet made by the worker is not directly related to production. Therefore, it is preferable to make the recording in a shortest possible time in order to increase production ability of the worker.

Concrete Example 12 is to solve such a problem, and is intended to provide a work management system capable of reducing a worker's burden of inputting a check result.

(Configuration of Work Management System of Concrete Example 12)

Figure 27:
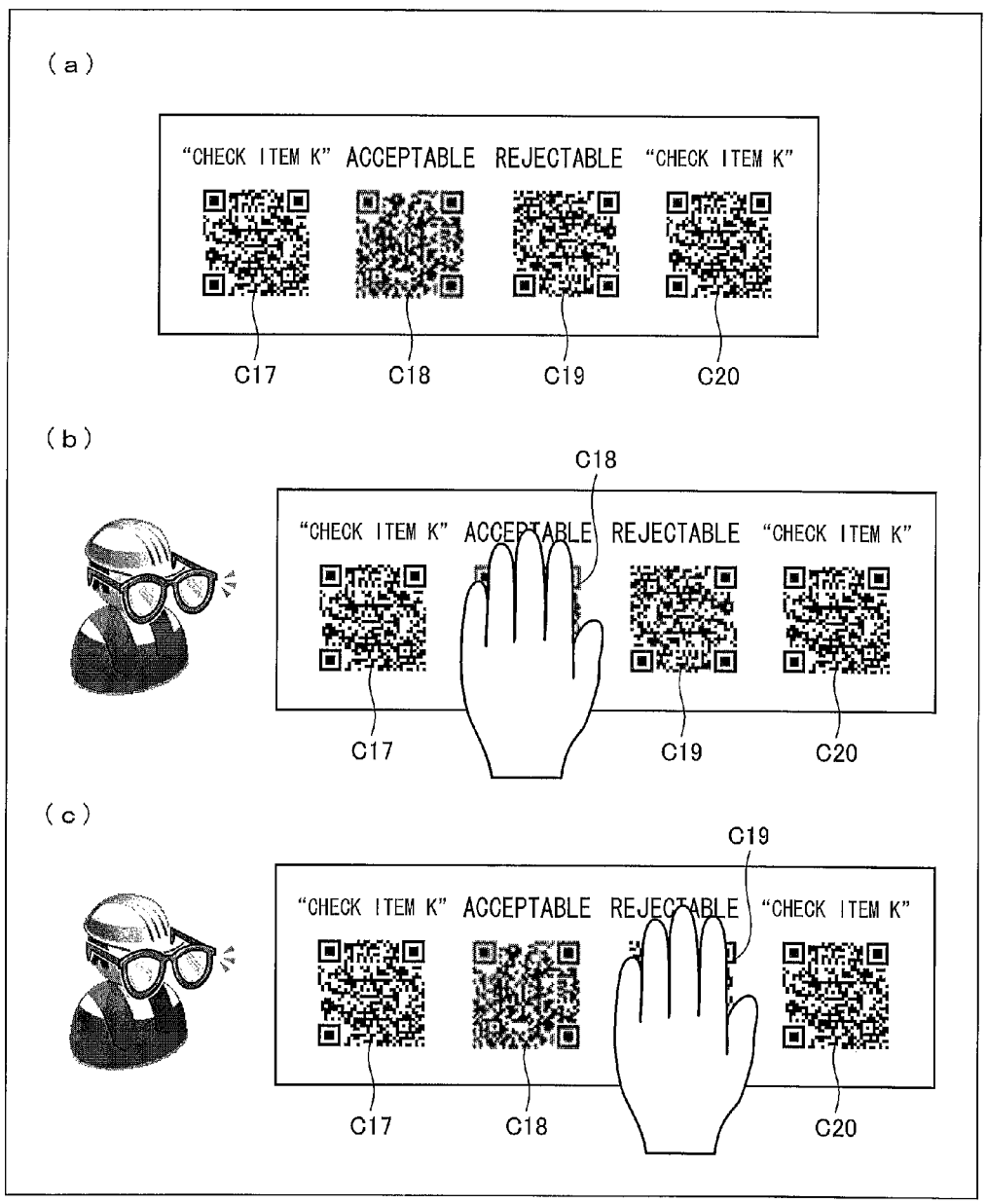
FIG. 27 is a view illustrating an example two-dimensional code table prepared in advance in Concrete Example 12.

According to Concrete Example 12, a two-dimensional code table, as illustrated in (a) of FIG. 27, is created in advance for each check item. (a) of FIG. 27 is a two-dimensional table corresponding to a check item K. In (a) of FIG. 27, two-dimensional codes C17 and C20 located at respective both sides are each a code uniquely assigned to a corresponding check item, and are each a check item code which identifies the check item. A second two-dimensional code C18 from the left is an acceptable-case shielded code which is shielded by a hand or the like in a case where a check result is acceptable. In a case where a worker determines that the check result is acceptable, the worker places his/her hand over the two-dimensional code C18 serving as the acceptable-case shielded code (see (b) of FIG. 27). A third two-dimensional code C19 from the left is a rejectable-case shielded code which is shielded by a hand or the like in a case where a check result is rejectable. In a case where the worker determines that the check result is rejectable, the worker places his/her hand over the two-dimensional code C19 serving as the rejectable-case shielded code (see (c) of FIG. 27).

Figure 28:
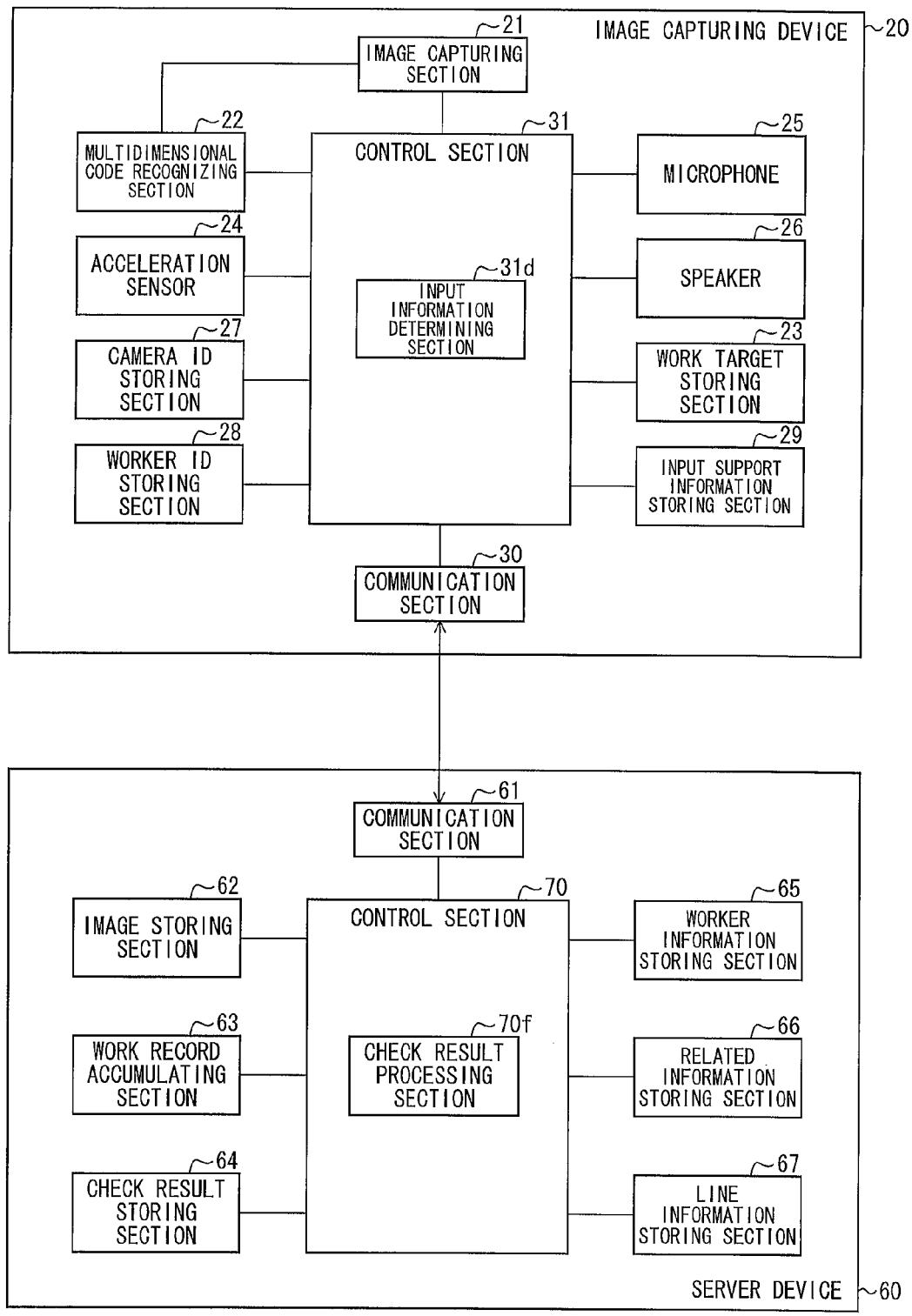
FIG. 28 is a block diagram illustrating internal configurations of a control section of an image capturing device and a control section of a server device which are provided in a work management system of Concrete Example 12.

FIG. 28 is a block diagram illustrating internal configurations of a control section of an image capturing device and a control section of a server device which are provided in a work management system 1 of Concrete Example 12. As illustrated in FIG. 28, a control section 31 of an image capturing device 20 includes an input information determining section 31d. A control section 70 of a server device 60 includes a check result processing section 70f.

An input support information storing section 29 of Concrete Example 12 stores therein, for each check item, fourteenth input support information and fifteenth input support information each of which supports input of a check result.

The fourteenth input support information (input support information J) is information in which a fourteenth combination of (i) the two-dimensional codes C17 and C20 shown at the respective both sides of (a) of FIG. 27 and (ii) the two-dimensional code C19 serving as the rejectable-case shielded code is associated with a fourteenth algorithm. The fourteenth algorithm is an algorithm in accordance with which a check result registration instruction is set as input information, the check result registration instruction including a worker ID stored in a worker ID storing section 28, a check item ID which identifies a corresponding check item (check item identification information), and check result information indicative of "acceptable".

The fifteenth input support information (input support information J) is information in which a fifteenth combination of (i) the two-dimensional codes C17 and C20 shown at the respective both sides of (a) of FIG. 27 and (ii) the two-dimensional code C18 serving as the acceptable-case shielded code is associated with a fifteenth algorithm. The fifteenth algorithm is an algorithm in accordance with which a check result registration instruction is set as the input information, the check result registration instruction including the worker ID stored in the worker ID storing section 28, the check item ID which identifies the corresponding check item, and check result information indicative of "rejectable".

As has been described, in a case where the worker determines that a check result is acceptable, the worker places his/her hand over the two-dimensional code C18 serving as the acceptable-case shielded code. In this case, since the two-dimensional code C18 is hidden by the worker's hand, a multidimensional code recognizing section 22 of the image capturing device 20, which captures an image of the worker's hands, recognizes a combination of the two-dimensional codes C17, C19, and C20 (a combination identical to the fourteenth combination). Therefore, in accordance with the fourteenth algorithm, the input information determining section 31d determines, as the input information, the check result registration instruction including the worker ID, the check item ID, and the check result information indicative of "acceptable". The input information determining section 31d transmits the input information thus determined to the server device 60.

In a case where the worker determines that the check result is rejectable, the worker places his/her hand over the two-dimensional code C19 serving as the rejectable-case shielded code. In this case, since the two-dimensional code C19 is hidden by the worker's hand, the multidimensional code recognizing section 22 recognizes a combination of the two-dimensional codes C17, C18, and C20 (a combination identical to the fifteenth combination). Therefore, in accordance with the fifteenth algorithm, the input information determining section 31d determines, as the input information, the check result registration instruction including the worker ID, the check item ID, and the check result information indicative of "rejectable". The input information determining section 31d transmits the input information thus determined to the server device 60.

The check result processing section 70f of the server device 60 stores, in a check result storing section 64, the worker ID, the check item ID, and the check result information, each of which is included in the check result registration instruction received from the image capturing device 20, in association with each other. In this case, the check result processing section 70f stores, in the check result storing section 64, a current time as a check time.

This allows the worker to record the check result in the server device 60 without conducting an operation with respect to an input-output terminal 10.

Concrete Example 13: Variation of Concrete Example 12

Concrete Example 13 is a variation of Concrete Example 12. Therefore, only differences between Concrete Example 12 and Concrete Example 13 will be described below. According to Concrete Example 13, each of fourteenth algorithm and fifteenth algorithm includes, in addition to an algorithm described in Concrete Example 12, an algorithm in accordance with which (i) a current time is set as a check time and (ii) the check time is included in a check result registration instruction.

According to Concrete Example 13, an input information determining section 31d determines, in accordance with the fourteenth algorithm or the fifteenth algorithm, the check result registration instruction, including a worker ID, a check item ID, check result information, and the check time (current time), as input information. The check result processing section 70f merely needs to store, in a check result storing section 64, the worker ID, the check item ID, the check result information, and the check time, each of which is included in the check result registration instruction, in association with each other.

Concrete Example 14: Variation of Concrete Example 12

Figure 29:
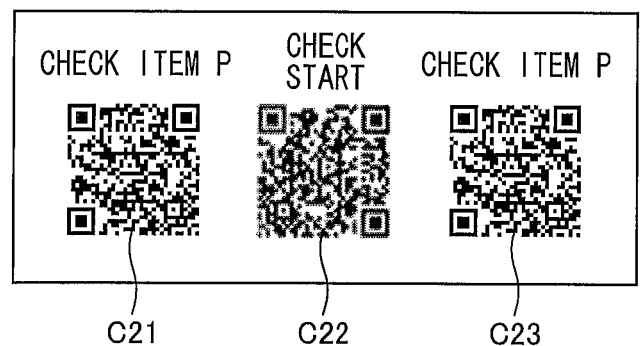
FIG. 29 is a view illustrating an example two-dimensional code table prepared in advance in Concrete Example 14.

Concrete Example 14 is a variation of Concrete Example 12. Therefore, only differences between Concrete Example 12 and Concrete Example 14 will be described below. According to Concrete Example 14, a two-dimensional code table as illustrated in FIG. 29 is created in advance for each check item with respect to which a check is carried out by use of a sound. In FIG. 29, two-dimensional codes C21 and C23 located at respective both sides are each a code which is uniquely assigned to a corresponding check item. A two-dimensional code C22 located between the two-dimensional codes C21 and C23 is a code different from the two-dimensional codes C21 and C23, and is an at-start shielded code which is shielded in a case where the check is to be started.

An input support information storing section 29 of Concrete Example 14 stores therein sixteenth input support information (input support information K) for each check item with respect to which a check is carried out by use of a sound. The sixteenth input support information is information in which a combination (sixteenth combination) of the two-dimensional codes C21 and C23, located at respective both sides of the two-dimensional code table illustrated in FIG. 29, is associated with a sixteenth algorithm.

The sixteenth algorithm includes a check result generating algorithm in accordance with which (i) a check result indicative of "acceptable" is generated in a case where a sound inputted in a microphone 25 within a predetermined time matches a predetermined pattern and (ii) a check result indicative of "rejectable" is generated in a case where the sound does not match the predetermined pattern. The sixteenth algorithm further includes a check time generating algorithm in accordance with which a current time is set as a check time. The sixteenth algorithm further includes an algorithm in accordance with which a check result registration instruction is generated as input information, the check result registration instruction including the check result generated in accordance with the check result generating algorithm, a worker ID stored in the worker ID storing section 28, a check item ID which identifies the corresponding check item, and the check time generated in accordance with the check time generating algorithm.

Therefore, in a case where a combination of two-dimensional codes recognized by a multidimensional code recognizing section 22 matches the sixteenth combination, an input information determining section 31d generates the check result registration instruction in accordance with the sixteenth algorithm. For example, the input information determining section 31*d* checks, with the predetermined pattern (for example, a sound pattern "good"), a sound which is inputted in the microphone 25 within the predetermined time (for example, 1 (one) minute) from when the input information determining section 31*d* determines that the combination of the two-dimensional codes recognized by the multidimensional code recognizing section 22 matches the sixteenth combination. In a case where the sound matches the predetermined pattern as a result of the check, the check result indicative of "acceptable" is generated. In a case where the sound does not match the predetermined pattern, the check result indicative of "rejectable" is generated.

According to Concrete Example 14, it is possible for a worker to carry out a check with respect to a check item merely by (i) placing his/her hand over the two-dimensional code C22, serving as the at-start shielded code, in the two-dimensional code table illustrated in FIG. 29 and then (ii) uttering a predetermined sound. That is, it is possible to reduce worker's operation of writing on a check recording sheet.

Concrete Example 15: Variation of Concrete Example 12

Concrete Example 15 is a variation of Concrete Example 12. Therefore, only differences between Concrete Example 12 and Concrete Example 15 will be described below. According to Concrete Example 15, a two-dimensional code table (see FIG. 29), similar to that in Concrete Example 14, is created in advance for each check item with respect to which a check is carried out by use of an acceleration sensor 24.

An input support information storing section 29 of Concrete Example 15 stores therein seventeenth input support information (input support information L) for each check item with respect to which a check is carried out by use of the acceleration sensor 24. The seventeenth input support information is information in which a combination (seventeenth combination) of the two-dimensional codes C21 and C23, located at the respective both sides of the two-dimensional code table as illustrated in FIG. 29, is associated with a seventeenth algorithm.

The seventeenth algorithm includes a check result generating algorithm in accordance with which (i) a check result indicative of "acceptable" is generated in a case where acceleration in a vertical direction which acceleration is detected within a predetermined time by the acceleration sensor is equal to or more than a predetermined threshold and (ii) a check result indicative of "rejectable" is generated in a case where acceleration in a horizontal direction which acceleration is detected within the predetermined time by the acceleration sensor is equal to or more than a predetermined threshold. The seventeenth algorithm further includes a check time generating algorithm in accordance with which a current time is set as a check time. The seventeenth algorithm further includes an algorithm in accordance with which a check result registration instruction is generated as input information, the check result registration instruction including the check result generated in accordance with the check result generating algorithm, a worker ID stored in the worker ID storing section 28, a check item ID which identifies a corresponding check item, and the check time generated in accordance with the check time generating algorithm.

According to Concrete Example 15, in a case where a combination of two-dimensional codes recognized by a multidimensional code recognizing section 22 matches the seventeenth combination, an input information determining section 31*d* generates the check result registration instruction in accordance with the seventeenth algorithm. For example, in a case where the acceleration in the vertical direction, which acceleration is detected by the acceleration sensor 24, becomes equal to or more than the predetermined threshold within the predetermined time (for example, 1 (one) minute) from when the input information determining section 31*d* determines that the combination of the two-dimensional codes recognized by the multidimensional code recognizing section 22 matches the seventeenth combination, the input information determining section 31*d* generates the check result indicative of "acceptable". Further, in a case where the acceleration in the horizontal direction, which acceleration is detected by the acceleration sensor 24, becomes equal to or more than the predetermined threshold within the predetermined time (for example, 1 (one) minute) from when the input information determining section 31*d* determines that the combination of the two-dimensional codes recognized by the multidimensional code recognizing section 22 matches the seventeenth combination, the input information determining section 31*d* generates the check result indicative of "rejectable".

Therefore, a worker merely needs to (i) place his/her hand over the two-dimensional code C22 serving as the at-start shielded code in the two-dimensional code table illustrated in FIG. 29 and then (ii) shake his/her head vertically in a case where a check result is acceptable or horizontally in a case where the check result is rejectable. This causes the check result to be automatically inputted and accumulated in a server device 60. As a result, it is possible to reduce worker's operation of writing on a check recoding sheet.

Concrete Example 16: Variation of Concrete Example 12

With respect to some check item, a check is carried out in accordance with a measured value displayed as a numeral on a measurement panel of a measuring device. Specifically, in a case where the measured value displayed on the measurement panel falls within a predetermined range, it is determined that a check result is "acceptable". In a case where the measured value is outside the predetermined range, it is determined that the check result is "rejectable".

Concrete Example 16 is intended to provide a work management system capable of reducing worker's operation of writing on a check recording sheet as to a check item with respect to which a check is carried out by use of such a measured value displayed on a measurement panel. Concrete Example 16 is a variation of Concrete Example 12. Therefore, only differences between Concrete Example 12 and Concrete Example 16 will be described below.

Figure 30:
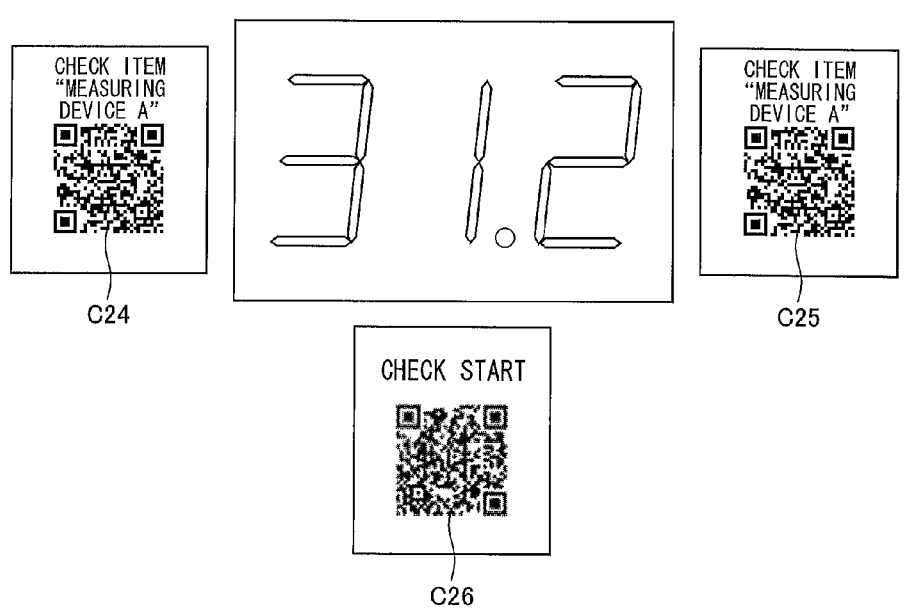
FIG. 30 is a view illustrating an example measurement panel around which two-dimensional codes are attached.

According to Concrete Example 16, for each check item with respect to which a check is carried out by use of a measured value, a two-dimensional code C24, a two-dimensional code C25, and a two-dimensional code C26 which is an at-start shielded code that is shielded in a case where the check is to be started are attached in advance around a measurement panel (see FIG. 30).

An input support information storing section 29 of Concrete Example 16 stores therein eighteenth input support information (input support information M) for each check item with respect to which a check is carried out by use of a measured value. The eighteenth input support information is information in which a combination (eighteenth combination) of the two-dimensional codes C24 and C25 as illustrated in FIG. 30, except for the at-start shielded code out of the two-dimensional codes attached around the measurement panel, is associated with an eighteenth algorithm (algorithm M).

The eighteenth algorithm includes a check result generating algorithm in accordance with which (i) a measured value is recognized, in accordance with a character recognizing algorithm, from a frame where a combination of two-dimensional codes which combination is identical to the eighteenth combination is recognized and (ii) a check result indicative of "acceptable" is generated in a case where the measured value thus recognized falls within a predetermined range or a check result indicative of "rejectable" is generated in a case where the measured value is outside the predetermined range. The eighteenth algorithm further includes a check time generating algorithm in accordance with which a current time is set as a check time. The eighteenth algorithm further includes an algorithm in accordance with which a check result registration instruction is generated as input information, the check result registration instruction including the check result generated in accordance with the check result generating algorithm, a worker ID stored in the worker ID storing section 28, a check item ID which identifies a corresponding check item, and the check time generated in accordance with the check time generating algorithm. Note that a known algorithm can be used as the character recognizing algorithm.

According to Concrete Example 16, in FIG. 30, in a case where a hand is placed over the two-dimensional code C26 serving as the at-start shielded code, an input information determining section 31d determines that a combination of two-dimensional codes recognized by a multidimensional code recognizing section 22 matches the eighteenth combination. The input information determining section 31d then generates the check result registration instruction in accordance with the eighteenth algorithm. For example, in a case where the measured value (for example, "31.2" in an example illustrated in FIG. 30), recognized by the character recognizing algorithm from the frame where the combination of the two-dimensional codes which combination is identical to the eighteenth combination is recognized, falls within the predetermined range, the input information determining section 31d generates the check result indicative of "acceptable".

According to Concrete Example 16, a worker merely needs to move to a position where an image capturing device 20, worn by the worker, is capable of capturing the measurement panel. This causes the check result to be automatically inputted and accumulated in the server device 60. As a result, it is possible to reduce worker's operation of writing on a check recording sheet.

Concrete Example 17: Variation of Concrete Example 12

Some measuring device displays a measured value with use of a pointer, instead of displaying the measured value as a numeral as in Concrete Example 15. According to such a measuring device, in a case where a pointer provided on a measurement panel points to a predetermined range, it is determined that a check result is "acceptable". In a case where the pointer points to a region outside the predetermined range, it is determined that the check result is "rejectable".

Concrete Example 17 is intended to provide a work management system capable of reducing worker's operation of writing on a check recording sheet as to a check item with respect to which a check is carried out by use of such a pointer provided on a measurement panel. Concrete Example 17 is a variation of Concrete Example 12. Therefore, only differences between Concrete Example 12 and Concrete Example 17 will be described below.

Figure 31:
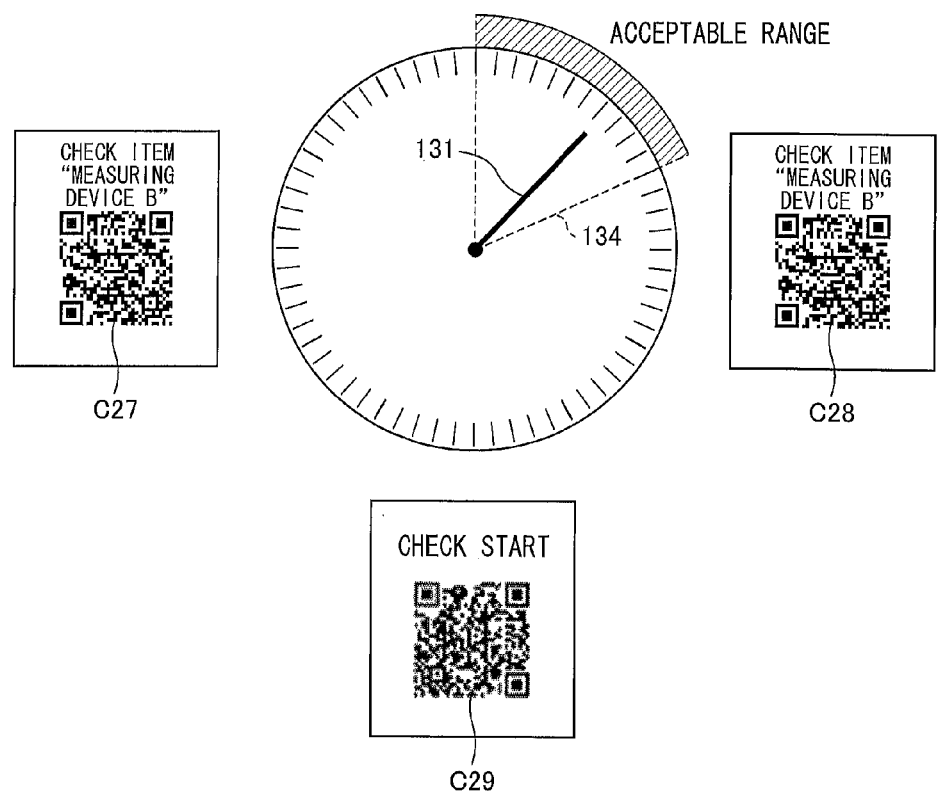
FIG. 31 is a view illustrating another example measurement panel around which two-dimensional codes are attached.

According to Concrete Example 17, a two-dimensional code C27, a two-dimensional code C28, and a two-dimensional code C29 which is an at-start shielded code that is shielded in a case where a check is to be started are attached in advance, around a measurement panel, for each check item with respect to which a check is carried out by use of a measured value (see FIG. 31).

An input support information storing section 29 of Concrete Example 17 stores therein nineteenth input support information (input support information M) for each check item with respect to which a check is carried out by use of a measured value. The nineteenth input support information is information in which a combination (nineteenth combination) of the two-dimensional codes C27 and C28, except for the at-start shielded code out of the two-dimensional codes attached around the measurement panel as illustrated in FIG. 31, is associated with a nineteenth algorithm (algorithm M).

The nineteenth algorithm includes a check result generating algorithm in accordance with which (i) a region of the measurement panel is detected from a frame where a combination of two-dimensional codes which combination is identical to the nineteenth combination is recognized and (ii) a check result indicative of "acceptable" is generated in a case where a pointer 131 is located within a predetermined range in the region thus detected (measuring device image) or a check result indicative of "rejectable" is generated in a case where the pointer 131 is located outside the predetermined range. Note that a known image processing technique can be employed so as to detect the region of the measurement panel, detect such a position of the pointer, and determine whether or not the pointer is located within the predetermined range. For example, by coating a region around the measurement panel with use of a color different from that used for the measurement panel, it is possible to recognize the region of the measurement panel with use of a color value. Further, by registering in advance a shape or a color of the pointer 131, it is possible to recognize the position of the pointer 131. Moreover, by coating, in advance with use of a predetermined color, a region (a region 134 enclosed by a dotted line in FIG. 31) in the measurement panel which region corresponds to an acceptable range where a check result is "acceptable", it is possible to determine by image processing whether or not the pointer is located within the acceptable range.

The nineteenth algorithm further includes a check time generating algorithm in accordance with which a current time is set as a check time. The nineteenth algorithm further includes an algorithm in accordance with which a check result registration instruction is generated as input information, the check result registration instruction including the check result generated in accordance with the check result generating algorithm, a worker ID stored in a worker ID storing section 28, a check item ID which identifies a corresponding check item, and the check time generated in accordance with check time generating algorithm.

Also according to Concrete Example 17, a worker merely needs to move to a position where an image capturing device 20, worn by the worker, is capable of capturing the measurement panel. This causes the check result to be automatically inputted and accumulated in a server device 60. As a result, it is possible to reduce worker's operation of writing on a check recording sheet.

Concrete Example 18: Automatic Creation of Abnormality Occurrence Moving Image (Problem to be Solved by Concrete Example 18)

Conventionally, a camera has been provided to a specific production device so as to record an operation situation. In a case where any abnormality (trouble) has occurred in the production device, a scene recorded while the abnormality occurred is clipped off from an entire recorded moving image, and a cause of the abnormality is investigated or how to handle the abnormality is determined.

However, as has been described, in a case where the camera is provided at a fixed position, a blind spot is formed. Therefore, depending on an area where the abnormality occurs, it is not possible to capture an image of the area. Besides, it is highly likely that, even in a case where the image of the area can be captured, it is not possible to accurately understand the operation situation. As a result, it is not possible to investigate the cause of the abnormality or to determine how to handle the abnormality. Furthermore, it takes a lot of time and labor to clip off, from the recorded moving image, the scene recorded while the abnormality occurred.

Concrete Example 18 is to solve such problems, and is intended to provide a work management system capable of more absolutely accumulating a moving image of an operation situation captured while an abnormality occurs.

(Configuration of Work Management System of Concrete Example 18)

Figure 32:
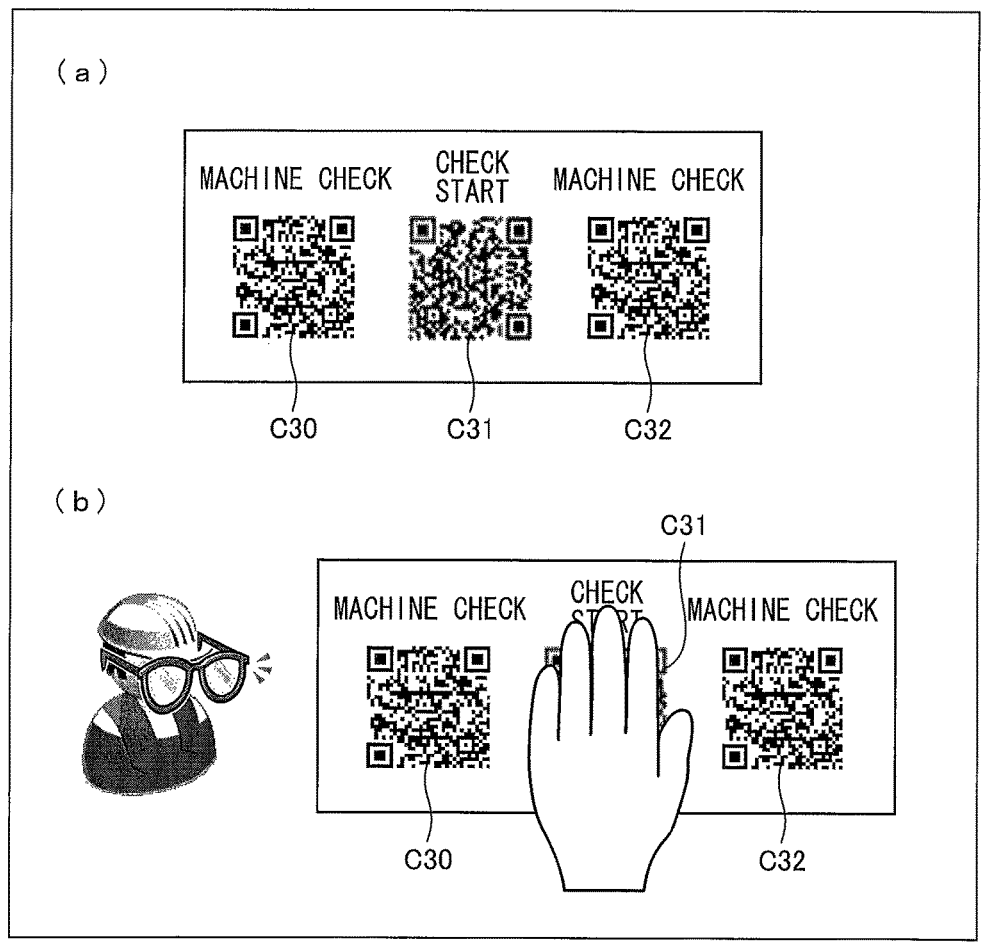
FIG. 32 is a view illustrating an example two-dimensional code table prepared in advance in Concrete Example 18.

According to Concrete Example 18, a two-dimensional code table as illustrated in (a) of FIG. 32 is attached to each production device 40 whose operation situation during occurrence of an abnormality is desired to be checked. In (a) of FIG. 32, two-dimensional codes C30 and C32 located at respective both sides are each a code uniquely assigned to a corresponding production device 40, and are each a machine check code indicative of a check carried out on the production device 40. A two-dimensional code C31 located between the two-dimensional codes C30 and C32 is an at-start shielded code which is shielded by a hand or the like in a case where a check is to be started on the production device 40. A worker places his/her hand over the at-start shielded code while looking at the two-dimensional code table attached to the production device 40, before starting the check on the production device 40 (see (b) of FIG. 32).

Figure 33:
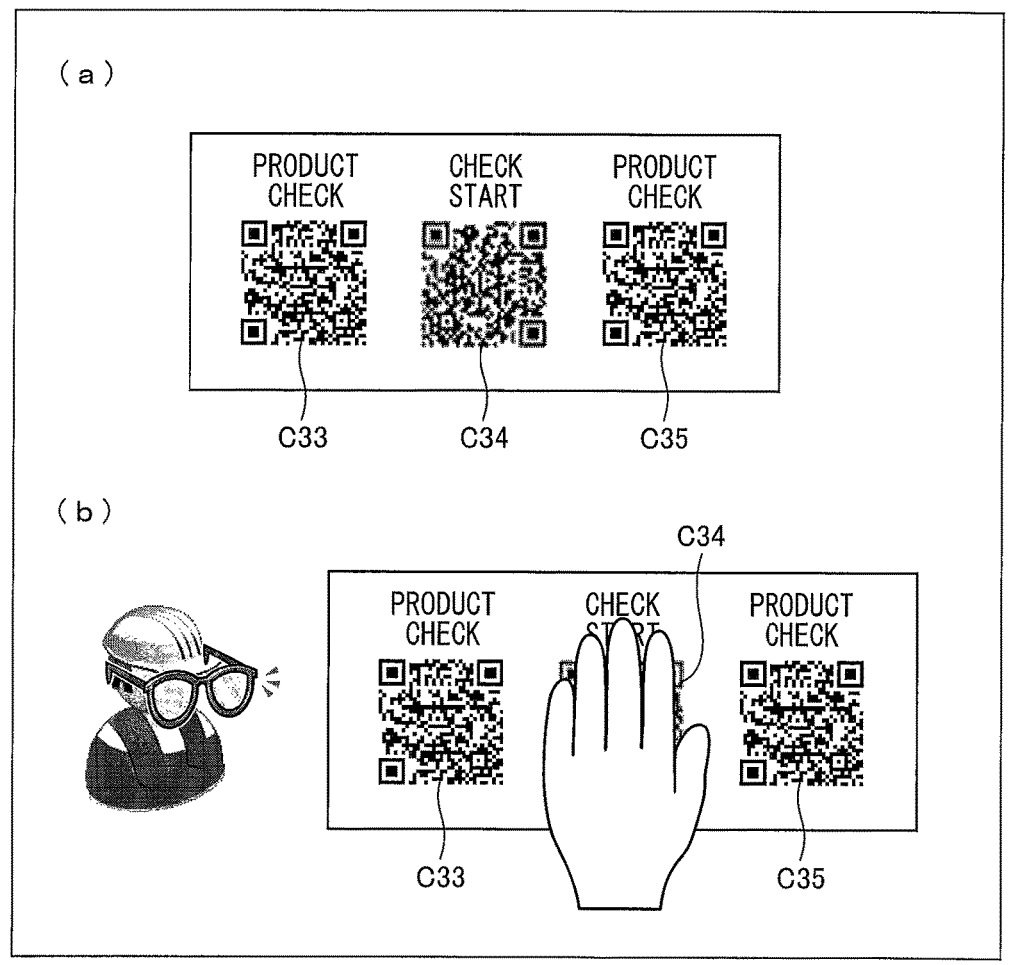
FIG. 33 is a view illustrating another example two-dimensional code table prepared in advance in Concrete Example 18.

Further, according to Concrete Example 18, a two-dimensional code table as illustrated in (a) of FIG. 33 is attached to each production device 40 whose operation situation during occurrence of an abnormality is desired to be checked. In (a) of FIG. 33, two-dimensional codes C33 and C35 located at respective both sides are each a code uniquely assigned to a corresponding production device 40, and are each a product check code indicative of a check carried out on a product produced by the production device 40. A two-dimensional code C34 located between the two-dimensional codes C33 and C35 is an at-start shielded code which is shielded by a hand or the like in a case where a check is to be started on the product produced by the production device. The worker places his/her hand over the at-start shielded code while looking at the two-dimensional code table attached to the production device 40, before starting the check on the product produced by the production device 40 (see (b) of FIG. 33).

Figure 34:
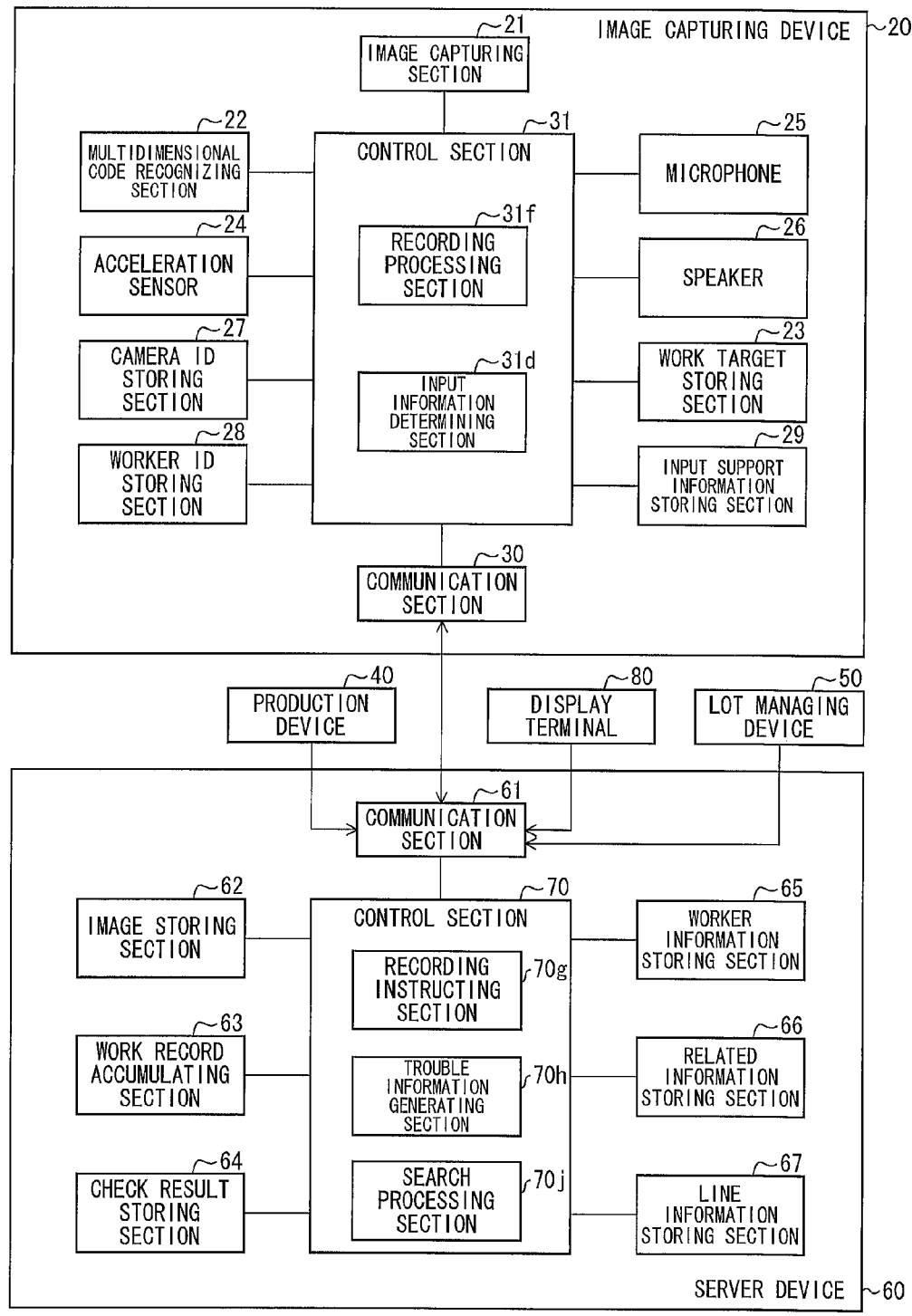
FIG. 34 is a block diagram illustrating internal configurations of a control section of an image capturing device and a control section of a server device which are provided in a work management system in accordance with Concrete Example 18.

FIG. 34 is a block diagram illustrating internal configurations of a control section of an image capturing device and a control section of a server device which are provided in the work management system of Concrete Example 18. As illustrated in FIG. 34, a control section 31 of an image capturing device 20 includes an input information determining section 31d and a recording processing section 31f. A control section 70 of a server device 60 includes a recording instructing section (machine signal receiving section) 70g, a trouble information generating section (trouble information processing section) 70h, and a search processing section 70j.

The input information determining section 31, similar to that in Concrete Example 7, determines input information in accordance with input support information, and controls a communication section 30 so as to transmit the input information thus determined to the server device 60.

Note, however, that an input support information storing section 29 of Concrete Example 18 stores therein, for each production device 40 whose operation situation during occurrence of an abnormality is desired to be checked, (i) twentieth input support information which supports input of a start of a check on the each production device 40 and (ii) twenty-first input support information which supports input of a start of a check on a product.

The twentieth input support information is information in which a combination (twentieth combination) of the two-dimensional codes C30 and C32 located at respective both sides of the two-dimensional code table illustrated in (a) of FIG. 32 is associated with a twentieth algorithm. The twentieth algorithm is an algorithm in accordance with which a machine check signal (machine inspection signal) to which a worker ID (machine inspector identification information) stored in a worker ID storing section 28 is added is set as the input information.

The twenty-first input support information is information in which a combination (twenty-first combination) of the two-dimensional codes C33 and C35 located at respective both sides of the two-dimensional code table illustrated in (a) of FIG. 33 is associated with a twenty-first algorithm. The twenty-first algorithm is an algorithm in accordance with which a product check signal (product inspection signal) to which the worker ID (product inspector identification information) stored in the worker ID storing section 28 is added is set as the input information.

In a case where the worker is to start the check (machine inspection) on the production device, the worker places his/her hand over the at-start shielded code as illustrated in (b) of FIG. 32. In this case, since the at-start shielded code is hidden by the worker's hand, a multidimensional code recognizing section 22 of the image capturing device 20, which captures an image of the worker's hands, recognizes, from a captured frame, the combination of the two-dimensional codes C30 and C32 located at the respective both sides of the two-dimensional code table (which combination is identical to the twentieth combination). Therefore, the input information determining section 31d functions as a machine inspection signal generating section which, in accordance with the twentieth input support information, reads the worker ID from the worker ID storing section 28 and determines, as the input information, the machine check signal to which the worker ID thus read is added.

In a case where the worker is to start the check on the product (product inspection), the worker places his/her hand over the at-start shielded code as illustrated in (b) of FIG. 33.

In this case, since the at-start shielded code is hidden by the worker's hand, the multidimensional code recognizing section 22 of the image capturing device 20, which captures an image of the worker's hands, recognizes, from a captured frame, the combination of the two-dimensional codes C33 and C35 located at the respective both sides of the two-dimensional code table (which combination of identical to the twenty-first combination). Therefore, the input information determining section 31d functions as a product inspection signal generating section which, in accordance with the twenty-first input support information, reads the worker ID from the worker ID storing section 28 and determines, as the input information, the product check signal to which the worker ID thus read is added.

The recording processing section 31f starts transmitting, to the server device 60, a frame captured by the image capturing section 21, upon receipt of a recording start instruction from the server device 60. The recording processing section 31f stops transmitting, to the server device 60, the frame captured by the image capturing section 21, upon receipt of a recording stop instruction from the server device 60.

The recording instructing section 70g controls a communication section 61 so as to transmit, for each production line, the recording start instruction or the recording stop instruction to the image capturing device 20, depending on a status signal supplied from the production device 40.

Figure 35:
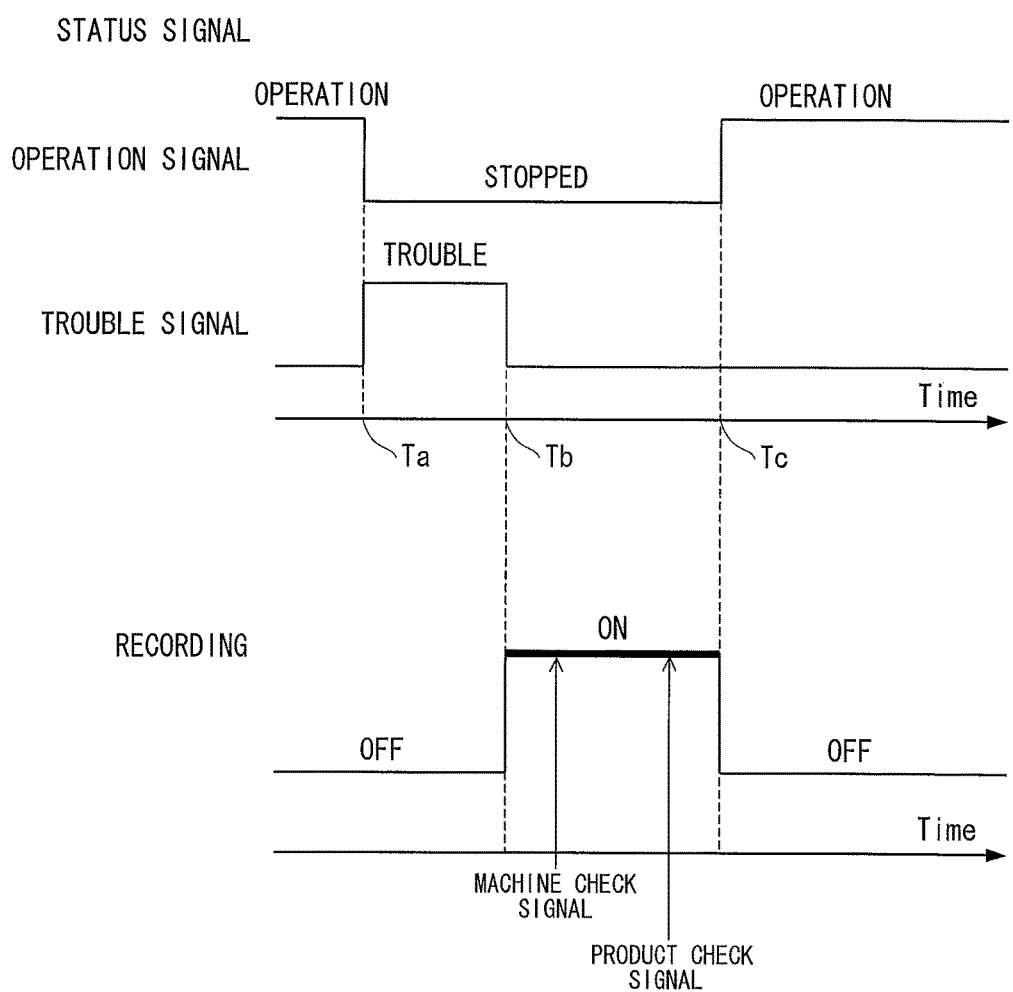
FIG. 35 is a view illustrating a relationship between a change in status signal outputted from a production device and a recording time period of the image capturing device in Concrete Example 18.

As has been described, the production device 40 outputs, as the status signal, (i) an operation signal indicating whether the production device 40 is in operation or stopped and (ii) a trouble signal indicating whether an abnormality reporting section 45 is in operation or not. FIG. 35 is a view illustrating a relationship between a change in the status signal and a recording time period. Upper part of FIG. 35 illustrates an example time course of the status signal. As has been described, the production device 40 is designed to be stopped in a case where any abnormality occurs. Therefore, in a case where any abnormality occurs while the production device 40 is in operation, the production device 40 transmits, to the server device 60, (i) the operation signal indicating that the production device 40 is stopped and (ii) the trouble signal indicating that the abnormality reporting device 45 is in operation. Thereafter, in a case where the worker, upon receipt of a report from the abnormality reporting section 45, comes to the production device 40 and presses a button for canceling such abnormality reporting, the production device 40 changes the trouble signal to one indicating that the abnormality reporting is cancelled. In a case where the worker then handles the abnormality and accordingly operation is resumed, the production device 40 changes the operation signal to one indicating that the production device 40 is in operation.

According to Concrete Example 18, the recording instructing section 70g outputs the recording start instruction at a timing when the trouble signal is changed from one indicating that the abnormality reporting is given to one indicating that the abnormality reporting is cancelled. That is, the recording instructing section 70g recognizes, as an abnormality start signal, a combination of (i) the operation signal indicating that the production device 40 is stopped and (ii) the trouble signal indicating that the abnormality reporting is cancelled, and outputs the recording start instruction at a timing of receipt of the abnormality start signal. In such a case where the production line is in automatic operation, the worker is not in a vicinity of the production device 40 from a timing (reference sign "Ta" in FIG. 35) when the abnormality occurred to a timing (reference sign "Tb" in FIG. 35) when the abnormality report is cancelled. Therefore, a moving image captured during such a time period by the image capturing device 20 worn by the worker is not related to action to be taken against the abnormality. For this reason, the recording instructing section 70g outputs the recording start instruction at a timing when the worker comes to the vicinity of the production device 40, that is, at a timing when the abnormality reporting is cancelled.

In this case, the recording instructing section 70g specifies, from a worker information storing section 65, a camera ID of the image capturing device 20 worn by the worker who is in charge of a corresponding production line. The recording instructing section 70g then supplies the recording start instruction merely to the image capturing device 20, which is identified by the camera ID thus specified.

The recording instructing section 70g outputs the recording stop instruction at a timing (reference sign "Tc" in FIG. 35) when the operation signal is changed from one indicating that the production device 40 is stopped to one indicating that the production device 40 is in operation. The timing when the operation signal is changed from one indicating that the production device 40 is stopped to one indicating that the production device 40 is in operation indicates a timing when the abnormality is overcome.

In this case, the recording instructing section 70g specifies, from the worker information storing section 65, the camera ID of the image capturing device 20 worn by the worker who is in charge of the corresponding production line. The recording instructing section 70g then supplies the recording stop instruction merely to the image capturing device 20 which is identified by the camera ID thus specified.

The recording instructing section 70g temporarily stores, in an image storing section 62, a moving image received from the image capturing device 20 to which the recording instructing section 70g has supplied the recording start instruction, as an abnormality occurrence moving image. In this case, the recording instructing section 70g temporarily stores, in an image storing section 62, the abnormality occurrence moving image in association with the worker ID received from the image capturing device 20.

The trouble information generating section 70h generates trouble information on the abnormality which occurred in the production device 40, and stores the trouble information in the image storing section 62. FIG. 36 is a view illustrating example trouble information generated by the trouble information generating section 70h. As illustrated in FIG. 36, the trouble information is information in which, for each production device 40 in which an abnormality occurred, a machine ID which identifies the each production device 40 is associated with (i) a unit ID which identifies a unit in the each production device 40 in which unit the abnormality occurred, (ii) a time at which the abnormality occurred (abnormality occurrence time), (iii) a time at which the abnormality reporting was cancelled (handling start time), (iv) a time at which action against the abnormality was ended (action end time), (v) contents of the action, (vi) a line name of a production line to which the each production device 40 belongs, (vii) a location name indicative of a location where the each production device 40 is provided, (viii) a machine handling worker ID indicative of a worker who carried out a check on the each production device 40 after the abnormality occurred, (ix) a moving image file captured by the image capturing device 20 worn by the worker identified by the machine handling worker ID, (x) a product ID and a lot number of a product produced by the each production device 40, (xi) a product checking worker ID indicative of a worker who carried out a check on the production produced by the each production device 40 after the abnormality occurred, and (xii) a moving image file captured by the image capturing device 20 worn by the worker identified by the product checking worker ID.

The trouble information generating section 70h obtains, from the production device 40 which outputs (i) the operation signal indicating that the production device 40 is stopped and (ii) the trouble signal indicating that the abnormality reporting is given, the machine ID which identifies the production device 40, the unit ID which identifies the unit in which the abnormality occurs, and the abnormality occurrence time. The trouble information generating section 70h then generates a trouble information record in which the machine ID, the unit ID, and the abnormality occurrence time thus obtained are associated with each other, and stores the trouble information record in the image storing section 62.

For each trouble information record, the trouble information generating section 70h obtains, from a line information storing section 67, the line name and the location name each corresponding to the machine ID included in the each trouble information record, and adds the line name and the location name thus obtained to the each trouble information record.

Further, for the each trouble information record, the trouble information generating section 70h obtains, from a lot managing device 50, the product ID and the lot number each corresponding to the machine ID included in the each trouble information record, and adds the product ID and the lot number thus obtained to the each trouble information record.

Further, for the each trouble information record, the trouble information generating section 70h adds, to the each trouble information record, a time at which the trouble signal is changed from one indicating that the abnormality reporting is given to one indicating that the abnormality reporting is cancelled, as the handling start time. For the each trouble information record, the trouble information generating section 70h adds, to the each trouble information record, a time at which the operation signal is changed from one indicating that the production device 40 is stopped to one indicating that the production device 40 is in operation, as the action end time.

Further, for the each trouble information record, the trouble information generating section 70h specifies, from the worker information storing section 65, worker IDs corresponding to the line name included in the each trouble information record. The trouble information generating section 70h determines whether, out of the worker IDs thus specified, there is a worker ID which matches the worker ID added to the machine check signal received from the image capturing device 20. In a case where there is a worker ID which matches the worker ID added to the machine check signal, the trouble information generating section 70h adds, to the each trouble information record, the worker ID as the machine handling worker ID. In a case where there is no worker ID which matches the worker ID added to the machine check signal, the trouble information generating section 70h adds, to the each trouble information record, a worker ID which corresponds to the line name included in the each trouble information record and which has a main worker flag, out of the worker IDs stored in the worker information storing section 65, as the machine handling worker ID (machine inspector identification information). The trouble information generating section 70h then reads, from the image storing section 62, the abnormality occurrence moving image corresponding to the machine handling worker ID, and adds, to the each trouble information record, the abnormality occurrence moving image as a machine handling moving image.

Similarly, for the each trouble information record, the trouble information generating section 70h specifies, from the worker information storing section 65, the worker IDs corresponding to the line name included in the each trouble information record. The trouble information generating section 70h determines whether, out of the worker IDs thus specified, there is a worker ID which matches the worker ID added to the product check signal received from the image capturing device 20. In a case where there is a worker ID which matches the worker ID added to the product check signal, the trouble information generating section 70h adds, to the each trouble information record, the worker ID as the product checking worker ID (product inspector identification information). In a case where there is no worker ID which matches the worker ID added to the product check signal, the trouble information generating section 70h adds, to the each trouble information record, the worker ID which corresponds to the line name included in the each trouble information record and which has the main worker flag, out of the worker IDs stored in the worker information storing section 65, as the product checking worker ID. The trouble information generating section 70h then reads, from the image storing section 62, the abnormality occurrence moving image corresponding to the product checking worker ID, and adds, to the each trouble information record, the abnormality occurrence moving image as a product check moving image.

The search processing section 70j, in response to a search request supplied from a display terminal 80, searches for the trouble information (see FIG. 36) stored in the image storing section 62, and transmits a search result screen to the display terminal 80.

For example, the search processing section 70j can create the search result screen on which pieces of trouble information are sorted according to the machine ID, the unit ID, the machine worker ID, and/or the product checking worker ID. FIG. 37 is an example search result screen on which the pieces of trouble information are sorted according to the machine ID and the unit ID. Alternatively, as illustrated in FIG. 38, the pieces of the trouble information can be sorted according to the contents of the action in descending order of the number of times the action is taken.

Alternatively, the search processing section 70j can (i) calculate, as a recovery time, a time which is a difference between the action end time and the handling start time and (ii) create the search result screen including the recovery time thus calculated. FIG. 39 is an example search result screen on which the pieces of the trouble information are sorted according to the location name and which includes the recovery time calculated for each trouble information record. Furthermore, as illustrated in FIG. 39, the search processing section 70j can cause the search result screen to include a standard time which serves as a reference against the recovery time. The standard time can be set in advance or can be alternatively set as in Concrete Example 6. In this case, the search processing section 70j can create the search result screen on which the pieces of the trouble information are sorted according to a difference between the standard time and the recovery time in ascending or descending order.

Further, the search processing section 70j receives, from the display terminal 80, a request for delivery of the machine handling moving image or the product check moving image, and delivers, to the display terminal 80, the machine handling moving image or the product check moving image specified by such a delivery request. This allows the worker or the manager to check a desired moving image by operating the display terminal 80.

In this case, the search processing section 70j can be arranged to (i) count the number of times of the delivery for each machine handling moving image and each product check moving image and (ii) accumulate the number of times of the delivery thus counted by adding it to the trouble information. In this case, the search processing section 70j is capable of creating the search result screen on which the pieces of the trouble information are sorted according to the number of times of the delivery in descending order.

(Flow of Process of Generating Trouble Information in Concrete Example 18)

Next, the following description will discuss how the work management system of Concrete Example 18 generates the trouble information. FIG. 40 is a flowchart illustrating a flow of a process of generating trouble information. The trouble information generating section 70h of the server device 60 carries out the process illustrated in FIG. 40 for each production line. FIG. 40 illustrates a process carried out with respect to a production line "a" (merely referred to as "line "a"" in FIG. 40).

First, the trouble information generating section 70h examines a status signal outputted from a production device 40 which belongs to the production line "a", that is, determines whether (i) an operation signal indicates that the production device 40 is stopped and (ii) a trouble signal indicates that abnormality reporting is given (step S31). In a case of No in the step S31, the step S31 is repeated.

In a case where the production device 40 outputs (i) the operation signal indicating that the production device 40 is stopped and (ii) the trouble signal indicating that the abnormality reporting is given (Yes, in the step S31), the trouble information generating section 70h requests the production device 40 for a machine ID, a unit ID of a unit in which an abnormality occurs, an abnormality occurrence time, and obtains these pieces of information. The trouble information generating section 70h then generates a trouble information record including the machine ID, the unit ID, and the abnormality occurrence time thus obtained, and stores the trouble information record in the image storing section 62 (step S32). In this case, the trouble information generating section 70h specifies, from the line information storing section 67, a location name and a line name corresponding to the production line "a", and adds the location name and the line name thus specified to the trouble information record.

Next, the control section 70 determines whether the control section 70 receives, from the production device 40, the trouble signal indicating that the abnormality reporting is cancelled (step S33). In a case where the control section 70 does not receive the trouble signal indicating that the abnormality reporting is cancelled, the step S33 is repeated.

In a case where the control section 70 receives the trouble signal indicating that the abnormality reporting is cancelled (Yes, in the step S33), a step S34 is carried out. In the step S34, the trouble information generating section 70h adds, to the trouble information record generated in the step S32, a current time as a handling start time. Meanwhile, the recording instructing section 70g and the trouble information generating section 70h each read, from the worker information storing section 65, (i) a worker ID of a worker who works in the production line "a" and (ii) a camera ID worn by the worker.

The recording instructing section 70g then supplies a recording start instruction to the image capturing device 20 identified by the camera ID thus read (step S35). This causes the recording processing section 31f of the image capturing device 20 which receives the recording start instruction to start transmitting, to the server device 60, (i) a frame captured by the image capturing section 21 and (ii) the worker ID. The recording instructing section 70g temporarily stores, in the image storing section 62, the frame received from the image capturing device 20, as a frame of which an abnormality occurrence moving image is made up, in association with the worker ID. Meanwhile, the trouble information generating section 70h reads, from the lot managing device 50, a product ID and a lot number corresponding to the production line "a", and adds the product ID and the lot number to the trouble information record (step S36).

Note that the case, where the control section 70 receives the trouble signal indicating that the abnormality reporting is cancelled (Yes, in the step S33), indicates when the worker presses a button for cancelling abnormality reporting which button is provided in the production device 40. The worker then carries out a machine check on the production device 40 or a product check on a product produced by the production device 40. In this case, the worker who carries out the machine check places his/her hand over a two-dimensional code C31 serving as an at-start shielded code while looking at a two-dimensional code table (see FIG. 32) attached to the production device 40. This causes, as has been described above, the input information determining section 31d of the image capturing device 20 worn by the worker to transmit, to the server device 60, a machine check signal to which the worker ID is added. Further, the worker who carries out the product check places his/her hand over a two-dimensional code C34 serving as an at-start shielded code while looking at a two-dimensional code table (see FIG. 33) attached to the production device 40. This causes, as has been described above, the input information determining section 31d of the image capturing device 20 worn by the worker to transmit, to the server device 60, a product check signal to which the worker ID is added. Note that, in a case where the trouble information generating section 70h of the server device 60 receives the machine check signal or the product check signal, the trouble information generating section 70h temporarily stores therein the machine check signal or the product check signal.

Next, the control section 70 determines whether the control section 70 receives, from the production device 40, the operation signal indicating that the production device 40 is in operation (step S37). In a case where the control section 70 does not receive the operation signal indicating that the production device 40 is in operation (No, in the step S37), the step S37 is repeated.

In a case where the control section 70 receives the operation signal indicating that the production device 40 is in operation (Yes, in the step S37), the trouble information generating section 70h adds, to the trouble information record generated in the step S32, a current time as an action end time (step S38). Meanwhile, the recording instructing section 70g supplies a recording stop instruction to the image capturing device 20 to which the recording instructing section 70g has supplied the recording start instruction in the step S35 (step S39). This causes the recording processing section 31f of the image capturing device 20, which receives the recording stop instruction, to stop transmitting, to the server device 60, the frame captured by the image capturing section 21.

Then, the trouble information generating section 70h determines whether or not the trouble information generating section 70h received the machine check signal between when the control section 70 determined that the control section 70 received the trouble signal indicating that the abnormality reporting was cancelled (Yes, in the step S33) and when the control section 70 determined that the control section 70 received the operation signal indicating that the production device 40 was in operation (Yes, in the step S37) (step S40). In a case where the trouble information generating section 70h receives the machine check signal (Yes, in the step S40), the trouble information generating section 70h adds, to the trouble information record generated in the step S32, the worker ID, added to the machine check signal, as a machine handling worker ID (step S41). Further, the trouble information generating section 70h reads, from the image storing section 62, the abnormality occurrence moving image corresponding to the machine handling worker ID, and adds the abnormality occurrence moving image to the trouble information record generated in the step S32 (step S42).

On the other hand, in a case where the trouble information generating section 70h does not receive the machine check signal (No, in the step S40), the trouble information generating section 70h specifies, from the worker information storing section 65, a worker ID which corresponds to the production line "a" and which has a main worker flag. The trouble information generating section 70h then adds, to the trouble information record generated in the step S32, the worker ID thus specified as the machine handling worker ID (step S43). Further, the trouble information generating section 70h reads, from the image storing section 62, the abnormality occurrence moving image corresponding to the machine handling worker ID, and adds the abnormality occurrence moving image to the trouble information record generated in the step S32 (step S44).

Next, the trouble information generating section 70h determines whether or not the trouble information generating section 70h received the product check signal between when the control section 70 determined that the control section 70 received the trouble signal indicating that the abnormality reporting was cancelled (Yes, in the step S33) and when the control section 70 determined that the control section 70 received the operation signal indicating that the production device 40 was in operation (Yes, in the step S37) (step S45). In a case where the trouble information generating section 70h receives the product check signal (Yes, in the step S45), the trouble information generating section 70h adds, to the trouble information record generated in the step S32, the worker ID, added to the product check signal, as a product checking worker (step S46). Further, the trouble information generating section 70h reads, from the image storing section 62, the abnormality occurrence moving image corresponding to the product checking worker ID, and adds the abnormality occurrence moving image to the trouble information record generated in the step S32 (step S47).

On the other hand, in a case where the trouble information generating section 70h does not receive the product check signal (No, in the step S45), the trouble information generating section 70h specifies, from the worker information storing section 65, the worker ID which corresponds to the production line "a" and which has the main worker flag. The trouble information generating section 70h then adds, to the trouble information record generated in the step S32, the worker ID thus specified as the product checking worker ID (step S48). Further, the trouble information generating section 70h reads, from the image storing section 62, the abnormality occurrence moving image corresponding to the product checking worker ID, and adds the abnormality occurrence moving image to the trouble information record generated in the step S32 (step S49).

Thereafter, at an appropriate timing or in accordance with an instruction from the worker, the trouble information generating section 70h transmits, to an input-output terminal of the production line "a", a screen which encourages input of contents of action taken, and obtains the contents of the action from the input-output terminal. The trouble information generating section 70h then adds the contents of the action to the trouble information record generated in the step S32.

In this manner, the server device 60 is capable of accumulating trouble information as illustrated in FIG. 36.

According to Concrete Example 18, it is possible to accumulate a moving image captured from a worker's viewpoint, as a machine handling moving image or a product check moving image. It is therefore possible to easily understand a point to which attention should be paid, when the machine handling moving image or the product check moving image is later viewed.

Furthermore, since a recording start instruction and a recording stop instruction are generated depending on a status signal supplied from a production device 40, it is possible to automatically accumulate merely a moving image captured while an abnormality is handled. As a result, it is not necessary to carry out a process of clipping off the moving image. Moreover, it is possible to reduce a capacity of the server device 60 to accumulate the moving image.

Moreover, a moving image captured during occurrence of an abnormality is accumulated in the server device 60 in association with a machine ID, a unit ID, a location name, and the like. Therefore, it is possible for a worker or a manager to easily check a necessary moving image anytime by operating the display terminal 80. For example, in a case where a worker handles an abnormality which occurs in a production device 40, it is possible for the worker to easily check merely a machine handling moving image corresponding to the production device 40 by specifying a machine ID of the production device 40.

Moreover, by providing a plurality of display terminals 80, it is possible for a worker or a manager to easily check a necessary moving image anywhere by operating one of the plurality of display terminals 80 which one is in a vicinity of the worker or the manager.

Further, a moving image captured during occurrence of an abnormality is associated with contents of action taken. Therefore, it is possible to easily check a moving image corresponding to contents of action which is frequently taken.

Further, not only a machine handling moving image but also a product check moving image is accumulated. Therefore, even in a case where a complaint about a product is later received, it is possible to carry out a post-survey on an effect, on a product, of an abnormality of a production device 40, by viewing the product check moving image.

Concrete Example 19: Variation of Concrete Example 18

Concrete Example 18 has described a case where recording is started at a timing when the trouble signal is changed to one indicating that the abnormality reporting is cancelled. Alternatively, in a case of such a production line that a worker carries out operation near the production device 40, the recording instructing section 70g can outputs the recording start instruction at a timing (reference sign "Ta" in FIG. 35) when the server device 60 receives the trouble signal indicating that the abnormality reporting is given. That is, the recording instructing section 70g recognizes, as the abnormality start signal, a combination of (i) the operation signal indicating that the production device 40 is stopped and (ii) the trouble signal indicating that the abnormality reporting is given, and outputs the recording start instruction at a timing of receipt of the abnormality start signal.

Concrete Example 20: Variation of Concrete Example 18

In Concrete Example 18, the control section 70 of the server device 60 can alternatively transmit, to the display terminal 80, the frame of which the abnormality occurrence moving image is made up of and which is received from the image capturing device 20, in response to an instruction from the display terminal 80. The display terminal 80 then displays, on a display section 83, the abnormality occurrence moving image received from the server device 60.

This allows the manager looking at the display terminal 80 to check in real time a moving image captured by the image capturing device 20 worn by the worker carrying out a machine check on the production device 40.

Furthermore, the display terminal 80 can be configured to include a microphone and a speaker and to receive and transmit, in real time, a sound signal from/to the image capturing device 20 via the server device 60. This allows the manager to give an instruction to the worker by use of a sound while checking, on the display terminal 80, a work range of the worker.

Concrete Example 21: Variation of Concrete Example 18

In Concrete Example 18, in a case where the trouble information generating section 70h does not receive the machine check signal or the product check signal, a moving image captured by the image capturing device 20 worn by a main worker is set as the machine handling moving image or the product check moving image. Alternatively, in a case where the trouble information generating section 70h does not receive the machine check signal or the product check signal, the trouble information generating section 70h does not need to register the machine handling moving image or the product check moving image in the trouble information. That is, according to the flow of the process illustrated in FIG. 40, in a case of No in the step S40, the steps S43 and S44 are omitted. In a case of No in the step S45, the steps S48 and S49 are omitted.

This is because the moving image captured by the image capturing device 20 worn by the main worker is not always a moving image showing check operation. Therefore, it is possible to prevent an unnecessary moving image from being accumulated.

(Others)

In the foregoing description, it has been explained that the server device 60 includes the image storing section 62, the work record accumulating section 63, the check result storing section 64, the worker information storing section 65, the related information storing section 66, and the line information storing section 67. Alternatively, the work management system 1 can include another storing device in addition to the server device 60, and the storing device can include all of or part of the image storing section 62, the work record accumulating section 63, the check result storing section 64, the worker information storing section 65, the related information storing section 66, and the line information storing section 67. In this case, the server device 60 only needs to access the storing device via a network.

(Software Implementation Example)

Finally, each block of the image capturing device 20 and the server device 60 can be implemented by hardware such as a logic circuit provided on an integrated circuit (IC chip) or can alternatively be implemented by software with the use of a CPU (Central Processing Unit).

In the latter case, each of the image capturing device 20 and the server device 60 includes: a CPU which executes instructions of a program that carries out the foregoing functions; and a storage device (recording medium) such as a ROM (Read Only Memory) which stores the program, a RAM (Random Access Memory) in which the program is loaded, and a memory which stores the program and various sets of data. The object of the present invention can be attained by (i) supplying, to each of the image capturing device 20 and the server device 60, the recoding medium in which program codes (an executable program, an intermediate code program, and a source program) of a program for controlling the image capturing device 20 and the server device 60, each of which is implemented by software that executes the foregoing functions, are computer-readably recorded and (ii) causing a computer (or a CPU or an MPU) of the each of the image capturing device 20 and the server device 60 to read and execute the program codes recorded in the recording medium.

Examples of the recording medium includes non-transitory tangible mediums, for example, (i) tapes such as a magnetic tape and a cassette tape; (ii) disks including magnetic disks, such as a Floppy (Registered Trademark) disk and a hard disk, and optical disks, such as a CD-ROM, an MO, an MD, a DVD, and a CD-R; (iii) cards such as an IC card (including a memory card) and an optical card; (iv) semiconductor memories such as a mask ROM, EPROM, EEPROM (Registered Trademark), and a flash ROM; and (v) logic circuits such as a PLD (Programmable Logic Device) and an FPGA (Field Programmable Gate Array).

Each of the image capturing device 20 and the server device 60 can be connected to a communication network so that the program codes are supplied to the each of the image capturing device 20 and the server device 60 via the communication network. This communication network is not limited to any particular one, provided that the program codes can be transmitted. Examples of the communication network include the Internet, an intranet, an extranet, a LAN, ISDN, VAN, a CATV communications network, a virtual private network, a telephone network, a mobile telecommunications network, and a satellite communication network.

Further, a transmission medium by which the communication network is constituted is not limited to any particular one, provided that the program codes can be transmitted. Examples of the transmission medium include: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE802.11 wireless communication system, HDR (High Digital Rate), NFC (Near Field Communication), DLNA (Digital Living Network Alliance), a mobile phone network, a satellite circuit, and a digital terrestrial network.

SUMMARY

A work management system in accordance with the present invention is a work management system including: an image capturing device worn by a worker; and a server device, the image capturing device including: an image capturing section for capturing an image of a work range of the worker; and a communication section for transmitting, to the server device, at least one of (i) the image captured by the image capturing section and (ii) generated information generated in accordance with the image, the server device including: a management section for managing the at least one of the image and the generated information which one is received from the communication section.

Further, a work management method in accordance with the present invention is a method of managing a work management system including (i) an image capturing device worn by a worker and (ii) a server device, the image capturing device including an image capturing section for capturing an image of a work range of the worker, the method comprising the steps of: transmitting, to the server device, at least one of (i) the image captured by the image capturing section and (ii) generated information generated in accordance with the image; and managing the at least one of the image and the generated information which one is received by the server device.

According to the above configuration, the image capturing device is worn by the worker, and captures an image of the work range of the worker. Since the image capturing device captures the image of the work range, an image of the worker himself/herself is not captured. This causes a psychological burden to be less imposed on the worker. It is therefore possible to provide a work management system capable of easily capturing an image of a work range of a worker while less imposing a psychological burden on the worker.

The work management system of the present invention is preferably arranged so as to further include: an image storing section, wherein: the image capturing device further includes an instruction receiving section for receiving (i) a creation start instruction to start creating a work standard and (ii) a creation end instruction to end creation of the work standard; and the management section stores, in the image storing section, a moving image which is captured by the image capturing section from when the instruction receiving section receives the creation start instruction until when the instruction receiving section receives the creation end instruction, as a moving-image work standard.

According to the above configuration, it is possible to easily create the moving-image work standard in which the image of the work range is accurately captured, by the worker wearing the image capturing device.

Further, the work management system of the present invention is preferably arranged such that: the communication section transmits, to the server device, the moving image which is captured by the image capturing section from when the instruction receiving section receives the creation start instruction until when the instruction receiving section receives the creation end instruction, as the moving-image work standard; and the management section stores, in the image storing section, the moving-image work standard received from the communication section.

According to the above configuration, clipping of the moving-image work standard is carried out by the image capturing device. Therefore, the server device does not need to clip the moving-image work standard.

Further, the work management system of the present invention is preferably arranged such that: the image capturing device further includes a multidimensional code recognizing section for recognizing multidimensional codes contained in the image captured by the image capturing section; the instruction receiving section receives the creation start instruction to start creating the work standard, in a case where the multidimensional codes recognized by the multidimensional code recognizing section indicate that the creation of the work standard is to be started; and the instruction receiving section receives the creation end instruction to end the creation of the work standard, in a case where the multidimensional codes recognized by the multidimensional code recognizing section indicate that the creation of the work standard is ended.

According to the above configuration, the creation start instruction or the creation end instruction is automatically inputted merely by (i) preparing, in advance, the multidimensional codes which correspond to a start of creation of a work standard and (ii) the worker acting so that the image capturing device worn by the worker captures an image of the multidimensional codes.

Further, the work management system of the present invention is preferably arranged such that: the image capturing device further includes a multidimensional code recognizing section for recognizing multidimensional codes contained in the image captured by the image capturing section; and the communication section transmits, to the server device, information corresponding to the multidimensional codes recognized by the multidimensional code recognizing section, as the generated information.

According to the above configuration, the generated information is automatically transmitted to the server device, merely by (i) preparing, in advance, the multidimensional codes and (ii) the worker acting so that the image capturing device worn by the worker captures an image of the multidimensional codes.

Further, the work management system of the present invention is preferably arranged such that: one of the image capturing device and the server device includes a work time calculating section for calculating a work time that is a time period from when the multidimensional code recognizing section recognizes the multidimensional codes which correspond to a start of work until when the multidimensional code recognizing section recognizes the multidimensional codes which correspond to an end of the work; and the server device further includes a standard time setting section for setting a standard time of the work in accordance with distribution of work times calculated by the work time calculating section.

According to the above configuration, the work time is automatically calculated merely by (i) preparing, in advance, the multidimensional codes corresponding to a start of work and the multidimensional codes corresponding to an end of work and (ii) the worker acting so that the image capturing device worn by the worker captures an image of the multidimensional codes. Then, the standard time is set in accordance with the distribution of work times thus calculated. Therefore, even in a case where there are a large number of types of work, it is possible to easily set a standard time for each work. Furthermore, even in a case where work is frequently improved and accordingly work time is changed, it is possible to easily set a standard time suitable for a current time point.

Note that the work management system can be arranged such that: the image capturing device further includes an information generating section for generating, as the generated information, (i) a work start time at which the multidimensional code recognizing section recognizes the multidimensional codes which correspond to the start of the work and (ii) a work end time at which the multidimensional code recognizing section recognizes the multidimensional codes which corresponding to the end of the work; the communication section transmits, to the server device, the generated information generated by the information generating section; the server device includes the work time calculating section; and the work time calculating section calculates the work time in accordance with the work start time and the work end time indicated by the generated information received from the communication section.

Alternatively, the work management system can be arranged such that: the image capturing device includes the work time calculating section; and the communication section transmits, to the server device, the work time calculated by the work time calculating section, as the generated information.

Moreover, the work management system of the present invention is preferably arranged so as to further include: an input information storing section, wherein: the image capturing device further includes: an input support information storing section in which input support information, in which a combination of multidimensional codes is associated with at least one of (i) predetermined information which is to be set as input information and (ii) an algorithm in accordance with which the input information is determined, is stored; and an input information determining section for determining the input information in accordance with (a) a combination of the multidimensional codes recognized by the multidimensional code recognizing section and (b) the input support information; the communication section transmits, to the server device, the input information determined by the input information determining section, as the generated information; and the management section stores, in the input information storing section, the input information received from the communication section.

According to the above configurations, it is possible to determine the input information merely by (i) preparing, in advance, the combination of the multidimensional codes indicated by the input support information and (ii) the worker acting so that the image capturing device worn by the worker captures an image of the combination of the multidimensional codes. That is, it is possible to determine the input information and accumulate the input information thus determined in the input information storing section, without causing the worker to conduct operation with use of a keyboard or a mouse.

Further, the work management system of the present invention is preferably arranged such that: the input support information storing section stores therein input support information A in which a combination of multidimensional codes which combination corresponds to a start of work carried out with use of a machine is associated with an algorithm in accordance with which (i) a current time is set as a work start time and (ii) a work record creating instruction, including the work start time and machine identification information that identifies the machine, is set as the input information; and the management section accumulates, in the input information storing section, a work record in which the machine identification information and the work start time, each of which is included in the work record creating instruction received from the communication section, are associated with each other.

Further, the work management system of the present invention is preferably arranged such that: the input support information storing section stores therein input support information B in which a combination of multidimensional codes which combination corresponds to an end of work carried out with use of a machine is associated with an algorithm in accordance with which (i) a current time is set as a work end time and (ii) a work record creating instruction, including the work end time and machine identification information that identifies the machine, is set as the input information; and the management section accumulates, in the input information storing section, a work record in which the machine identification information and the work end time, each of which is included in the work record creating instruction received from the communication section, are associated with each other.

Further, the work management system of the present invention is preferably arranged such that: the input support information storing section stores therein input support information C in which a combination of multidimensional codes which combination corresponds to a start of work carried out with respect to an object is associated with an algorithm in accordance with which (i) a current time is set as a work start time and (ii) a work record creating instruction, including the work start time and object identification information that identifies the object, is set as the input information; and the management section accumulates, in the input information storing section, a work record in which the object identification information and the work start time, each of which is included in the work record creating instruction received from the communication section, are associated with each other.

Further, the work management system of the present invention is preferably arranged such that: the input support information storing section stores therein input support information D in which a combination of multidimensional codes which combination corresponds to an end of work carried out with respect to an object is associated with an algorithm in accordance with which (i) a current time is set as a work end time and (ii) a work record creating instruction, including the work end time and object identification information that identifies the object, is set as the input information; and the management section accumulates, in the input information storing section, a work record in which the object identification information and the work end time, each of which is included in the work record creating instruction received from the communication section, are associated with each other.

According to the above configurations, it is possible to accumulate the work record in the input information storing section by the worker acting so that the image capturing device worn by the worker captures an image of the combination of the multidimensional codes, without conducting operation with use of a keyboard or a mouse.

Further, the work management system of the present invention is preferably arranged so as to further include: a plurality of display devices; and a related information storing section in which machine identification information and machine-related information are stored in association with each other, the machine identification information identifying a machine to be a work target, the machine-related information being related to the machine, wherein: the image capturing device further includes a work target storing section in which the machine identification information is stored; the input support information storing section stores therein pieces of input support information E in each of which a combination of multidimensional codes which combination corresponds to a corresponding one of the plurality of display devices is associated with an algorithm in accordance with which a display instruction, including (i) display device identification information that identifies the corresponding one of the plurality of display devices and (ii) the machine identification information stored in the work target storing section, is set as the input information; the server device further includes a display control section for, in a case where the display control section receives the display instruction including the machine identification information and the display device identification information, (a) reading, from the related information storing section, the machine-related information corresponding to the machine identification information included in the display instruction thus received and (b) transmitting the machine-related information thus read to the corresponding one of the plurality of display devices which is identified by the display device identification information included in the display instruction thus received; and the corresponding one of the plurality of display devices displays the machine-related information received from the display control section.

Alternatively, the work management system of the present invention is preferably arranged so as to further include: a plurality of display devices; and a related information storing section in which object identification information and object-related information are stored in association with each other, the object identification information identifying an object to be a work target, the object-related information being related to the object; wherein: the image capturing device further includes a work target storing section in which the object identification information is stored; the input support information storing section stores therein pieces of input support information E in each of which a combination of multidimensional codes which combination corresponds to a corresponding one of the plurality of display devices is associated with an algorithm in accordance with which a display instruction, including (i) display device identification information that identifies the corresponding one of the plurality of display devices and (ii) the object identification information stored in the work target storing section, is set as the input information; the server device further includes a display control section for, in a case where the display control section receives the display instruction including the object identification information and the display device identification information, (a) reading, from the related information storing section, the object-related information corresponding to the object identification information included in the display instruction thus received and (b) transmitting the object-related information thus read to the corresponding one of the plurality of display devices which is identified by the display device identification information included in the display instruction thus received; and the corresponding one of the plurality of display devices displays the object-related information received from the display control section.

Note that the object identification information is, for example, information that identifies a product or a lot produced by carrying out work.

Further, the work management system of the present invention can be arranged such that: a plurality of multidimensional codes are arranged on a periphery of each of the plurality of display devices; and the combination of the multidimensional codes included in each of the pieces of the input support information E indicates a combination of the plurality of multidimensional codes arranged on the periphery of a corresponding one of the plurality of display devices.

Further, the plurality of multidimensional codes arranged on the periphery of the each of the plurality of display devices can include (i) an upper left multidimensional code arranged at an upper left corner of the each of the plurality of display devices, (ii) an upper right multidimensional code arranged at an upper right corner of the each of the plurality of display devices, (iii) a lower left multidimensional code arranged at a lower left corner of the each of the plurality of display devices, and (iv) a lower right multidimensional code arranged at a lower right corner of the each of the plurality of display devices.

According to the above configurations, it is possible to see desired machine-related information or object-related information on the display device merely by the worker acting so that the image capturing device worn by the worker captures an image of the combination of the multidimensional codes corresponding to the display device, without conducting operation with use of a keyboard or a mouse.

Further, the work management system of the present invention is preferably arranged so as to further include: a plurality of display devices, wherein: each of the plurality of display devices has (i) an upper left multidimensional code at its upper left corner, (ii) an upper right multidimensional code at its upper right corner, (iii) a lower left multidimensional code at its lower left corner, and (iv) a lower right multidimensional code at its lower right corner; the input support information storing section stores therein (a) pieces of input support information F in each of which a combination F of the upper left multidimensional code and the upper right multidimensional code, which are arranged on a corresponding one of the plurality of display devices, is associated with a display instruction including display device identification information, which identifies the corresponding one of the plurality of display devices, and direction information indicative of an upper direction and (b) pieces of input support information G in each of which a combination G of the lower left multidimensional code and the lower right multidimensional code, which are arranged on a corresponding one of the plurality of display devices, is associated with a display instruction including display device identification information, which identifies the corresponding one of the plurality of display devices, and direction information indicative of a lower direction; in a case where the combination of the multidimensional codes recognized by the multidimensional code recognizing section matches the combination F Or G, the input information determining section determines, as the input information, the display instruction corresponding to the combination F or G which the combination of the multidimensional codes recognized by the multidimensional code recognizing section matches; the server device further includes a display control section for, in a case where the display control section receives the display instruction including the display device identification information and the direction information, transmitting, to the corresponding one of the plurality of display devices which is identified by the display device identification information included in the display instruction thus received, a scrolling instruction to scroll a display screen in a direction corresponding to the direction information included in the display instruction thus received; and the corresponding one of the plurality of display devices scrolls the display screen in accordance with the scrolling instruction received from the display control section.

Alternatively, the work management system of the present invention can be arranged so as to further include: a plurality of display devices, wherein: each of the plurality of display devices has (i) an upper left multidimensional code at its upper left corner, (ii) an upper right multidimensional code at its upper right corner, (iii) a lower left multidimensional code at its lower left corner, and (iv) a lower right multidimensional code at its lower right corner; the input support information storing section stores therein (a) pieces of input support information H in each of which a combination H of the upper left multidimensional code and the lower left multidimensional code, which are arranged on a corresponding one of the plurality of display devices, is associated with a display instruction including display device identification information, which identifies the corresponding one of the plurality of display devices, and direction information indicative of a left direction and (b) pieces of input support information I in each of which a combination I of the upper right multidimensional code and the lower right multidimensional code, which are arranged on a corresponding one of the plurality of display devices, is associated with a display instruction including display device identification information, which identifies the corresponding one of the plurality of display devices, and direction information indicative of a right direction; in a case where the combination of the multidimensional codes recognized by the multidimensional code recognizing section matches the combination H or I, the input information determining section determines, as the input information, the display instruction corresponding to the combination H or I which the combination of the multidimensional codes recognized by the multidimensional code recognizing section matches; the server device further includes a display control section for, in a case where the display control section receives the display instruction including the display device identification information and the direction information, transmitting, to the corresponding one of the plurality of display devices which is identified by the display device identification information included in the display instruction thus received, a scrolling instruction to scroll a display screen in a direction corresponding to the direction information included in the display instruction thus received; and the corresponding one of the plurality of display devices scrolls the display screen in accordance with the scrolling instruction received from the display control section.

According to the above configurations, it is possible to cause the display screen of the display device to be scrolled merely by the worker (i) changing a direction of the image capturing device worn by the worker and (ii) acting so that the image capturing device captures an image of any two of the multidimensional codes arranged at respective corners of the display device, without conducting operation with use of a keyboard or a mouse.

Further, the work management system of the present invention is preferably arranged such that: the input support information storing section stores therein input support information J in which a combination J of multidimensional codes which combination corresponds to a check item and a check result is associated with a check result registration instruction including check item identification information, which identifies the check item, and check result information indicative of the check result; and the management section accumulates, in the input information storing section, the check item identification information and the check result information, each of which is included in the check result registration instruction received from the communication section, in association with each other.

According to the above configuration, it is possible to accumulate the check result in the input information storing section merely by the worker acting so that the image capturing device worn by the worker captures an image of the combination J of the multidimensional codes, without conducting operation with use of a keyboard or a mouse.

Further, the work management system of the present invention is preferably arranged such that: the input support information J is arranged such that the combination J is also associated with an algorithm in accordance with which (i) a current time is set as a check time and (ii) the check time is included in the check result registration instruction; and the management section accumulates, in the input information storing section, the check item identification information, the check result information, and the check time, each of which is included in the check result registration instruction received from the communication section, in association with each other.

According to the above configuration, it is possible to also accumulate the check time in the input information storing section without causing the worker to conduct operation with use of a keyboard or a mouse.

The work management system of the present invention can be arranged so as to further include: a sound input device which is worn by the worker, wherein: the input support information storing section stores therein, for a check item with respect to which a check is carried out by use of the sound input device, input support information K in which a combination of multidimensional codes which combination corresponds to the check item is associated with an algorithm in accordance with which (i) check result information indicative of a check result is generated in accordance with a sound inputted in the sound input device and (ii) a check result registration instruction, including the check result information thus generated and check item identification information that identifies the check item, is set as the input information; and the management section accumulates, in the input information storing section, the check item identification information and the check result information, each of which is included in the check result registration instruction received from the communication section, in association with each other.

Note that the sound input device can be integrated with the image capturing device.

According to the above configurations, it is possible to accumulate the check result in the input information storing section merely by the worker (i) acting so that the image capturing device worn by the worker captures an image of the combination of the multidimensional codes corresponding to the check item and (ii) uttering a predetermined sound.

Further, the work management system of the present invention can be arranged so as to further include: a movement detecting device for detecting a movement of the worker, the movement detecting device being worn by the worker, wherein: the input support information storing section stores therein, for a check item with respect to which a check is carried out by use of the movement detecting device, input support information L in which a combination of multidimensional codes which combination corresponds to the check item is associated with an algorithm in accordance with which (i) check result information indicative of a check result is generated in accordance with the movement detected by the movement detecting device and (ii) a check result registration instruction, including the check result information thus generated and check item identification information that identifies the check item, is set as the input information; and the management section accumulates, in the input information storing section, the check item identification information and the check result information, each of which is included in the check result registration instruction received from the communication section, in association with each other.

Note that the movement detecting device can be integrated with the image capturing device. Further, the movement detecting device is, for example, an acceleration sensor.

According to the above configurations, it is possible to accumulate the check result in the input information storing section merely by the worker (i) acting so that the image capturing device worn by the worker captures an image of the combination of the multidimensional codes corresponding to the check item and (ii) making a predetermined movement.

Further, the work management system of the present invention can be arranged such that: the input support information storing section stores therein, for a check item with respect to which a check is carried out by use of a measuring device, input support information M in which a combination of multidimensional codes which combination corresponds to the check item is associated with an algorithm M in accordance with which (i) check result information indicative of a check result is generated in accordance with an measuring device image included in the image captured by the image capturing section and (ii) a check result registration instruction, including the check result information thus generated and check item identification information that identifies the check item, is set as the input information; and the management section accumulates, in the input information storing section, the check item identification information and the check result information, each of which is included in the check result registration instruction received from the communication section, in association with each other.

The algorithm M can be an algorithm in accordance with which (i) a numeral in the measuring device image is read by character recognition and (ii) the check result information is generated in accordance with the numeral thus read. Alternatively, the algorithm M can be an algorithm in accordance with which the check result information is generated in accordance with a position of a pointer in the measuring device image.

According to the above configurations, it is possible to accumulate the check result in the input information storing section merely by the worker acting so that the image capturing device worn by the worker captures (i) an image of the combination of the multidimensional codes corresponding to the check item and (ii) an image of the measuring device.

The work management system of the present invention is preferably arranged so as to further include: an image storing section, wherein the management section further includes: a machine signal receiving section for receiving, from a machine, a status signal indicative of a status of the machine; and a trouble information processing section for storing, in the image storing section, a moving image which is captured by the image capturing section from when the machine signal receiving section receives an abnormality start signal, which is the status signal indicating that an abnormality occurs or the status signal indicating that action starts to be taken against the abnormality, until when the machine signal receiving section receives the status signal indicating that the abnormality is overcome, as an abnormality occurrence moving image.

According to the above configuration, in a case where the abnormality occurs, the abnormality occurrence moving image is automatically stored in the image storing section without the worker's operation.

Further, the work management system of the present invention can be arranged such that the trouble information processing section stores, in the image storing section, the abnormality occurrence moving image in association with machine identification information which identifies the machine that has outputted the abnormality start signal.

Alternatively, the work management system can be arranged so as to further include: a worker information storing section in which, for each region where a machine is provided, worker identification information that identifies a worker who works in the each region is stored, wherein: the trouble information processing section (i) specifies, from the worker information storing section, worker identification information which corresponds to a region where the machine having outputted the abnormality start signal is provided and (ii) stores, in the image storing section, the abnormality occurrence moving image captured by the image capturing section of the image capturing device which is worn by a worker indicated by the worker identification information thus specified, in association with the worker identification information.

According to the above configurations, it is possible to easily extract the abnormality occurrence moving image corresponding to each machine or worker, with use of the machine identification information or the worker identification information.

Further, the work management system of the present invention is preferably arranged such that: the image capturing device includes: a multidimensional code recognizing section for recognizing multidimensional codes contained in the image captured by the image capturing section; and a machine inspection signal generating section for generating a machine inspection signal to which machine inspector identification information that identifies the worker wearing the image capturing device is added, in a case where the multidimensional codes recognized by the multidimensional code recognizing section correspond to a start of an inspection with respect to the machine; the communication section transmits, to the server device, the machine inspection signal generated by the machine inspection signal generating section; and the trouble information processing section stores, in the image storing section, the abnormality occurrence moving image captured by the image capturing section of the image capturing device which is worn by the worker indicated by the machine inspector identification information that is added to the machine inspection signal received from the communication section, in association with the machine inspector identification information.

According to the above configuration, it is possible to accumulate, in the image storing section, a moving image captured by the image capturing device worn by the worker who has carried out a machine inspection, as the abnormality occurrence moving image.

Note that the work management system can be arranged so as to further include: a worker information storing section which manages, for each region where a machine is provided, (i) worker identification information that identifies workers who work in the each region and (ii) particular worker identification information that identifies a particular worker out of the workers, wherein: in a case where the trouble information processing section does not receive the machine inspection signal from the communication section within a predetermined time period, the trouble information processing section (a) specifies, from the worker information storing section, particular worker identification information which corresponds to a region where the machine having outputted the abnormality start signal is provided and (b) stores, in the image storing section, the abnormality occurrence moving image captured by the image capturing section of the image capturing device which is worn by a worker indicated by the particular worker identification information thus specified, in association with the particular worker identification information.

According to the above configuration, by setting, as the particular worker in advance, the worker who often carries out the machine inspection when the abnormality occurs, it is possible to accumulate, in the image storing section, a moving image captured by the image capturing device worn by the particular worker, as the abnormality occurrence moving image, without generating the machine inspection signal.

Further, the work management system of the present invention is preferably arranged such that: the image capturing device includes: a multidimensional code recognizing section for recognizing multidimensional codes contained in the image captured by the image capturing section; and a product inspection signal generating section for generating a product inspection signal to which product inspector identification information that identifies the worker wearing the image capturing device is added, in a case where the multidimensional codes recognized by the multidimensional code recognizing section correspond to a start of an inspection with respect to a product; the communication section transmits, to the server device, the product inspection signal generated by the product inspection signal generating section; and the trouble information processing section stores, in the image storing section, the abnormality occurrence moving image captured by the image capturing section of the image capturing device which is worn by the worker indicated by the product inspector identification information added to the product inspection signal received from the communication section, in association with the product inspector identification information.

According to the above configuration, it is possible to accumulate, in the image storing section, a moving image captured by the image capturing device worn by the worker who has carried out the product inspection, as the abnormality occurrence moving image.

Note that the work management system can be arranged so as to further include: a worker information storing section which manages, for each region where a machine is provided, (i) worker identification information that identifies workers who work in the each region and (ii) particular worker identification information that identifies a particular worker out of the workers, wherein: in a case where the trouble information processing section does not receive the product inspection signal from the communication section within a predetermined time period, the trouble information processing section (a) specifies, from the worker information storing section, particular worker identification information which corresponds to a region where the machine having outputted the abnormality start signal is provided and (b) stores, in the image storing section, the abnormality occurrence moving image captured by the image capturing section of the image capturing device which is worn by a worker indicated by the particular worker identification information thus specified, in association with the particular worker identification information.

According to the above configuration, by setting, as the particular worker in advance, the worker who often carries out the product inspection when the abnormality occurs, it is possible to accumulate, in the image storing section, a moving image captured by the image capturing device worn by the particular worker, as the abnormality occurrence moving image, without generating the product inspection signal.

The image capturing device is preferably worn on the worker's head. Furthermore, the image capturing device is preferably a glasses-type image capturing device. This allows an area captured by the image capturing device to be substantially identical to a field of view of the worker.

The present invention is not limited to the description of the embodiments, but may be altered by a skilled person in the art within the scope of the claims. An embodiment derived from a proper combination of technical means disclosed in different embodiments is also encompassed in the technical scope of the present invention.

INDUSTRIAL APPLICABILITY

The present invention is applicable to a work management system which manages, for example, work carried out by a worker in a production line.

REFERENCE SIGNS LIST

1 Work management system
10 Input-output terminal (display device)
13 Display section
20 Image capturing device
21 Image capturing section
22 Multidimensional code recognizing section
23 Work target storing section
24 Acceleration sensor (movement detecting device)
25 Microphone (sound input device)
26 Speaker
27 Camera ID storing section
28 Worker ID storing section
29 Input support information storing section
30 Communication section
31 Control section
31a Instruction receiving section
31b Moving-image work standard generating section
31c Work time calculating section
31d Input information determining section
31e Work target setting section
31f Recording processing section
40 Production device (machine)
50 Lot managing device
60 Server device
61 Communication section
62 Image storing section
63 Work record accumulating section (input information storing section)
64 Check result storing section (input information storing section)
65 Worker information storing section
66 Related information storing section
67 Line information storing section
70 Control section (management section)
70a Work standard processing section
70b Standard time setting section
70c Work time calculating section
70d Work record creating section
70e Display control section
70f Check result processing section
70g Recording instructing section 70h Trouble information generating section (trouble information processing section)
70j Search processing section
80 Display terminal (display device)
90 Operation area restricting device

What is claimed is:

1. A work management system comprising:
an image capturing device worn by a worker;
a server device; and
a plurality of display devices each of which has (i) an upper left multidimensional code at its upper left corner, (ii) an upper right multidimensional code at its upper right corner, (iii) a lower left multidimensional code at its lower left corner, and (iv) a lower right multidimensional code at its lower right corner,
wherein the image capturing device includes:
an image capturing section capturing an image of a work range of the worker;
a multidimensional code recognizing section recognizing multidimensional codes contained in the image captured by the image capturing section;
an input support information storing section in which pieces of input support information are stored, each of the pieces of the input support information being information in which combinations of two of the upper left multidimensional code, the upper right multidimensional code, the lower left multidimensional code, and the lower right multidimensional code, which are arranged on a corresponding one of the plurality of display devices, are associated with respective display instructions each including display device identification information, which identifies the corresponding one of the plurality of display devices, and direction information indicative of a predetermined direction;
an input information determining section determining, as input information, one of the display instructions which corresponds the any one of the combinations when a combination of the multidimensional codes recognized by the multidimensional code recognizing section matches any one of the combinations; and
a communication section transmitting, to the server device, the input information determined by the input information determining section, wherein the server device includes:
a display control section transmitting, to the corresponding one of the plurality of display devices which is identified by the display device identification information included in the one of the display instructions thus received, a scrolling instruction to scroll a display screen in a direction corresponding to the direction information included in the one of the display instructions thus received when the display control section receives the one of the display instructions which includes the display device identification information and the direction information, and
wherein the corresponding one of the plurality of display devices scrolls the display screen in accordance with the scrolling instruction received from the display control section.

2. The work management system as set forth in claim 1, wherein: the input support information storing section stores therein at least one of:
(1) pieces of input support information in each of which a combination of the upper left multidimensional code and the upper right multidimensional code, which are arranged on the corresponding one of the plurality of display devices, is associated with a display instruction including the display device identification information, which identifies the corresponding one of the plurality of display devices, and the direction information which indicates an upper direction,
(2) pieces of input support information in each of which a combination of the lower left multidimensional code and the lower right multidimensional code, which are arranged on the corresponding one of the plurality of display devices, is associated with a display instruction including the display device identification information, which identifies the corresponding one of the plurality of display devices, and the direction information which indicates a lower direction,
(3) pieces of input support information in each of which a combination of the upper left multidimensional code and the corresponding one of the plurality of display devices, is associated with a display instruction including the display device identification information, which identifies the corresponding one of the plurality of display devices, and the direction information which indicates a left direction, and
(4) pieces of input support information in each of which a combination of the upper right multidimensional code and the lower right multidimensional code, which are arranged on the corresponding one of the plurality of display devices, is associated with a display instruction including the display device identification information, which identifies the corresponding one of the plurality of display devices, and the direction information which indicative of a right direction.

3. The work management system as set forth in claim 1, wherein the image capturing device is worn on the worker's head.

4. The work management system as set forth in claim 1, wherein the image capturing device is a glasses-type image capturing device.

5. A method of managing a work management system, the method comprising:
(a) capturing, by an image capturing section of an image capturing device worn by a worker, an image of a work range of the worker, wherein the work range includes at least one of a plurality of display devices each of which has (i) an upper left multidimensional code at its upper left corner, (ii) an upper right multidimensional code at its upper right corner, (iii) a lower left multidimensional code at its lower left corner, and (iv) a lower right multidimensional code at its lower right corner;
(b) recognizing, by the image capturing device, multidimensional codes contained in the image captured by the image capturing section, wherein the image capturing device includes an input support information storing section in which pieces of input support information are stored, each of the pieces of the input support information being information in which combinations of two of the upper left multidimensional code, the upper right multidimensional code, the lower left multidimensional code, and the lower right multidimensional code, which are arranged on a corresponding one of the plurality of display devices, are associated with respective display instructions each including display device identification information, which identifies the corresponding one of the plurality of display devices, and direction information indicative of a predetermined direction;

(c) determining by the image capturing device, as input information, one of the display instructions which corresponds to any one of the stored combinations when a combination of the recognized multidimensional codes matches the any of the stored combinations;

(d) transmitting, to the server device and by the image capturing device the determined input information;

(e) upon receipt of the input information being the one of the display instructions which includes the display device identification information and the direction information, transmitting by the server device and to the corresponding one of the plurality of display devices which is identified by the display device identification information included in the one of the display instructions thus received, a scrolling instruction to scroll a display screen in a direction corresponding to the direction information included in the one of the display instructions thus received; and (f) scrolling, by the corresponding one of the plurality of display devices, the display screen in accordance with the scrolling instruction received from the server device.

* * * * *

UNITED STATES PATENT AND TRADEMARK OFFICE
CERTIFICATE OF CORRECTION

PATENT NO.         : 9,953,374 B2
APPLICATION NO.    : 14/861464
DATED              : April 24, 2018
INVENTOR(S)        : Sadao Sugiyama et al.

Page 1 of 1

It is certified that error appears in the above-identified patent and that said Letters Patent is hereby corrected as shown below:

In the Claims

At Column 67, Claim number 5, Line number 11, the word "device" should read -- device, --, and At Column 67, Claim number 5, Line number 15, the word "transmitting" should read -- transmitting, --.

Signed and Sealed this
Seventeenth Day of July, 2018

Andrei Iancu
*Director of the United States Patent and Trademark Office*